US012159610B2

(12) United States Patent
Packouz

(10) Patent No.: US 12,159,610 B2
(45) Date of Patent: *Dec. 3, 2024

(54) SYNTHESIZED PERCUSSION PEDAL AND DOCKING STATION

(71) Applicant: Intelliterran, Inc., Aventura, FL (US)

(72) Inventor: David Packouz, Aventura, FL (US)

(73) Assignee: Intelliterran, Inc., Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,995

(22) Filed: Jun. 27, 2023

(65) Prior Publication Data

US 2023/0343315 A1 Oct. 26, 2023

Related U.S. Application Data

(63) Continuation of application No. 17/211,156, filed on Mar. 24, 2021, now Pat. No. 11,688,377, which is a (Continued)

(51) Int. Cl.

*G10H 1/34* (2006.01)
*G10H 1/00* (2006.01)
*G10H 1/42* (2006.01)

(52) U.S. Cl.

CPC ........... *G10H 1/348* (2013.01); *G10H 1/0066* (2013.01); *G10H 1/42* (2013.01);

(Continued)

(58) Field of Classification Search

CPC .. G10H 1/0025; G10H 1/0008; G10H 1/0033; G10H 1/42; G10H 2220/005;

(Continued)

(56) References Cited

U.S. PATENT DOCUMENTS 3,649,736 A 3/1972 Van Der Kooij
5,117,285 A 5/1992 Nelson et al.

(Continued)

FOREIGN PATENT DOCUMENTS

CA 3039257 4/2018
CN 109891496 A 6/2019

(Continued)

OTHER PUBLICATIONS

U.S. Non-Final Office Action dated May 22, 2015 cited in U.S. Appl. No. 14/216,879, 14 pgs.

(Continued)

*Primary Examiner* — Joseph Saunders, Jr.
(74) *Attorney, Agent, or Firm* — BEKIARES ELIEZER LLP

(57) ABSTRACT

Methods, apparatus, and a system (collectively a “platform”) are disclosed for facilitating, enabling, or enhancing the creation, control, and playback of digital audio loops or parts. The method may comprise playing back a first midi segment of a song, the first midi segment comprising a first midi sequence repeated a predetermined number of times, transitioning to a second midi segment of the song after the first midi sequence is repeated for the predetermined number of times unless a first foot-operable switch is triggered, receiving a first activation command during the playback of the first midi segment and in response to the first activation command, modifying the predetermined number of times the first midi sequence is to be repeated wherein the first activation command is triggered based on, at least in part, a duration and frequency of a user application of the first foot-operable switch.

20 Claims, 38 Drawing Sheets

Related U.S. Application Data continuation-in-part of application No. 16/989,790, filed on Aug. 10, 2020, now Pat. No. 10,997,958, which is a continuation of application No. 16/720,081, filed on Dec. 19, 2019, now Pat. No. 10,741,155, which is a continuation-in-part of application No. 15/861,369, filed on Jan. 3, 2018, now Pat. No. 10,546,568, which is a continuation of application No. 15/284,769, filed on Oct. 4, 2016, now Pat. No. 9,905,210, which is a continuation-in-part of application No. 14/216,879, filed on Mar. 17, 2014, now Pat. No. 9,495,947.

(60) Provisional application No. 61/913,087, filed on Dec. 6, 2013.

(52) U.S. Cl.
CPC . *G10H 2210/346* (2013.01); *G10H 2210/371* (2013.01); *G10H 2220/106* (2013.01); *G10H 2240/211* (2013.01); *G10H 2240/285* (2013.01); *G10H 2250/641* (2013.01)

(58) Field of Classification Search
CPC ............. G10H 2250/641; G10H 1/348; G10H 1/0066; G10H 2210/346; G10H 2210/371; G10H 2220/106; G10H 2240/211; G10H 2240/285; G06F 16/40; G06F 3/04886; G06F 3/165; G06F 2203/04803
See application file for complete search history.

(56) References Cited

U.S. PATENT DOCUMENTS

| | | | |
|---|---|---|---|
| 5,166,467 | A | 11/1992 | Brown |
| 5,192,823 | A | 3/1993 | Suzuki et al. |
| 5,223,655 | A | 6/1993 | Watanabe et al. |
| 5,296,641 | A | 3/1994 | Stelzel |
| 5,421,236 | A | 6/1995 | Sanger |
| 5,455,378 | A | 10/1995 | Paulson et al. |
| 5,502,275 | A | 3/1996 | Kondo et al. |
| 5,675,376 | A | 10/1997 | Andersson et al. |
| 5,837,912 | A | 11/1998 | Eagen |
| 5,877,444 | A | 3/1999 | Hine et al. |
| 5,915,288 | A | 6/1999 | Gabriel |
| 6,121,532 | A | 9/2000 | Kay |
| 6,924,425 | B2 | 8/2005 | Naples et al. |
| 6,960,715 | B2 | 11/2005 | Riopelle |
| 7,015,390 | B1 | 3/2006 | Rogers |
| 7,262,359 | B1 | 8/2007 | Edwards, Sr. et al. |
| 7,294,777 | B2 | 11/2007 | Hofmeister et al. |
| 7,355,110 | B2 | 4/2008 | Nash |
| 7,373,210 | B2 | 5/2008 | Pennock et al. |
| 7,427,705 | B2 | 9/2008 | Rubens |
| 7,504,577 | B2 | 3/2009 | Riopelle |
| 7,671,268 | B2 | 3/2010 | Nicoll |
| 7,844,069 | B2 | 11/2010 | Banks |
| 7,923,623 | B1 | 4/2011 | Beaty |
| 8,035,025 | B1 | 10/2011 | Donnell |
| 8,106,283 | B2 | 1/2012 | Nishitani et al. |
| 8,217,253 | B1 | 7/2012 | Beaty |
| 8,253,776 | B2 | 8/2012 | Chen et al. |
| 8,324,494 | B1 | 12/2012 | Packouz |
| 8,338,689 | B1 | 12/2012 | Beaty |
| D680,502 | S | 4/2013 | McMillen |
| 8,431,811 | B2 | 4/2013 | Riopelle |
| 8,785,760 | B2 | 7/2014 | Serletic et al. |
| 8,816,180 | B2 | 8/2014 | Georges et al. |
| 8,818,173 | B2 | 8/2014 | Wallace |
| 8,835,739 | B2 | 9/2014 | Bencar et al. |
| 8,835,740 | B2 | 9/2014 | Riopelle |
| 8,847,057 | B2 | 9/2014 | Koah |
| 8,872,014 | B2 | 10/2014 | Sandler et al. |
| 8,880,208 | B2 | 11/2014 | David |
| 8,907,191 | B2 | 12/2014 | Seese, Jr. et al. |
| 8,908,008 | B2 | 12/2014 | Tan et al. |
| 9,012,756 | B1 | 4/2015 | Goldman et al. |
| 9,047,850 | B1 | 6/2015 | Beaty |
| 9,088,693 | B2 | 7/2015 | Pham et al. |
| 9,274,745 | B2 | 3/2016 | Clements et al. |
| 9,443,501 | B1 | 9/2016 | Adam |
| 9,495,947 | B2 | 11/2016 | Packouz |
| 9,691,429 | B2 | 6/2017 | Leiberman et al. |
| 9,721,551 | B2 | 8/2017 | Silverstein |
| 9,799,314 | B2 | 10/2017 | Lopiccolo et al. |
| 9,843,404 | B2 | 12/2017 | Kiely et al. |
| 9,852,216 | B2 | 12/2017 | Belcher et al. |
| 9,892,720 | B2 | 2/2018 | Packouz |
| 9,905,210 | B2 | 2/2018 | Packouz |
| 9,953,624 | B2 | 4/2018 | Baker et al. |
| 10,262,640 | B2 | 4/2019 | Takehisa et al. |
| 10,421,013 | B2 | 9/2019 | Challinor et al. |
| 10,529,312 | B1 | 1/2020 | Adams et al. |
| 10,546,568 | B2 | 1/2020 | Packouz |
| 10,600,398 | B2 | 3/2020 | Pachet et al. |
| 10,741,154 | B2 | 8/2020 | Packouz |
| 10,741,155 | B2 | 8/2020 | Packouz |
| 10,957,296 | B2 | 3/2021 | Packouz |
| 10,991,350 | B2 | 4/2021 | Packouz |
| 10,997,958 | B2 | 5/2021 | Packouz |
| 11,688,377 | B2 | 6/2023 | Packouz |
| 2001/0015123 | A1 | 8/2001 | Nishitani et al. |
| 2001/0035087 | A1 | 11/2001 | Subotnick |
| 2002/0035616 | A1 | 3/2002 | Diamond et al. |
| 2003/0110929 | A1 | 6/2003 | Riopelle |
| 2004/0144241 | A1 | 7/2004 | Juskiewicz et al. |
| 2004/0159214 | A1 | 8/2004 | Tsuge et al. |
| 2005/0241466 | A1 | 11/2005 | Riopelle |
| 2007/0000375 | A1 | 1/2007 | Harrison, Jr. |
| 2007/0068371 | A1 | 3/2007 | Weir |
| 2007/0136769 | A1 | 6/2007 | Goldberg et al. |
| 2008/0028920 | A1 | 2/2008 | Sullivan |
| 2008/0053293 | A1 | 3/2008 | Georges et al. |
| 2008/0156180 | A1 | 7/2008 | Bagale |
| 2008/0212439 | A1 | 9/2008 | Chan et al. |
| 2008/0229914 | A1 | 9/2008 | Nathanial |
| 2009/0221369 | A1 | 9/2009 | Riopelle |
| 2010/0037755 | A1 | 2/2010 | McMillen et al. |
| 2010/0087937 | A1 | 4/2010 | Tolson |
| 2010/0180755 | A1 | 7/2010 | Copeland et al. |
| 2010/0305732 | A1 | 12/2010 | Serletic |
| 2011/0023691 | A1 | 2/2011 | Iwase et al. |
| 2011/0088536 | A1 | 4/2011 | McMillen et al. |
| 2011/0095874 | A1 | 4/2011 | Bennett |
| 2011/0112672 | A1 | 5/2011 | Brown et al. |
| 2011/0143837 | A1 | 6/2011 | Riopelle |
| 2011/0153047 | A1 | 6/2011 | Cameron et al. |
| 2011/0271820 | A1 | 11/2011 | Cockerell et al. |
| 2012/0014673 | A1 | 1/2012 | O'Dwyer |
| 2012/0059494 | A1 | 3/2012 | David |
| 2012/0144981 | A1 | 6/2012 | Ciccone |
| 2012/0160079 | A1 | 6/2012 | Little et al. |
| 2012/0263432 | A1 | 10/2012 | Shore |
| 2012/0266741 | A1 | 10/2012 | Bencar et al. |
| 2013/0053993 | A1 | 2/2013 | Setoguchi |
| 2013/0058507 | A1 | 3/2013 | Arknæs-Pedersen et al. |
| 2013/0118340 | A1 | 5/2013 | D'Amours |
| 2013/0138233 | A1 | 5/2013 | Sandler et al. |
| 2013/0292524 | A1 | 11/2013 | Canivell Grifols et al. |
| 2013/0297844 | A1 | 11/2013 | Rosenberg et al. |
| 2013/0298752 | A1 | 11/2013 | Juszkiewicz |
| 2013/0312588 | A1 | 11/2013 | Orshan |
| 2014/0052282 | A1 | 2/2014 | Balassanian |
| 2014/0123838 | A1 | 5/2014 | D'Amours |
| 2014/0202316 | A1 | 7/2014 | Szalay et al. |
| 2014/0238221 | A1 | 8/2014 | Roberts et al. |
| 2014/0266766 | A1 | 9/2014 | Dobbe |
| 2014/0331850 | A1 | 11/2014 | Cho |
| 2015/0046824 | A1 | 2/2015 | Humphrey et al. |
| 2015/0066780 | A1 | 3/2015 | Cohen et al. |
| 2015/0094833 | A1 | 4/2015 | Clements et al. |

(56) References Cited

U.S. PATENT DOCUMENTS

| | | | |
|---|---|---|---|
| 2015/0154948 | A1 | 6/2015 | Urry et al. |
| 2015/0161973 | A1 | 6/2015 | Packouz |
| 2015/0161978 | A1 | 6/2015 | Packouz |
| 2016/0103844 | A1 | 4/2016 | Belcher et al. |
| 2016/0247496 | A1 | 8/2016 | Pachet et al. |
| 2016/0267805 | A1 | 9/2016 | Dekett et al. |
| 2016/0335996 | A1 | 11/2016 | Wardlow |
| 2017/0025107 | A1 | 1/2017 | Packouz |
| 2017/0025108 | A1 | 1/2017 | Packouz |
| 2017/0041357 | A1 | 2/2017 | Wang et al. |
| 2017/0041359 | A1 | 2/2017 | Kwan |
| 2017/0062006 | A1 | 3/2017 | Plom et al. |
| 2017/0092251 | A1 | 3/2017 | Mizrahi |
| 2018/0009631 | A1 | 1/2018 | Krishnamurthy et al. |
| 2018/0130452 | A1 | 5/2018 | Packouz |
| 2018/0261197 | A1 | 9/2018 | Ceccolini |
| 2018/0308460 | A1 | 10/2018 | Takehisa et al. |
| 2019/0012995 | A1 | 1/2019 | Lupini et al. |
| 2019/0051273 | A1 | 2/2019 | Fryette et al. |
| 2019/0058423 | A1 | 2/2019 | Knoedgen et al. |
| 2019/0066643 | A1 | 2/2019 | Packouz et al. |
| 2019/0229666 | A1 | 7/2019 | Zhou et al. |
| 2020/0043453 | A1 | 2/2020 | Lang et al. |
| 2020/0118532 | A1 | 4/2020 | Packouz |
| 2020/0126526 | A1 | 4/2020 | Packouz |
| 2020/0202828 | A1 | 6/2020 | Scherbacovsky |
| 2020/0372886 | A1 | 11/2020 | Packouz |
| 2020/0372887 | A1 | 11/2020 | Packouz |
| 2021/0210059 | A1 | 7/2021 | Packouz |
| 2021/0287646 | A1 | 9/2021 | Packouz |

FOREIGN PATENT DOCUMENTS

| | | | |
|---|---|---|---|
| DE | 102007034806 | A1 | 2/2009 |
| EP | 1974099 | A2 | 9/2008 |
| EP | 2638829 | A1 | 9/2013 |
| EP | 2950303 | A1 | 12/2015 |
| ES | 2412605 | | 7/2013 |
| ES | 2495940 | | 9/2014 |
| ES | 2510966 | | 10/2014 |
| JP | 7219545 | A | 8/1995 |
| JP | 2011215257 | A | 10/2011 |
| JP | 2013171070 | A | 9/2013 |
| WO | 2009012533 | A1 | 1/2009 |
| WO | 2012062939 | A1 | 5/2012 |
| WO | 2014114833 | A1 | 7/2014 |
| WO | 2015118195 | A1 | 8/2015 |
| WO | 2015193526 | A1 | 12/2015 |
| WO | 2018067124 | A1 | 4/2018 |
| WO | 2019046487 | A1 | 3/2019 |
| WO | 2019224990 | A1 | 11/2019 |
| WO | 2022204393 | | 9/2022 |

OTHER PUBLICATIONS

U.S. Final Office Action dated Sep. 15, 2015 cited in U.S. Appl. No. 14/216,879, 11 pgs.

U.S. Non-Final Office Action dated Mar. 15, 2016 cited in U.S. Appl. No. 14/216,879, 5 pgs. (00140.009).

International Search Report and Written Opinion dated Dec. 27, 2016 cited in Application No. PCT/US16/55312, 9 pgs.

Jones et al., "Achieving Eye Contact in a One-to-Many 3D Video Teleconferencing System", Fakespace Labs, University of Southern California, http://ict.usc.edu/pubs/Achieving%20Eye%20Contact%20in%20a%20One-to-Many%203D%20Video%20Teleconferencing%20System.pdf, 8 pgs.

Gore, "Amped-Up Acoustic Guitars", https://www.seymourduncan.com/tonefiend/effects/amped-up-acoustic/, 2012, 4 pgs.

Yamaha MFC10 MIDI Foot Controller, Owner's Manual, https://usa.yamaha.com/files/download/other_assets/5/317935/MFC10E.pdf, 41 pgs.

IK Multimedia—iRig BlueBoard, https://www.ikmultimedia.com/products/irigblueboard/, 1996-2019, 16 pgs.

Una, The $10 Ableton Footcontroller—YouTube, https://www.youtube.com/watch?v=VxaClh7FACw, Jul. 29, 2007, 3 pgs.

Myvoiceismypassport, Ableton Live Foot Controller "ability"—YouTube, https://www.youtube.com/watch?v=9FCQSIC26uw, Nov. 7, 2006, 2 pgs.

U.S. Non-Final Office Action dated Jan. 5, 2017 cited in U.S. Appl. No. 15/284,717, 12 pgs.

U.S. Non-Final Office Action dated Apr. 6, 2017 cited in U.S. Appl. No. 15/284,769, 12 pgs.

"Ableton Live Foot Controller", www.youtube.com/watch?v=9FCQSIC26us upload to YouTube, Nov. 7, 2006, viewed online on May 14, 2015.

International Search Report and Written Opinion dated Nov. 7, 2018 cited in Application No. PCT/US18/48637, 13 pgs.

U.S. Non-Final Office Action dated Jun. 27, 2018 cited in U.S. Appl. No. 15/861,369, 11 pgs..

U.S. Final Office Action dated Mar. 7, 2019 cited in U.S. Appl. No. 15/861,369, 8 pgs.

U.S. Non-Final Office Action dated Aug. 22, 2019 cited in U.S. Appl. No. 16/116,845, 17 pgs.

International Preliminary Report on Patentability dated Oct. 31, 2019 cited in Application No. PCT/US2018/048637, 10 pgs.

U.S. Non-Final Office Action dated Feb. 28, 2020 cited in U.S. Appl. No. 16/712,193, 33 pgs.

U.S. Non-Final Office Action dated Feb. 28, 2020 cited in U.S. Appl. No. 16/720,081, 27 pgs.

European Extended Search Report dated Mar. 13, 2020 cited in Application No. 16918409.0, 5 pgs.

U.S. Non-Final Office Action dated Jun. 1, 2020 cited in U.S. Appl. No. 16/116,845, 40 pgs.

U.S. Non-Final Office Action dated Sep. 18, 2020 cited in U.S. Appl. No. 16/989,748, 36 pgs. (no new art).

International Search Report and Written Opinion dated Jul. 19, 2022 cited in Application No. PCT/US22/21731, 7 pgs.

International Preliminary Report on Patentability dated Oct. 5, 2023 cited in Application No. PCT/US22/21731, 6 pgs.

TIME →

| | | | | | | | | | | | | | | | | |
|---|---|---|---|---|---|---|---|---|---|---|---|---|---|---|---|---|
| 85 | 86 | 87 | 88 | 89 | 90 | 90a | 90b | 90c | 90d | 91 | 91a | 91b | 92 | 93 | 94 | 95 |
| A | $F^A_1$ | A | $F^A_2$ | A | $F^A_3$ | A | $F^A_1$ | A | $F^A_T$ | B | $F^B_1$ | B | $F^B_2$ | B | $F^B_T$ | A |
| TAP | TAP | | TAP | | TAP | | TAP | | HOLD | RELEASE | TAP | | TAP | | HOLD | RELEASE |

A = Rhythm Loop First Type

B = Rhythm Loop Second Type $F^X_Y$ = Fill Sequence
X = Identifies which rhythm loop into which the fill is integrated
Y = Fill Type [# = Variation; T = Transition Fill]

*FIG. 4B*

TIME →

| | | | | | | | | | | | | | | | | |
|---|---|---|---|---|---|---|---|---|---|---|---|---|---|---|---|---|
| 185 | 186 | 187 | 188 | 189 | 190 | 191 | 192 | 193a | 193b | 193c | 194 | 195 | 196 | 197 | 198 | 199 |
| A1 | Fa1 | A3 | FaT | B1 | Fb3 | B3 | Fb2 | B1 | B2 | B3 | FbT | C1 | Fc2 | | FcT | A1 |
| TAP | TAP | | | | TAP | | TAP | | | | TAP | | TAP | | TAP | |

A# = First segment type / rhythm loop
B# = Second segment type / rhythm loop
C# = Third segment type / rhythm loop
# = Loop number
Fxy= Fill Sequence
X = Identifies which rhythm loop into which the fill is integrated
Y = Fill Type [# = Variation; T = Transition Fill]

*FIG. 4C*

TIME →

| | | | | | | | | | | | | | | | | |
|---|---|---|---|---|---|---|---|---|---|---|---|---|---|---|---|---|
| 285 | 286 | 287 | 288 | 289 | 290 | 291 | 292 | 293a | 293b | 293c | 294 | 295 | 296 | 297 | 298 | 299 |
| A1 | Fa1 | A3 | FaT | B1 | Fb3 | B3 | Fb2 | B5 | B6 | B7 | FbT | C1 | Fc2 | C3 | FcT | D1 |
| TAP | TAP | | TAP | | TAP | | TAP | | | | TAP | | TAP | | TAP | |

A# = First segment type / rhythm loop
B# = Second segment type / rhythm loop
C# = Third segment type / rhythm loop
D# = Fourth segment type / rythm loop

# = Loop number
Fxy= Fill Sequence
X = Identifies which rhythm loop into which the fill is integrated
Y = Fill Type [# = Variation; T = Transition Fill]

*FIG. 4D*

*Measurements depicted for Illustrative Purposes Only*

Measurements depicted for Illustrative Purposes Only

500B

SYNTHESIZED PERCUSSION PEDAL AND DOCKING STATION

RELATED APPLICATIONS

The present application is a Continuation of U.S. application Ser. No. 17/211,156 filed on Mar. 24, 2021, which issues on Jun. 27, 2023 as U.S. Pat. No. 11,688,377, which is a Continuation-In-Part of U.S. application Ser. No. 16/989,790 filed on Aug. 10, 2020, which issued on May 4, 2021 as U.S. Pat. No. 10,997,958, which is a Continuation of U.S. application Ser. No. 16/720,081 filed on Dec. 19, 2019, which issued on Aug. 11, 2020 as U.S. Pat. No. 10,741,155, which is a Continuation-in-Part of U.S. application Ser. No. 15/861,369 filed on Jan. 3, 2018, which issued on Jan. 28, 2020 as U.S. Pat. No. 10,546,568, which is a Continuation of U.S. application Ser. No. 15/284,769 filed on Oct. 4, 2016, which issued on Feb. 27, 2018 as U.S. Pat. No. 9,905,210, which is a Continuation-in-Part of U.S. application Ser. No. 14/216,879 filed on Mar. 17, 2014, which issued on Nov. 15, 2016 as U.S. Pat. No. 9,495,947, which claims benefit of U.S. Provisional Application No. 61/913,087 filed on Dec. 6, 2013, which all are incorporated herein by reference in their entirety.

It is intended that the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to music production, composition, arrangement, and performance, and more particularly, to foot operated synthesized accompaniment pedals.

BACKGROUND

Musicians have used foot-operated pedals to add effects and other inputs for some time. Typically, one or multiple foot pedals are used to allow the musician the ability to have his hands free to play a primary instrument, such as a guitar, while retaining the ability to add complexity to the music through his foot's operation of the pedals. Foot-operated pedals may add various properties to the musician's tone by, for example, altering the resulting sound with effects like reverb or distortion.

Further, pedals known as looper pedals are currently used by musicians to record a phrase of a song and replay the recording as a loop such that the loop can be used as a backing track. Many times, musicians overdub on the loops as well as create more than one loop for use as song parts (verse, chorus, bridge, break, etc.). Recording this much information requires that the musician remember the order and placement of the content that is recorded in each loop and/or song part.

Moreover, current looper designs limit the number of parallel and sequential loops to the number of control footswitches, as each loop is assigned to a specific footswitch. Further still, current looper designs do not allow groups of parallel loops to be used sequentially. Users of conventional loopers are forced to choose between using parallel or sequential loops, but cannot do both at the same time.

Current loopers either only allow users to overdub to the current length of the original recorded track, or must set in advance what length multiple of the original track the overdub will be. This limits the musician's spontaneous creativity when recording an overdub.

Though foot pedals, including loopers and percussion pedals, are effective composition tools, it is cumbersome or impossible to rearrange or alter playback of a previous performance or parts of a previous performance, save or share content recorded on the pedal or pedals with other musicians, or to receive recorded content from other musicians to use in the pedal or pedals for collaboration purposes. Sharing must currently be done by downloading files to another intermediary device before they can be loaded onto the pedal or looper for use in collaboration.

BRIEF OVERVIEW OF THE PRESENT DISCLOSURE

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Methods, apparatus, and a system (collectively a "platform") are disclosed for facilitating, enabling, or enhancing the creation, control, and playback of digital audio loops or parts. The method may comprise playing back a first midi segment of a song, the first midi segment comprising a first midi sequence repeated a predetermined number of times, transitioning to a second midi segment of the song after the first midi sequence is repeated for the predetermined number of times unless a first foot-operable switch is triggered, receiving a first activation command during the playback of the first midi segment and in response to the first activation command, modifying the predetermined number of times the first midi sequence is to be repeated wherein the first activation command is triggered based on, at least in part, a duration and frequency of a user application of the first foot-operable switch.

An apparatus can include a midi-sequence module configured to store a plurality of main midi sequences, store a plurality of fill midi sequences, store a plurality of midi segments, or playback a plurality of main midi sequences, the plurality of fill midi sequences, or the plurality of midi segments. The apparatus can also include a first foot-operable switch configured to operate the midi-sequence module, an instrument input, and a looping means configured to record a plurality of signals received from the instrument input, generate a plurality of recorded loops associated with the plurality of recorded signals, store the plurality of recorded loops, and playback each of the plurality of recorded loops. In some embodiments, the looping means may comprise a looper apparatus, or looper, which may, according to some embodiments, be self-contained.

The apparatus can also include a second foot-operable switch configured to operate the looping means, where the first foot-operable switch is configured to receive a plurality of activation commands to operate the main midi-sequence module by way of at least one of the following functions playback a main midi sequence in response to a first activation command associated with the first foot-operable switch, playback a fill midi sequence associated with currently played main midi sequence in response to a second activation command associated with the first foot-operable switch, transition to another main midi sequence not currently being played in response to a third activation command associated with the first foot-operable switch, and stop the playback of the currently played midi sequence in response to a fourth activation command associated with the first foot-operable switch. In the apparatus, each of the plurality of activation commands are triggered based on a duration and frequency of a user application of the first foot-operated switch.

A system can include a drum-machine comprising a midi-sequence module configured to store a plurality of main midi sequences, store a plurality of fill midi sequences, and playback a plurality of main midi sequences and the plurality of fill midi sequences. The system can also include a first foot-operable switch configured to receive a plurality of activation commands to operate the main midi-sequence module by way of at least one of the following functions, playback a main midi sequence in response to a first activation command associated with the first foot-operable switch, playback a fill midi sequence associated with currently played main midi sequence in response to a second activation command associated with the first foot-operable switch, transition to another main midi sequence not currently being played in response to a third activation command associated with the first foot-operable switch, and stop the playback of the currently played midi sequence in response to a fourth activation command associated with the first foot-operable switch.

In the system, each of the plurality of activation commands are triggered based on a duration and frequency of a user application of the first foot-operated switch. The system also includes an instrument signal looper having an instrument input a looping means configured to record a plurality of signals received from the instrument input, generate a plurality of recorded loops associated with the plurality of recorded signals, store the plurality of recorded loops, and playback each of the plurality of recorded loops. The system may also include a second foot-operable switch configured to receive a plurality of activation commands to operate the looping means as follows commence a recordation of the signal received from the instrument input in response to a first activation command associated with the second foot-operable switch, stop the recordation of the signal received from the instrument input in response to a second activation command associated with the second foot-operable switch, initiate the playback of the recorded signal in response to a third command associated with the second foot-operable switch, and overdub the recordation the recorded signal in response to a fourth command associated with the second foot-operable switch. In the system, each of the plurality of activation commands are triggered based on a duration and frequency of a user application of the first foot-operated switch.

Embodiments of the present disclosure may also provide an apparatus, system, or method for recording and rendering multimedia. The looping means, which may be referred to herein as a "looper," may be provided and may be configured to perform the methods disclosed herein, independently, as a part of, or in conjunction with the apparatus or the systems also disclosed herein. The looper, in a general sense, may be configured to capture a signal and play the signal in a loop as a background accompaniment such that a user of the apparatus (e.g., a musician) can perform over the top of the background loop. The captured signal may be received from, for example, an instrument such as a guitar or any apparatus producing an analog or digital signal.

The looper may provide an intuitive user interface designed to be foot-operable. In this way, a musician can operate the looper hands-free. For example, the apparatus may comprise a plurality of foot-operable controls, displays, inputs, and outputs in a portable form factor. The function and design of the looper's hardware or software components provide an advantage over conventional loopers and digital audio workstations, as the looper of the present disclosure enables the curation of both audio and video content to optimize interaction with the musician. For example, in some embodiments, the looper may enable a musician to record a song and corresponding music video with nothing more than an instrument, a mobile phone, and the looper pedal, and publish the content when rendered.

As such, the apparatus may be designed to enable a user to receive, record, display, edit, arrange, re-arrange, play, loop, extend, export and import audio and video data. Such operations may be performed during a "session", and each operation may be referred to as a "session activity." In the various embodiments described herein, this functionality may be achieved, at least in part, by systems and methods that enable the data to be organized as, for example, but not limited to, a song comprised of song parts or segments. The song parts may be comprised of tracks, and each track may be comprised of one or more layers. The various methods and systems disclosed herein incorporate such data segmentation to enable the user to intuitively and hands-free record, arrange, and perform songs comprised of both sequential and parallel tracks. In this way, the apparatus may enable a musician to record and loop tracks for a song, arrange the tracks into song parts, and during the same session, transition the playback from one song part to another, all the while recording a track (e.g., vocals or a guitar solo) on top of the transitioning song parts.

In yet further embodiments, a recorded track may comprise one or more layers. The looper may provide a plurality of layer composition methods, including, for example, a layer overdub method, a layer replacement method, and a new layer method. In brief, the layer overdub method may be operative to overlay and/or extend the duration of the first track layer, thereby dictating the duration of all subsequent layers; the layer replace method may be operative to overwrite a current layer; and the new layer method may add a new layer to the track for parallel playback. As will be detailed below, the musician may be enabled to perform these operations, as well as others, such as, but not limited to, re-recording, muting or unmuting a track an all of its layers or just a single layer within the track, all during a hands-free session. One advantage of overdubbing a track, rather than recording a new track is, in accordance to the embodiments herein, you can 'stack' multiple layers on top of the original layer without having to press rec/stop rec for each layer. In this way, the looper may be configured to keep recording new layers as it cycles around the original layer duration.

According to some embodiments, a recorded track may comprise a song part or segment comprising a sequence, such as a midi sequence and a number of times the sequence is repeated during that part or segment. The part or segment may also have fill sequences or other sounds associated with the song part, segment, or sequence, and may include other metadata. The part or segment may then be interacted with either prior to or during performance, as described herein.

Still consistent with embodiments of the disclosure, the looper or apparatus may be further operable by and with a computing device. The computing device may comprise, for example, but not limited to, a smartphone, a tablet, a midi-device, a digital instrument, a camera, or other computing means. In some embodiments, the looper or apparatus may comprise the computing device, or portions thereof. The systems disclosed herein may provide for a computer-readable medium as well as computer instructions contained within a software operatively associated with the computing device. Said software may be configured to operate the computing device for bi-directional communication with the looper, apparatus or other external devices.

In some embodiments, the aforementioned software or apparatus may be provided in the form of mobile, desktop, and/or web application operatively associated with the looper. The application, or distributed portions thereof, may be installed on the looper or apparatus so as to enable a protocol of communication with the external devices. In this way, the application may be configured to operate both the looper or apparatus and an external device, such as, for example, but not limited to, a hardware sensor (e.g., a camera). In one example instance, the camera may be operated by the application to record a video during a session (e.g., capturing a video or a video of the musician recording a track with the looper). The operation of the looper or apparatus during the session may cause the application to trigger actions on the external devices. In this way, session activity may be synchronized such that a recording of a track corresponds to, for example, a recording of the video. Each segment of the recorded video, in turn, may be synced with session activity (e.g., a recording or playback of track or song part).

Still consistent with embodiments herein, the application may be further configured to create separate video scenes for each song part. The scenes may be organized and displayed as on-screen overlays as detailed herein. In some embodiments, the application may be configured to capture and render the video such that the on-screen video overlays will change as the user changes song parts. In this way, the application may be configured to cause a playback of recorded video segments associated with each track or song part, in a repeated looped fashion such that it is synced with the associated audio of the loop, track or song part. The rendered composition may then, in turn, be embodied as a multimedia file comprised of an overlay and stitching of audio and video tracks corresponding to, for example, a recorded performance using the looper.

In further embodiments of the present disclosure, the application may further be configured to enable collaborative control of other connected devices. As on example, a plurality of loopers or apparatuses may be synchronized in, for example, playback and transition of songs and song parts. As another example, a peripheral device (e.g., a drum machine, a drum looper, or other midi-enabled device), may synchronize with one or more loopers in order to trigger commands on the looper(s). Networked collaboration and interaction, and the various applications associated therewith, are disclosed in greater detail below.

In yet further embodiments of the present disclosure, the various embodiments herein may further enable a generation of segments as described herein, which may comprise a midi sequence, or layered midi sequences, audio tracks, or layered audio tracks. These segments may be defined to be repeated for a specified number of loops. In this way, the application may enable a user to define a midi sequence and a number of loops to generate a midi segment or song part composed from the selected midi sequence and number of loops. Furthermore, fills may be added such as fill midi sequences or other sounds or effects to the segment. In some embodiments, the segments may be represented in a graphical arrangement through a user interface. The segments, along with their defined loops and fills, may comprise a song. In this way, embodiments of the present disclosure may enable a composition of a song.

In some embodiments, an "auto-pilot" mode or feature in which midi segments or song parts are automatically played in a predefined order may be provided. These segments and parts may provide, for example, but not limited to, a pre-planned drum track with different 'parts' and transitions. Additional accompaniment layers may also be provided. In this way, midi segments and/or audio tracks may be defined to be repeated for a predetermined number of loops before a transition to the next portion of the song. By interacting with a foot-operated pedal, hand-operated control, and/or switch, a user may interact with the segment or part to modify the playback parameters. For example, a foot-operated interaction may extend, shorten, skip, pause, unpause, or stop the segment. In one instance, for example, a user may change the number of times a song part is looped. Once the modification is fulfilled, the song part will transition to the subsequently defined song part, and the progression through the song will continue. In this way, unless otherwise specified, the interactions may not interfere with the general progression of the song. In other embodiments, a plurality of foot-operated pedals, hand-operated controls, and/or switches may be provided. The plurality of foot-operated pedals, hand-operated controls, and/or switches may be used to perform any of the commands and/or functions a single foot-operated pedal, hand-operated control, and/or switch may perform.

A user may also manually insert fills or other sound effects. In one implementation, such functionality enables the user the advantage of being able to play different versions of the same song each performance by varying, extending, shortening, skipping parts or by mixing up the fills.

Further, in some embodiments fill midi sequences may be played at predetermined times within a midi sequence or midi segment or may be played in response to interaction with a foot-operated pedal or switch. In this way, a user is enabled to allow an entire song to be played by initiating a series of midi segments, but is also enabled to adjust the song during playback by changing the duration of any particular segment, transitioning to another segment, or manually inserting fill sequences.

The auto-pilot feature may also be incorporated into an application or software that enables a user to configure and arrange midi segments through a user interface, such as, by way of non-limiting example, the Beatbuddy® Manager Software or any compatible software. The application may enable the user to define the progression of the song. For example, the user may choose any one or more of a main midi sequence, an audio track, a number of repetitions, and may place any desired fill midi sequences at a chosen time or measure within the repeated midi sequence or within the midi segment, and may enable the user to compose multiple segments together to form a song. This improves upon a traditional "backing track" by breaking the song into discrete parts or segments, which may comprise a looped sequence for which the number of repetitions may be dynamically changed during playback or performance using foot operated control.

During performance or playback, a user of an apparatus as disclosed herein may use the auto-pilot feature to trigger a song, including all the song parts, and at which measures any drum fills may be inserted. This gives the user all of the advantages of pre-arrangement or a "backing-track" but allows the user to dynamically control song sections or segments. A user may let the song play in its entirety, may manually insert fills or other sound effects, may initiate transitions to other song parts or segments, or may shorten, extend, pause, unpause, rearrange, or skip song parts or segments by operating one or more foot-operated switches. The commands triggered by one or more foot operated switch and/or any other midi controller may be based on, for example, a frequency and duration of the operation of said switch and/or midi controller.

In some embodiments, a "performance" mode or feature may be provided in which some or all of a performance is recorded and one or more song parts or segments are generated. The performance mode may be configured to record an instrument input and/or a resulting audio output. Further, the performance mode may be triggered and/or activated upon a detection of a predetermined sound threshold being reached. The predetermined sound threshold may be used to automatically record the performance when a user commences the performance.

The song parts further may comprise capture of audio data or midi sequence data being played during the performance, as well as any other playback controls during the performance mode. This may include, but not be limited to, a number of times that song parts or midi segments are looped, any fill midi sequences played during the performance, at what time during a song part, midi sequence or midi segment each midi fill sequence is played, and the transitions between the song parts. The controlled play back of the song parts may comprise a song. The song may then, in turn, be used as the backing layer with the "auto-pilot" mode disclosed herein. In further embodiments, the segments may then be interacted with or adjusted using an associated application or software, may be played back, and may be interacted with using an apparatus or software, such as the BeatBuddy Manager Software, as described herein. In yet further embodiments, the performance mode feature may generate and/or copy the song to a storage device. The storage device may then be used for publication, transmission, and/or uploading of the song to third-party platforms.

In some embodiments, a "round robin" mode may be provided. In this mode, variations to any midi-sequences in the song part may be randomly generated. For instance, a midi-sequence may automatically be modified based on, for example, song dynamics, such as to build tension/release, or a duration since a particular sequence was played, to provide a more natural sound. In some embodiments, after a fill sequence is played, the next fill matching fill sequence will be automatically selected from a set of associated fill sequences or samples that each substantially match, but have slight variation from, such as having slightly different timing, tone, or velocity compared to, the played fill sequence. This may aid in emphasizing or building tension and release within the song or may mimic the slight variation that would naturally occur from a musician attempting to play the same fill or other sequence twice. In this way, the resulting sound may sound more natural. According to various embodiments, the round robin feature may be applied to any midi sequence or other music file consistent with the present disclosure. Further, this feature may be applied to any layer of a song, song part, segment, or sequence, such as being applied to the drums, bass, and guitar layer of a midi segment, or any other arrangement of instruments or sound effect.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting explanatory purposes of certain embodiments detailed in the present disclosure. In the drawings:

FIG. 4B is a chart demonstrating an example of how various rhythms may be played as a function of time consistent with some embodiments of the present disclosure;

FIG. 4C is a chart demonstrating an example of how various rhythms may be played as a function of time during an auto-pilot mode consistent with some embodiments of the present disclosure;

FIG. 4D is a chart demonstrating an example of how various rhythms may be played as a function of time during a performance mode consistent with some embodiments of the present disclosure;

DETAILED DESCRIPTION

Figure 1A:
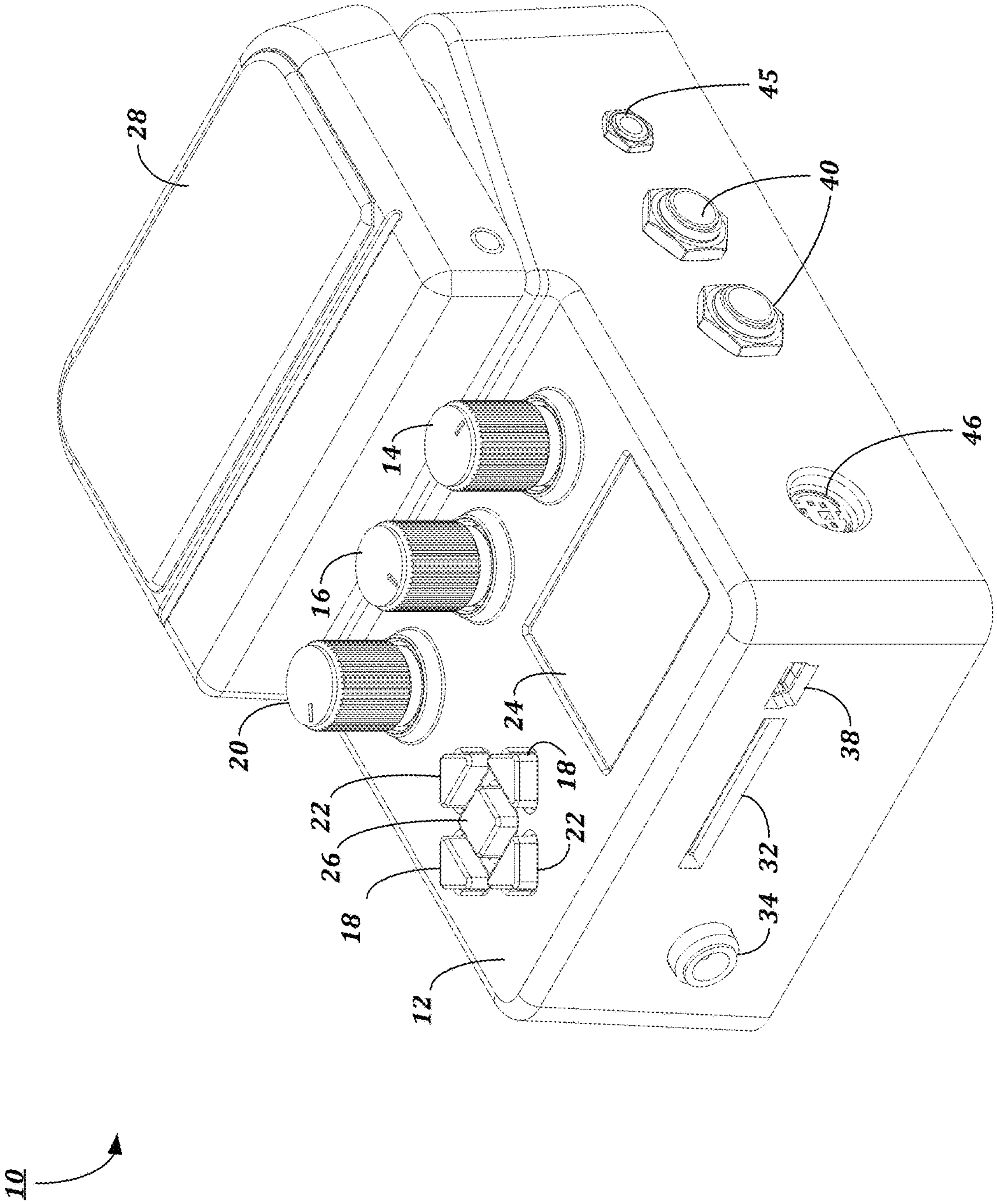
FIG. 1A illustrates a perspective view of an embodiment of an apparatus consistent with embodiments of the present disclosure.
Figure 1B:
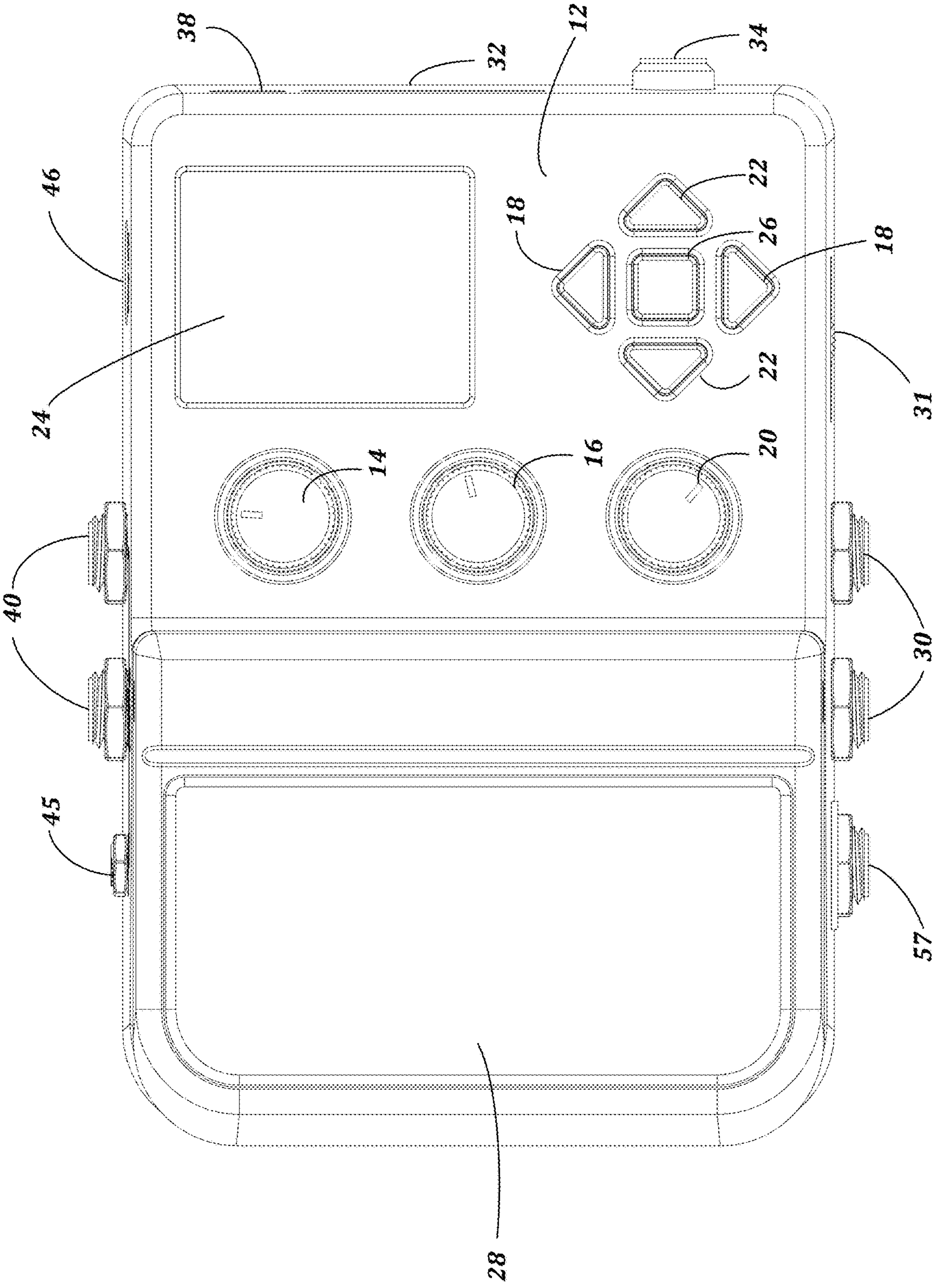
FIG. 1B illustrates a top view of an embodiment of an apparatus consistent with embodiments of the present disclosure.
Figure 1C:
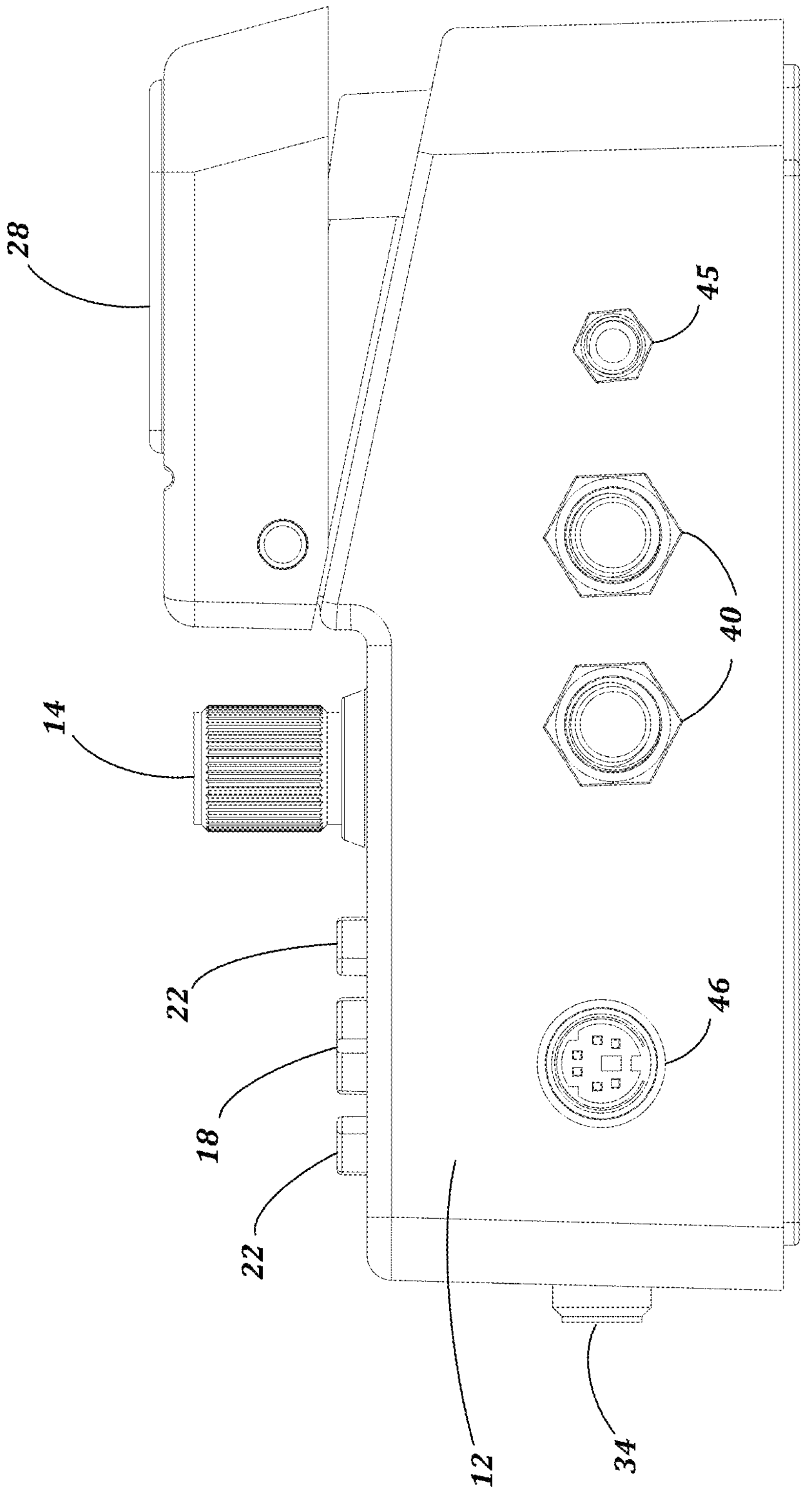
FIG. 1C illustrates a left-side view of an embodiment of an apparatus consistent with embodiments of the present disclosure.
Figure 1D:
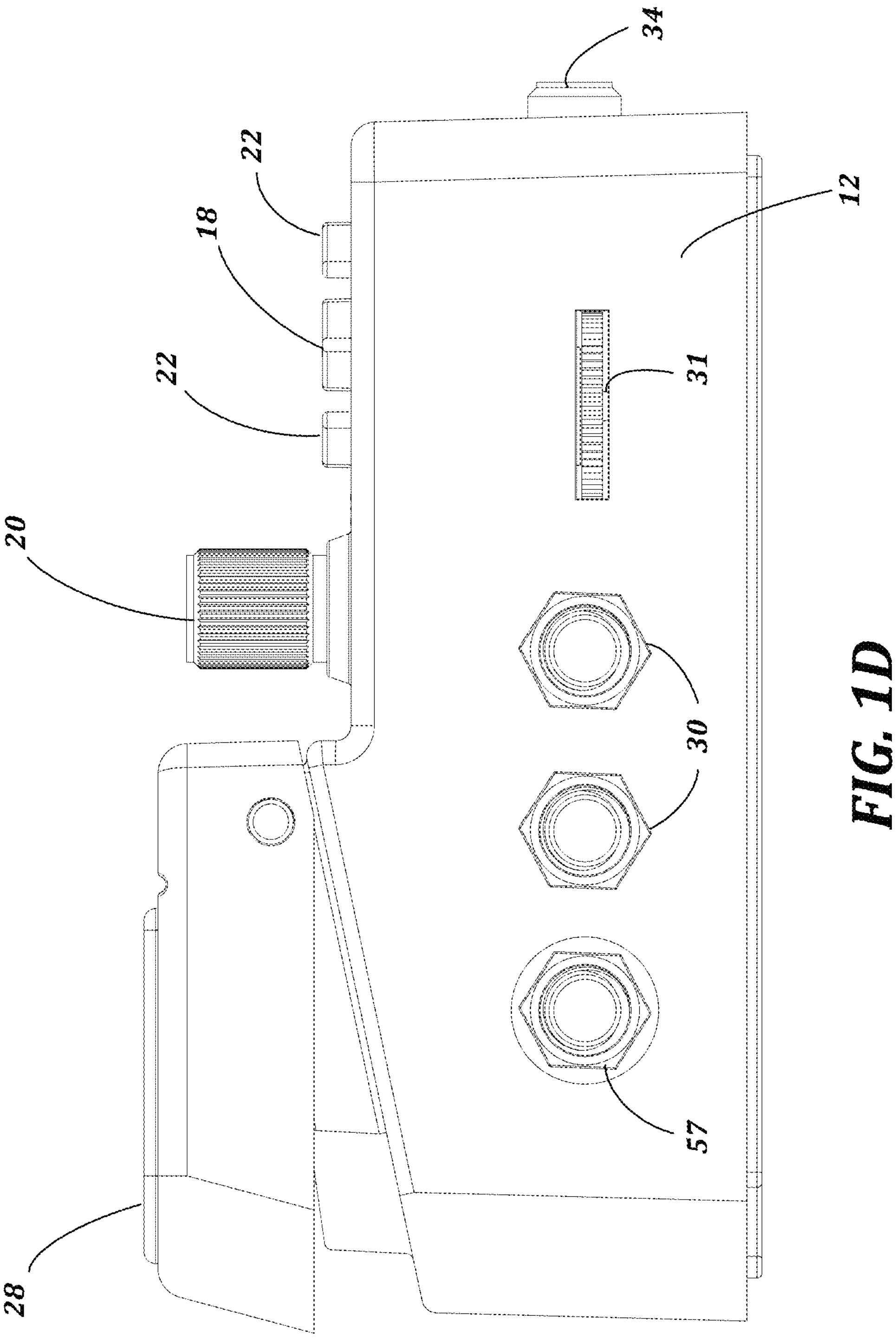
FIG. 1D illustrates a right-side view of an embodiment of an apparatus consistent with embodiments of the present disclosure.
Figure 1E:
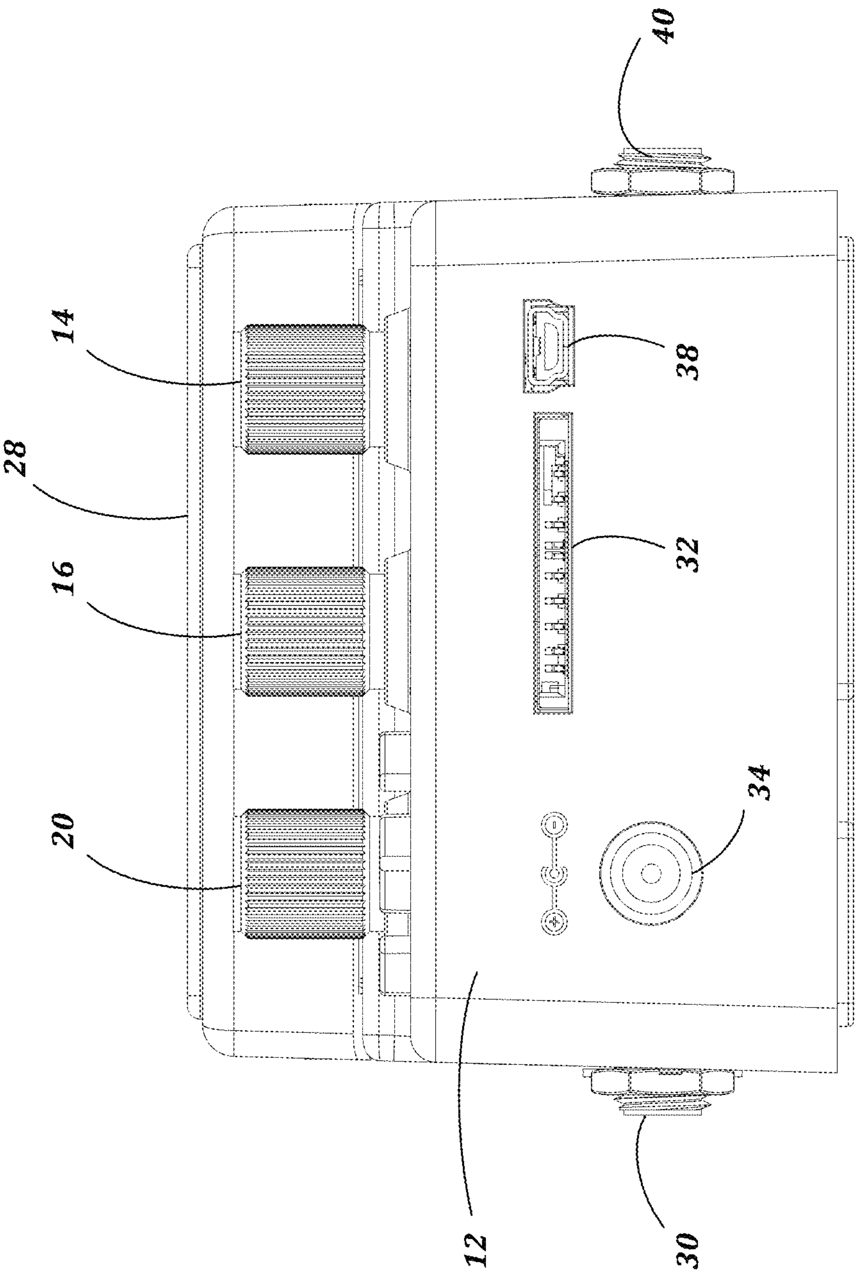
FIG. 1E illustrates a back view of an embodiment of an apparatus consistent with embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of drumming midi capability, embodiments of the present disclosure are not limited to use only in this context. For instance, other file-types (e.g., WAV and MP3) as well as other instrument types are considered to be within the scope of the present disclosure.

I. Platform/Apparatus Overview

This brief overview is provided to introduce a selection of concepts in a simplified form that are further described below. This brief overview is not intended to identify key features or essential features of the claimed subject matter. Nor is this brief overview intended to be used to limit the claimed subject matter's scope.

This brief overview is provided to introduce a selection of concepts in a simplified form that are further described below. This brief overview is not intended to identify key features or essential features of the claimed subject matter. Nor is this brief overview intended to be used to limit the claimed subject matter's scope.

Embodiments of the present disclosure provide methods, apparatus, and systems for music generation and collaboration (collectively referred to herein as a "platform" for music generation and collaboration). The platform may be enabled to, but not limited to, for example, receive, record, display, edit, arrange, re-arrange, play, loop, extend, export and import audio data. Consistent with the various embodiments disclosed herein, the platform may comprise a user interface that enables a hands-free composition, management, navigation and performance of, for example, but not limited to, an audio production associated with the audio data (referred to herein as a "song"). As will be disclosed with greater detail below, these components may then be shared with other platform users and used interchangeably between song compositions, productions, and performances.

Embodiments of the present disclosure may provide an improved foot-operated signal processing apparatus. FIGS. 1A-1E and FIGS. 2-3 illustrate various embodiments. The apparatus may be in the form of a foot-operated pedal. FIGS. 1A-1E illustrate various embodiments of the foot-operated pedal, and will be discussed in greater detail below. The apparatus may be operative with, for example, computer programmable controls and switches that are customizable to perform various functions. For example, upon a user's operation of at least one of the controls and switches, the apparatus may be configured to, among other functions, interject various sequential midi fills or audio fills in a plurality of cyclic percussion rhythm sequences.

Figure 2:
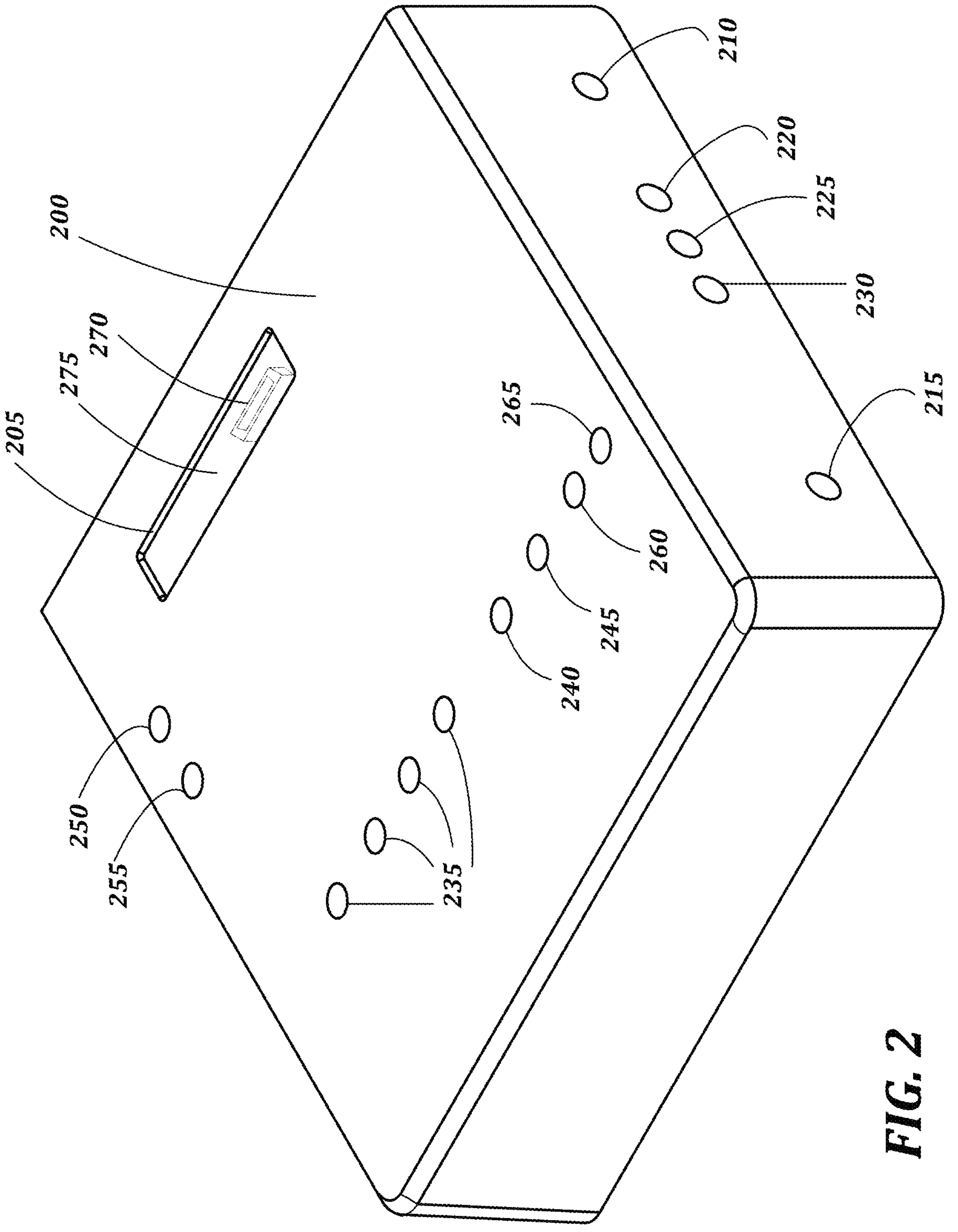
FIG. 2 is a diagram of another embodiment of an apparatus consistent with embodiments of the present disclosure.

Referring to FIG. 2, an apparatus consistent with embodiments of the present disclosure may consist of a casing 200. Casing 200 may be a metal casing that is adapted to be placed on, for example, the floor. Casing 200 may comprise multiple switches that the user may operate. The switches may comprise buttons that the user may press with his foot. A depression of the switches may enable the user to control the various functions and capabilities of the apparatus.

Figure 7:
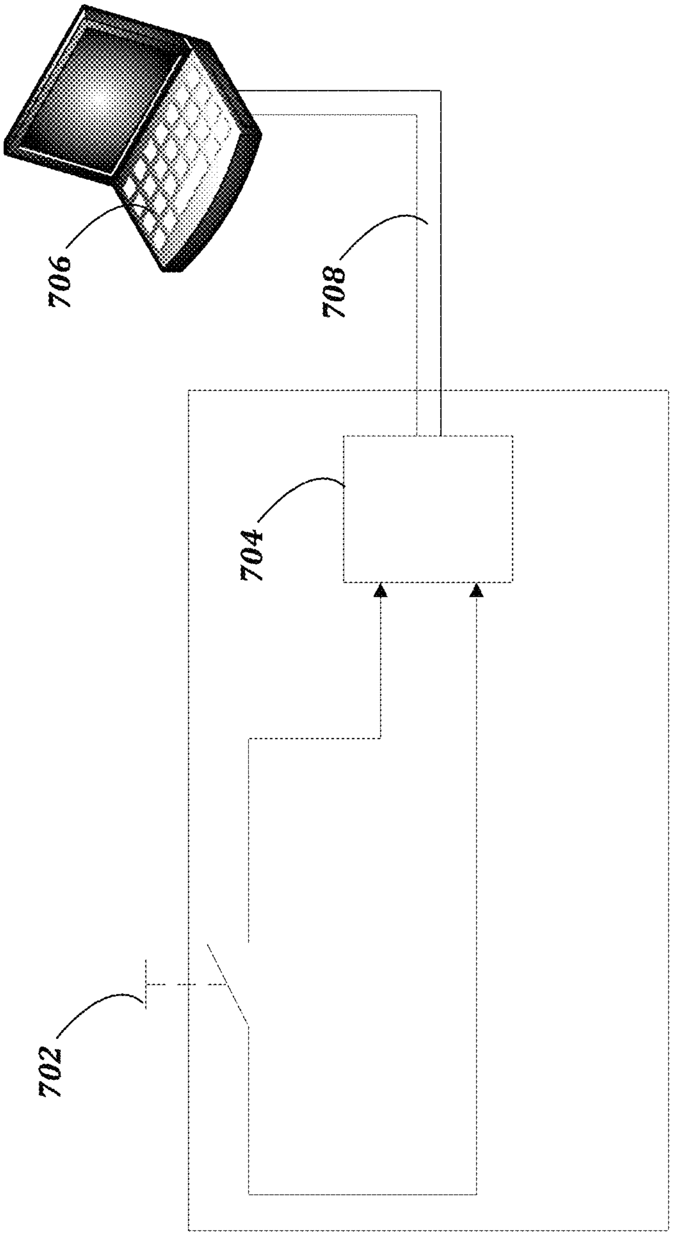
FIG. 7 illustrates a block diagram of an apparatus consistent with embodiments of the present disclosure.

According to some embodiments, an apparatus for facilitating control of midi sequence generation, as exemplarily illustrated in FIG. 7 is also provided. The apparatus may include a foot-operated switch 702. Further, the apparatus may include a switch port 704 configured to connected, through a wired and/or a wireless connection, to a mobile device 706 such as, for example, but not limited to, a laptop computer, a desktop computer, a smartphone, a tablet computer, a media player and so on.

According to some embodiments, control of midi segment generation may be provided. The generated midi segments may comprise a midi sequence that is repeated for a number of loops that is predetermined by the user. The midi segments may also comprise one or more fill midi sequences associated with the midi sequence and located at a predetermined position within a midi segment, as described further below.

The foot-operated switch 702 may be electrically coupled to the switch port 704 in order to facilitate detection of a state of the foot-operated switch 702 by the mobile device 706.

In an instance, the foot-operated switch 702 may include an electric switch whose terminals may be connected to a pair of output terminals of the switch port 704. Accordingly, when the switch port 704 is coupled to the mobile device 706 through a cable 708, the mobile device 706 may be able to detect a state of the electric switch by applying an electric voltage across the terminals of the cable 708 and detecting presence of an electric current. Further, the electric switch may be so configured that the mobile device 706 may be able to detect one or more of an ON state, an OFF state, a duration of either ON state or OFF state, a sequence of ON and OFF states, a rate of ON and OFF states in a time period and so on.

In another instance, the apparatus may include an encoder to encode one or more states of the foot-operated switch 702 into a signal. Further, an output of the encoder may be coupled to the switch port 704. Accordingly, when a cable 708 is connected between the switch port 704 and the mobile device 706, the signal representing the one or more states of the foot-operated switch 702 may be transmitted to the mobile device 706.

In yet another instance, the switch port 704 may include a wireless transmitter such as, for example, a Bluetooth transmitter, coupled to the output of the encoder. Accordingly, when the mobile device 706 such as a smartphone is paired with the apparatus, the signal representing the one or more states of the foot-operated switch 702 may be transmitted to the mobile device 706.

Accordingly, in some embodiments, in order to operate the encoder and/or the transmitter, the apparatus may include a power source such as a battery. Alternatively, the apparatus may receive power through a power port included in the apparatus. Further, in other embodiments, the apparatus may receive power through the switch port 704 configured to be coupled to the mobile device 706.

Further, in some embodiments, the mobile device 706 may be configured to generate one or more midi sequences based on the one or more states of the foot-operated switch 702. Accordingly, the mobile device may include a mini-sequence module configured to generate midi-sequences. For instance, the mobile device may be a laptop computer including a processor and memory containing a sound synthesis software. Further, the sound synthesis software may be executable on the processor in order to generate the one or more midi-sequences based on the one or more states of the foot-operated switch 702. Further, the mobile device may include an output port (not shown in the figure) configured to be electrically connected with a sound processing device, such as for example, a sound reproducing device. Accordingly, the one or more midi sequences generated may be converted into sounds. Alternatively, the output port may be electrical coupled to a mixer circuit which may also receive other electronic signals corresponding to such as, for example, vocals and/or instrument sounds.

Further, in some embodiments, the midi-sequence generated by the mobile device 706 may be provided to the apparatus. Accordingly, the apparatus may further include a midi input port configured to be connectable to the mobile device 706. Furthermore, the midi-sequence generated by the mobile device 706 may be receivable through the midi input port. For instance, the switch port 704 may include the midi input port. Accordingly, when the mobile device 706 is connected to the apparatus through, for example, cable 708, the midi sequence generated by the mobile device 706 may be available at the midi input port.

Furthermore, in some instances, the apparatus may include an instrument input port configured to receive an electronic signal from a musical instrument. Additionally, the apparatus may include a mixer for mixing each of the electronic signal from the musical instrument and the midi-sequence. Accordingly, a mixed signal may be generated at an output of the mixer, which may be, for example, provided to a sound reproduction device.

The signal received from the musical instrument can be processed with various digital signal processing techniques. For instance, a built-in tuning module may indicate when a signal coming from a guitar is out-of-tune. The built-in tuning module may indicate via a display the offset of the frequency from the nearest in-tune frequency for a particular guitar tuning. The particular tuning that serves as the baseline for the tuning module may be specified by the user. Other signal processing techniques, such as effects that may be added with conventional guitar pedals are possible to integrate with the apparatus of the present disclosure. Additional footswitches, knobs, and controls may be implemented within the apparatus to enable a user to operate the additional signal processing.

Still consistent with embodiments of the disclosure, the received signal may be processed by a beat detection module. The beat detection module may be configured to derive various aspects of the received signal including, but not limited to, for example, the tempo and rhythm played by the musical instrument. In turn, the beat detection module can adapt a beat that matches the tempo and rhythm played by the musical instrument. In this way, the user may just need to indicate, for example, by operating the apparatus, when the apparatus should activate the beat adapted by the beat detection module. The various beat control features disclosed herein would be operable in conjunction with the adapted beat just as they would be applicable to a pre-programmed beat.

Still consistent with various embodiments, the apparatus may further comprise a docking station 205 as illustrated in FIG. 2. Docking station 205 may be configured to enable a mobile computing device to be docked and adapted to the apparatus. In turn, the docking of the mobile computing device may expand the operational and functional capacity of the apparatus.

For example, docking station 205 may enable a user of the apparatus to dock his smartphone, tablet computer or other similar mobile device (collectively referred to herein as "mobile device") to the apparatus. The mobile device may be configured with software to enable operative communication between the mobile device and the apparatus. Once docketed, the mobile device may be used to display of information associated with the operation of the apparatus. Moreover, the mobile device may be further enabled to act as a control panel to adjust various settings and parameters of the apparatus. Docking station 205 may also enable a user to dock an external LCD screen to create a more easily visible display of the contents of display 24.

Accordingly, in some embodiments, as exemplarily illustrated in FIG. 2, the docking station may include a USB docking station 205. One functionality offered by the USB docking station 205 may be to enable docking of mobile devices equipped with one or more serial ports, such as, for example, but not limited to, USB 1.x, USB 2.x, USB 3.x, USB Type-A, Type-B, Type-C, mini-USB and micro-USB. Accordingly, the USB docking station 205 may include one or more of USB connectors 270 which may be a female connector and/or a male connector depending on a corresponding one or more USB connectors included in the mobile device. For example, generally the mobile devices, such as a smartphone, may include a female USB connector disposed on an edge of the mobile device. Accordingly, the USB docking station 205 may include a male USB connector 270 configured to mate with the female USB connector of the mobile device. It should be understood that, although USB is referenced throughout the specification, any connector type capable of communicating data between the connected devices may be used. As such, terms used herein, USB connector or USB docking station and the like, are not meant to be restrictive but only illustrative of an example connection between devices.

Further, in some embodiments, the one or more USB connectors 270 may be disposed on one or more locations on the apparatus. For example, as illustrated, the apparatus may include a slot 275 configured to receive a portion of the mobile device. Accordingly, the one or more USB connectors 270 may be disposed at a bottom portion of the slot 275 such that when the mobile device is placed within the slot 275, the USB connector 270 of the docking station 205 may mate with the USB connector included in the mobile device. Accordingly, in some embodiments, the placement of the one or more USB connectors 270 may be configured to be compatible with one or more designated models of the mobile device. For example, different models of the mobile device belonging to a manufacturer may be characterized by a predetermined position of the USB connector included in the mobile device. For instance, in most cases the USB connector included in the mobile device is situated at a top edge or a bottom edge of the mobile device. Further, the USB connector included in the mobile device may be situated at a predetermined distance from a corner of the mobile device. Accordingly, the USB connector 270 may be configured to be situated at a position so as to facilitate proper mating with the USB connector included in the mobile device when the mobile device is docked into the USB docking station 205.

Further, in some embodiments, the USB connector 270 may be movable. Accordingly, a position of the USB connector 270 in relation to the slot 275 of the USB docking station may be moved either manually and/or automatically using a motor. The movability of the USB connector 270 may facilitate docking of the mobile device independent of a model/manufacturer of the mobile device. For instance, the USB connector 270 may be movably attached to a rail running along the length of the slot 275. Further, in some instances, the USB connector may also be attached to a rail running along the width of the slot 275. Further, the USB connector 270 may be electrically coupled to the rail which may in turn be coupled to the electrical circuitry included in the apparatus. Accordingly, a user may manually move the USB connector 270 over the rail at a position to match the position of the USB connector included in the mobile device. As a result, the mobile device may be successfully, docked to the USB docking station.

Alternatively, in some embodiments, the apparatus may be configured to automatically detect the manufacturer/make of the mobile device through wireless communication with the mobile device (e.g., through Bluetooth or NFC). For example, the mobile device may transmit an identifier such as, IMEI number, which may be used to determine the model of the mobile device. Subsequently, the apparatus may determine a position of the USB connector included in the mobile device in relation to the body of the mobile device by querying a database of mobile device specifications. Accordingly, the apparatus may be configured to automatically activate, for example, a linear motor coupled to the USB connector 270 in order to bring the USB connector 270 at a position suitable for mating with the USB connector included in the mobile device.

Further, in some embodiments, the slot 275 included in the apparatus may also be physically alterable in dimensions. For instance, one or more dimensions such as, a width, a length and a depth of the slot 275 may be alterable by means by motors (not shown in figure). For instance, each wall of the slot 275 may be placed on a rail and coupled to a linear motor. Accordingly, each wall of the slot 275 may be movable back and forth and held at a position according to provide a slot 275 with required dimensions. Additionally, the apparatus may be configured to alter the dimensions of the slot 275 in accordance with dimensions of the mobile device. For instance, as the mobile device is brought in proximity to the apparatus, the apparatus may establish a wireless connection with the mobile device in order to receive an identifier from the mobile device. The identifier, such as, for example a hardware identifier, may facilitate the apparatus to determine the manufacturer and/or model of the mobile device. Further, based on the identifier, the apparatus may determine dimensions of the mobile device by querying a database of mobile device specifications. Accordingly, the apparatus may be configured to actuate the linear motors coupled to the walls of the slot 275 in order to alter dimensions of the slot 275 to accommodate the mobile device. As a result, a wide variety of mobile devices may be docked to the USB docking station 205.

Still consistent with embodiments of the present disclosure, the mobile device may be configured to serve as the core digital processing center of the apparatus. Because many users already own mobile devices, integrating their mobile device as the processing core and display for the apparatus may reduce the manufacturing cost of the apparatus, as the performance of many functions may be handed off to the mobile device.

In various embodiments, the apparatus may comprise a wireless communications unit such as, for example, but not limited to, a Bluetooth or Wi-Fi compatible communications module. With a wireless communications unit, the apparatus may be enabled to communicate wirelessly with the mobile device. In this way, the mobile device may not need to be physically docked to the apparatus, thereby improving the convenience of the mobile device's cooperation with the apparatus as the user may simply place the mobile device within wireless communication range to the apparatus.

The apparatus may further comprise a power port 210 as an input power source, an instrument input port 215 as a signal input source, adapted to receive a signal from a musical instrument, and an output port 220 where a processed signal may be delivered (e.g., a signal generated by the apparatus, in addition to or in place of, the musical instrument's originally produced signal).

Controls on the apparatus and/or the software of a connected mobile device, may enable a user to adjust various parameters of the output signal. For example, the user may be enabled to adjust the volume balance between the generated sound of the apparatus and the originally produced signal of the instrument. Moreover, the apparatus may comprise an instrument only output port 225 that only sends the instrument signal, thereby only delivering the signal generated by the instrument. In this way, the processed signal (e.g., midi-percussion generator signal) and the music generated by the instrument may be routed to separate channels. This may be advantageous in scenarios where the user would like to have different signals go to different speakers, as percussion and instrument music have different sonic characteristics and benefit from different sonic processing and speaker systems. Still consistent with embodiments of the present disclosure, the apparatus may comprise yet another output port 230 for delivering a generated signal alone, without the instrument signal.

Still consistent with embodiments of the present disclosure, the apparatus may comprise a plurality of sequence switches 235. Each of the percussion sequence switches may be configured to trigger a midi or audio file (e.g., a percussion loop) that is associated with the switch. The sequence may be looped continuously until the user triggers another switch. The signal generated by the switch may be outputted through ports 225 and/or 230. In this way, a user may be enabled to initiate any of the pre-configured midi or audio sequences (e.g., percussion loops) in any order he chooses, rather than being forced into a predetermined order. Consistent with embodiments of the present disclosure, a user may use a connected mobile device and its corresponding software to configure which sequence switches should be associated with which midi-sequences, fills, accents, and various other parameters.

A single tap of the percussion switch may initiate a midi-sequence loop. In some embodiments, midi-sequence loops may be associated with various fills such as, for example, intro fills, break fills, transition fills, and ending fills. In some embodiments, the midi-sequence loop comprises a midi segment including a main midi sequence that is repeated a predetermined number of times and one of more fill midi sequences associated therewith. A fill switch 240, upon activation, may be enabled to trigger the playing of a fill associated with the midi-sequence. Different variables may control whether or not a midi-sequence's associated fill is played. For example, an intro fill may only be played if the midi-sequence is the first loop to be played, simulating a drummer starting to drum to a song with an intro loop. Alternatively, individual switches may be programmed to trigger individual types of fills, such as, but not limited to, for example, an intro fill, ending fill, or different styles of fills such as decreasing or increasing in intensity.

A single tap of a different percussion sequence switch may start the main midi-sequence loop associated with the activated switch. However, the sequence loop may be commenced at the end of the corresponding musical bar to keep the musical timing correct. Still consistent with embodiments of the present disclosure, if the user holds down a switch 235, a transition fill may be played in a loop until the switch is released and then the apparatus may transition to the main midi-sequence loop associated with that switch. This allows the user to decide whether or not he wishes to have a transition fill or not when changing main midi-sequence loops. The initiated transition fills can further be customized to depend on which main midi-sequence loops are being switched between, to have a more natural and realistic transition between different types of beats. Consistent with embodiments of the present disclosure, a user may use a connected mobile device and its corresponding software to configure which sequence switches should be associated with which transition fills, as well as various other parameters. In some embodiments, separate dedicated switches may be used to end with either an ending fill or immediately with a single tap for ease of use. Additional switches may be used to insert accent hits, such as cymbal crashes or hand claps, or to pause and un-pause the beat to create rhythmic drum breaks.

Each main midi-sequence loop may have its own set of fills associated with it, which may be triggered by pressing fill switch 240. Fill switch 240 may be configured to enable a single tap on any of sequence switches 235 to initiate the transition between main midi-sequence loops without a transition fill. A double tap on any of sequence switches 235 may cause the midi-sequence playback to stop with an ending fill, if present, or at the end of the bar, if the ending fill is not present. A triple tap on any of sequence switches 235 may cause the midi-sequence playback to stop without an ending fill. In some embodiments of the present disclosure, a rate of the double and triple tap commands to end the midi-sequence may be configured to correspond to a rate of the song's tempo, such that a user may double tap or triple tap to the tempo to the end of the song without getting confused by being forced to tap to at any other tempo. In some embodiments, the main pedal may be held down to affect a transition fill between song parts, without separately selecting a fill switch.

In some embodiments, as will be greater detailed with reference to FIGS. 1A-1E, the apparatus may comprise a single pedal acting as a foot-operated switch. The switch may, as with the midi-sequence switches 235, be tapped to initiate the playing of a midi-sequence, transition to a pre-programmed subsequent midi-sequence, or, among other functions that will be detailed below, end the playback of a midi-sequence. In these embodiments, three quick taps of pedal 28 may be operative to deactivate the midi-sequence currently played by the apparatus.

Still consistent with embodiments of the present disclosure, the apparatus may further comprise an accent hit switch 245 which can be associated with different sounds (e.g., midi or audio) to trigger 'one-off' sounds such as, for example, a hand clap or cymbal crash which may or may not be associated with the main midi-sequence loop. The bank up 250 and bank down 255 switches may be configured to change the main midi-sequence loops, and consequently their associated fills to allow the user to have the capability of choosing among many more main midi-sequence loops. Consistent with embodiments of the present disclosure, a user may use a connected mobile device and its corresponding software to configure and store a plurality of midi-sequences and which sequence switches should be associated with the sequences for each bank.

Consistent with embodiments of the present disclosure, the apparatus may further comprise a looper switch 260. Looper switch 260 may be configured to record a loop of a signal received in the input port of the device. The recorded loop may be synced (or quantized) with a tempo or a MIDI-sequence selected on the device. In this way, the loop may always be recorded in-time with a particular tempo and/or MIDI-sequence.

A single press of looper switch 260 may signal the apparatus to start recording the signal received from the instrument input. The signal from the instrument input may be any signal, not just a clean musical instrument input. A subsequent press of looper switch 260 may stop the recording and initiate playback. A third press of the looper switch 260 may start an overdub, recording over the originally recorded loop.

A quick double tap of the looper switch 260 stops the recorded loop and optionally, the percussion as well. A user may determine the rate and functionality of the double tap of the looper switch 260 through a user interface associated with the apparatus. A user may also optionally set the loop playback to end when the percussion loop is changed to allow the music of the instrument to be changed as the user moves to a different section of a song. In yet further embodiments, the apparatus may automatically initiate recording of a new loop of the signal received from the instrument as the new percussion loop begins to allow the user to seamlessly and easily begin recording a new looped musical sequence in the new section of the song. Further still, in various embodiments, the apparatus may comprise an additional switch 265 which, when activated, may allow the user to toggle between the options of having the instrument recorded loop end at a percussion loop change and whether or not, for example, to start recording a new instrument loop with the new percussion loop. Embodiments of the present disclosure may enable the syncing of the recorded looped instrument sound with the generated midi-sequence so that the instrument loop starts and ends exactly on the beat of the midi-sequence loop. In this way, the apparatus may prevent the instrument recorded loop playback from going out of sync with the midi-sequence loop.

In accordance with some embodiments, the apparatus may be configured to enable a user to trigger a midi-sequence from a plurality of midi-sequences as per the user's need. Accordingly, the apparatus may include one or more foot-operated switches configured to operate the midi-sequence module. Further, the one or more foot-operated switches may be configured to non-sequentially trigger one or more main midi-sequences from a plurality of main midi-sequences.

In other words, a user may be enabled to activate the one or more foot-operated switches to trigger the plurality of main midi-sequences in any arbitrary order as per the user's need. For example, consider a scenario where the midi-sequence module is configured to generate a plurality of main midi-sequences numbered 1, 2 and 3. Accordingly, in one instance, the one or more foot-operated switches may enable the user to trigger main midi-sequence 1, followed by main midi-sequence 3 without necessarily triggering main midi-sequence 2 in between. Similarly, in another instance, the user may be able to trigger main midi-sequence 3 followed by main midi-sequence 2 and then again trigger main midi-sequence 3.

Figure 8:
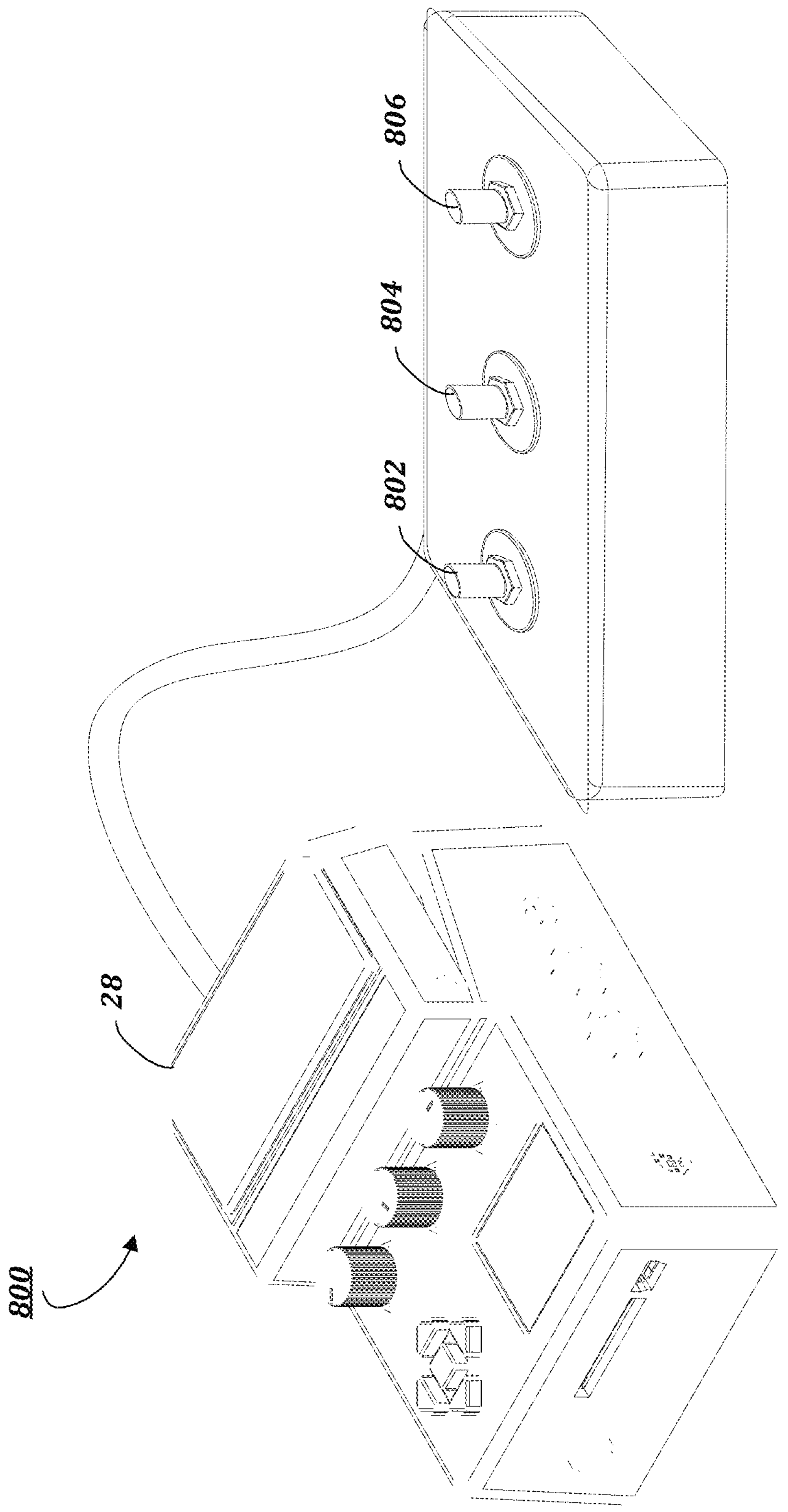
FIG. 8 illustrates a perspective view of an apparatus consistent with embodiments of the present disclosure.

For instance, in some embodiments, the one or more foot-operated switches may include a primary foot-operated switch 28, such as for example, as illustrated in FIG. 8. Further, the primary foot-operated switch 28 may be configured to non-sequentially trigger the one or more main midi-sequence. Furthermore, each main midi-sequence may be triggered by a corresponding predetermined number of activations of the primary foot-operated switch 28. Additionally, consecutive activations of the primary foot-operated switch 28 are separated by at most a predetermined time duration, such as, for example, but not limited to, 0.3 seconds.

Additionally, in some embodiments, each main midi-sequence may be associated with a non-zero natural number such as 1, 2, 3 and so on. Further, performing a number of activations of the primary foot-operated switch 28 may trigger a main midi-sequence corresponding to the number. For example, consider a scenario where the midi sequence module is configured to generate five different main midi-sequences. Accordingly, the main midi-sequences may be associated with the numbers 1, 2, 3, 4 and 5. Consequently, in order to trigger, for instance, the main midi-sequence numbered 3, the user may perform three activations the foot-operated switch 28 in rapid succession. Similarly, while the main midi-sequence numbered 3 is being played, the user may perform a single activation of the foot-operated switch 28 and cause the main midi-sequence numbered 1 to be triggered.

Further, in some embodiments, the one or more foot-operated switches may include a primary foot-operated switch 28 and a plurality of secondary foot-operated switches, such as secondary foot-operated switches 802, 804 and 806 as exemplarily illustrated in FIG. 8. Further, each secondary foot-operated switch may be associated with a main midi-sequence. For example, the plurality of secondary foot-operated switches 802, 804 and 806 may be associated with main midi-sequence numbered 1, 2 and 3, respectively. Accordingly, the user may activate, for example, the secondary foot-operated switch 802 to trigger main midi-sequence 1 and followed by activating the foot-operated switch 806 to trigger main midi-sequence 3.

In some embodiments, the one or more foot-operated switches may include a first set of switches, which when activated, may be configured to trigger a corresponding main midi-sequence. Further, the one or more foot-operated switches may include a second switch, which when activated, may be configured to trigger a fill-in midi-sequence to be interjected into a main midi-sequence. Furthermore, the one or more foot-operated switches may include a third switch, which when activated, may be configured to insert an accent sound including one or more of a midi file and an audio file. Additionally, the one or more foot-operated switches may include a fourth switch enabled to record loops associated with the signal received from the musical instrument. Further, the apparatus may be configured to sync the loops recorded by an activation of the fourth switch with a timing of a main midi-sequence.

In some embodiments, the primary foot operated switch 28 may be configured to trigger one or more midi segments. Each midi segment may be comprised of a main midi sequence that is repeated for a number of loops that may be predetermined by a user. After each midi segment is complete, a transition to the next midi segment may automatically occur. In some embodiments, the apparatus may be configured to enable a user to trigger a midi segment from a plurality of midi segments as per the user's need. Further, the one or more foot-operated switches may be configured to non-sequentially trigger one or more midi segments from a plurality of midi segments. Additionally, in some embodiments, each midi segment may be associated with a non-zero natural number such as 1, 2, 3 and so on. Further, performing a number of activations of the primary foot-operated switch 28 may trigger a midi segment corresponding to the number. In other words, transitions between midi segments may occur automatically, or a user may be enabled to activate the one or more foot-operated switches to trigger the plurality of midi segments in any arbitrary order as per the user's need. The commands triggered by the one or more foot switches may be based on a frequency and a duration of each activation.

In some embodiments, primary foot-operated switches 28 may be configured to restart a midi segment that is currently being played. In some embodiments, the one or more foot-operated switches may be configured to pause or unpause a midi segment that is currently being played. In this way, a user may be enabled to extend a midi segment by, for example, restarting the segment to increase the number of loops, or by pausing and unpausing the segment. In some embodiments, the restarting the midi segment or the pausing or unpausing of the midi segment may automatically occur synchronistically with the midi segment, such as restarting, pausing, or unpausing at the end of a measure of the repeated main midi section. According to various embodiments, each of these actions may be performed by a combination of one or more taps, presses, or holds of the one or more foot-operated switches.

Embodiments of the present disclosure may provide a self-enclosed, foot-operated apparatus that enables, by way of non-limiting example, a user to interactively generate loops in both parallel and sequence, arrange the loops into song parts (groups of parallel loops), arrange song parts into songs, navigate between song parts, and extend the length of a loop with a longer overdub. The apparatus may further include a display that provides meaningful visual representations to the user with regard to the aforementioned functions. As described below, according to some embodiments, the apparatus may comprise a self-contained looper having features as described herein, or a looper may comprise a component of an apparatus having features as described herein. Certain features disclosed herein in reference to a looper are disclosed in reference by way of example only. Consistent with this disclosure, such features may also be incorporated into an apparatus that does not include a looper.

Embodiments of the present disclosure may provide a "performance" mode or feature of operation. It should be noted that the term "performance" is only a label and is not to limit the characterization of the functionality disclosed in association therewith. Performance mode may enable a user of the apparatus to record and render a continuous multi-media file encompassing all song parts, where the user can continue the playback of recorded song parts/tracks/segments while performing, for example, another track layer (e.g., 'guitar solo') that is to overlay the background tracks. In this way, unlike conventional loopers, the looper disclosed herein may record a guitar solo over the looped background tracks. Furthermore, during performance mode, the user can engage in ordinary session activity (e.g., transition from one song part or segment to the next, turn on/off different tracks or layers, and operate other functions of the apparatus), all the while recording, for example, the guitar solo during the performance session. The session activity and the recorded guitar solo may be then rendered as a track. Further, some or all of the session activity may be recorded as a segment. Thus, performance sequences may be saved and reused for later performances. For example, a midi sequence may be played during the session and repeated for a discrete number of times with fill sequences inserted, and the performed sequences and number of repetitions and time of any associated fills may be recorded as a song segment or midi segment. These performance sequences may then, in turn, be used as an accompanying track or tracks operated by the auto-pilot functionality disclosed herein, along with, in some embodiments, round-robin functionality.

Such sequences may be, but are not limited to, a midi sequence or midi fill sequence. Once complete, a rendering of the song with the song parts, song segments, or the guitar solo may be published to local media, cloud-based media or social networks in accordance with embodiments described herein. Further, segments may be interacted with via software or an application, as described herein, to add or remove layers or fills, change the number of loops of a sequence, or manipulate the segment in other ways known in the art.

The apparatus may further enable, by way of non-limiting example, the user to share loops, song parts, song segments, and songs generated through the platform. The recipients may make modifications, integrate, and build on top of the loops or segments and share them back with the users. In some embodiments, the apparatus may be networked with other similar devices over LAN, WAN, or other connections. In this way, the platform may enable collaboration between the connected users and devices associated with the platform, including the operation and control of those devices over a network connection. The platform may also enable a user to manage the composition and audio files on the device as well as on content that resides on remote servers.

Embodiments of the present disclosure may enable a recording and playback of a video signal and video data associated with each track. For example, just as the platform can receive, capture, arrange, playback, loop, and overdub an audio track, the platform may be configured to receive, capture, arrange, playback, loop, and overdub a video track. The video track may be obtained by, for example, a connection to a recording device. The recording device may be, for example, but not limited to, a computing device (e.g., a smartphone, a tablet, or computer) or a remotely operated camera. The computing device may comprise an application operative to communicate with the looping apparatus.

The application may be configured to operate the computing device so as to capture a video track that is to be associated with an audio track. In this way, an end-user may both record an audio feed and a video feed associated with the audio feed, either simultaneously or sequentially, consistent with the operation of the foot-operated apparatus Still consistent with embodiments of the disclosure, just as the audio track may looped by the platform, so too may the video track be looped along with the corresponding track that the audio is associated with. Further still, just as a song part may comprise multiple audio-tracks looped and played back in parallel, a song part may comprise multiple video-tracks associated with the audio tracks contained therein, looped and played back in parallel. In some embodiments, a song part may be associated with corresponding video track or tracks, but not equivalent to the same quantity of audio tracks. That is, not every audio track needs to be associated with a video track.

Accordingly, embodiments of the present disclosure may comprise a digital signal processing module configured to receive, process, and output images and video signals. In some embodiments, the platform may further comprise a video capture module integrated with, or in operative communication with, the apparatus. It is anticipated that all of the disclosed functionality with regard to audio tracks may be conceivably compatible with the video tracks, with modifications made where necessary by one of ordinary skill in the field of the present disclosure.

As one example, a user of the apparatus can install a smartphone app that syncs with the functionality with the apparatus and captures a video of the user performing the song. Then, each time the particular song part or tracking within a song part is played back, the corresponding video associated with the song part or track is also played. In this way, when a song part is comprised of, for example, six song tracks, all six videos associated with each track is played back synchronously with the audio. In turn, when one track within a song part is turned off, the video associated with the track is also turned off. Furthermore, when the user transitions from one song part to the next song part, the video for the new tracks is played back. In some embodiments, the video files may be stored along with the song and tied to the song such that the playback of any song part causes a playback of the corresponding video file(s) associated with the song. In such embodiments, the video output may be outputted from the apparatus or by a separate device in communication with the apparatus. It should also be noted that the 'live' playing is also recorded and played back on video (e.g., the guitar solo that isn't recorded into a loop, but still recorded as video and audio data in the rendering).

Still consistent with the embodiments disclosed herein, the song may be rendered as both a multimedia file comprised of audio tracks and video tracks. The composition of the multimedia file may be dependent on, in some embodiments, the arrangement the user has performed and recorded the song. As detailed below, the video output may be presented on each frame of the media file in various ways.

Some embodiments of the present disclosure may include a "round robin" mode or feature. Round robin may enable a more natural playback or reproduction of sound. When a particular midi sequence or fill sequence is played two or more times, or played two or more times within a predetermined period of time, each sequence to be played after the first may be selected from a set of sequences which are all natural-sounding variations of the same sequence. In this way, if a fill or sequence is played more than once automatically or manually, each subsequent playing of the sequence may be varied by an amount consistent with the natural variation of a musician playing an instrument. Data or metadata about any of the midi sequences or song parts or tracks may be used to select a sequence to be played based on song dynamics, such as automatically choosing a sequence based on song part, structure, or to facilitate building musical tension/release.

A. Embodiments of the Present Disclosure Provide a Hardware Apparatus Comprising a Set of Computing Elements, Including, but not Limited to, the Following.

Figure 10:
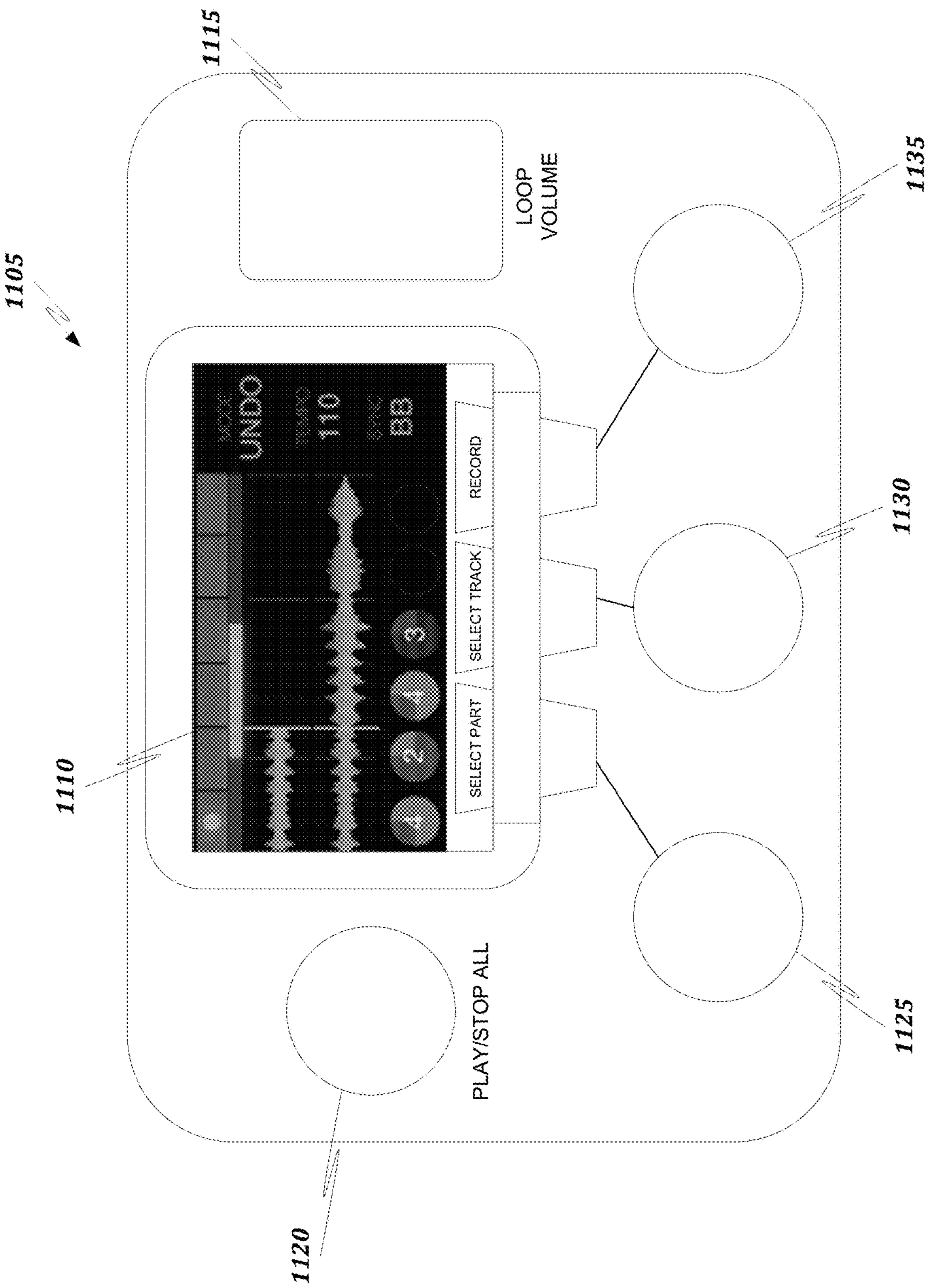
FIG. 10 illustrates an embodiment of an apparatus for recording and rendering multimedia.

FIG. 10 illustrates an apparatus consistent with the present disclosure. According to such embodiments, the apparatus may be a standalone looper apparatus 1105 (referred to herein as "looper 1105"). Looper 1105 may comprise an enclosed housing having foot-operated inputs. Still consistent with the various embodiments disclosed herein, the housing may further comprise a display 1110 with a user interface designed for simplicity of control in the operation of recording, arranging, looping, and playing a composition. The display may be, in some embodiments, a touch display. Looper 1105 may be configured capture a signal and play the signal in a loop as a background accompaniment such that a user of looper 1105 (e.g., a musician) can perform over top of the background loop. The captured signal may be received from, for example, an instrument such as a guitar or any apparatus producing an analog or digital signal.

Looper 1105 may provide an intuitive user interface designed to be foot-operable. In this way, a musician can operate the looper hands-free. For example, looper 1105 may comprise a plurality of foot-operable controls, displays, inputs, and outputs in a portable form factor. A foot-operable switch may be, by way of non-limiting example:

- a foot roller wheel 1115 configured to, for example, adjust a parameter of a currently select track (e.g., volume), or be used for user interface navigation;
- a play/stop switch 1120 configured to, for example, adjust a parameter of a song, song part(s), or track(s) (e.g., play/stop all);
- a first switch 1125 configured to, for example, enable a user to navigate, select, transition between song parts;

a second switch 1130 configured to, for example, enable a user to navigate, select, transition, toggle between song tracks; and a third switch 1135 configured to, for example, record, or re-record an input signal.

It should be understood that these switches may be programmable and perform different functions depending on the state of looper 1105. For example, the switches might have a first function during a "performance" mode of operation and a second function during a "recording" mode of operation. Furthermore, the switches may be used to effect external device operations (e.g., a mobile phone app controlling a video recordation). Thus, the aforementioned functions disclosed with the switches are examples only and one of ordinary skill in the art would recognize that the switches may be programmed to perform any function or feature disclosed herein.

Accordingly, using the controls, a user of looper 1105 may be receive, record, display, edit, arrange, re-arrange, play, loop, extend, export and import audio and video data. Looper 1105 may be configured to loop various song parts, in parallel layers and sequential layers, and arrange the recorded song parts for live-playback, arrangements, and performances. As will be detailed below, looper 1105 may be configured for a networked operation between multiple networked devices. The following provides some examples of non-limiting embodiments of looper 1105.

In some embodiments, looper 1105 may comprise an enclosure having a display, a combined rotary knob/wheel and pushbutton, a control system, an audio subsystem, file management system a mobile app (connected via Bluetooth or other wired or wireless connection) and two (2) footswitches for hands-free operation. In some embodiments, one footswitch may trigger the Record, Overdub and Play operations and another footswitch may trigger the Stop function (while looper 1105 is playing) and Clear function (while looper 1105 is stopped). The rotary knob/pushbutton control or a connected mobile app can be used to select songs and adjust the modes and settings of the device. The rotary knob/pushbutton control or a connected mobile app can be used to share files with other like-devices that are connected to a networked storage (e.g., cloud) as well.

In some embodiments, looper 1105 may comprise an enclosure having a display, a combined rotary knob and pushbutton, a control system, an audio subsystem, file management system a mobile app (connected via Bluetooth) and a Footswitch jack, Expression Pedal jack and/or MIDI port to enable hands-free operation with the addition of external devices. The rotary knob/pushbutton control or a connected mobile app can be used to select songs and adjust the modes and settings of the device. The rotary knob/pushbutton control or a connected mobile app can be used to share files with other like-devices that are connected to the cloud as well.

In some embodiments, looper 1105 may comprise an enclosure having a display, a combined rotary knob and pushbutton, a control system, an audio subsystem, file management system a mobile app (connected via Bluetooth), two (2) footswitches for hands-free operation and a Footswitch jack, Expression Pedal jack and/or MIDI port to expand the functionality of the device. One footswitch may be operative to trigger the Record, Overdub and Play operations and another footswitch may be operative to trigger the Stop function (while looper 1105 is playing) and Clear function (while looper 1105 is stopped). The rotary knob/pushbutton control or a connected mobile app can be used to select songs and adjust the modes and settings of the device. The rotary knob/pushbutton control or a connected mobile app can be used to share files with other like-devices that are connected to the cloud as well.

In some embodiments, looper 1105 may comprise an enclosure having a display, a combined rotary knob and pushbutton, a control system, an audio subsystem, file management system a mobile app (connected via Bluetooth) and four (4) footswitches for hands-free operation. A first footswitch may be configured to trigger the Record, Overdub and Play operations. A second footswitch may be configured to trigger the Stop function (while looper 1105 is playing) and Clear function (while looper 1105 is stopped). A third footswitch may be configured to control the selection/creation of a new Song Part. A fourth footswitch may be configured to control the Undo/Redo function associated with the current Song Part. The rotary knob/pushbutton can control or a connected mobile app can be used to select songs and adjust the modes and settings of the device. The rotary knob/pushbutton control or a connected mobile app can be used to share files with other like-devices that are connected to the cloud as well.

In some embodiments, looper 1105 may comprise an enclosure having a display, a combined rotary knob and pushbutton, a control system, an audio subsystem, file management system a mobile app (connected via Bluetooth), four (4) footswitches for hands-free operation and a Footswitch jack, Expression Pedal jack and/or MIDI port to expand the functionality of the device. A first footswitch may be operative to trigger the Record, Overdub and Play operations. A second footswitch may be operative to trigger the Stop function (while looper 1105 is playing) and Clear function (while looper 1105 is stopped). A third footswitch may be configured to control the selection/creation of a new Song Part. A fourth footswitch may be configured to control the Undo/Redo function associated with the current Song Part. The rotary knob/pushbutton can control or a connected mobile app can be used to select songs and adjust the modes and settings of the device. The rotary knob/pushbutton control or a connected mobile app can be used to share files with other like-devices that are connected to the cloud as well.

In some embodiments, additional footswitches may be provided for additional functions, such as, for example, but not limited to, loop control (e.g., a loop footswitch to create unlimited parallel loops). Further still, additional components may be provided to enable the various functions and features disclosed with regard to the modules. Various hardware components may be used at the various stages of operations follow the method and computer-readable medium aspects. For example, although the methods have been described to be performed by an enclosed apparatus, it should be understood that, in some embodiments, different operations may be performed by different networked elements in operative communication with the enclosed apparatus. Similarly, an apparatus, as described and illustrated in various embodiments herein, may be employed in the performance of some or all of the stages of the methods.

Figure 11A:
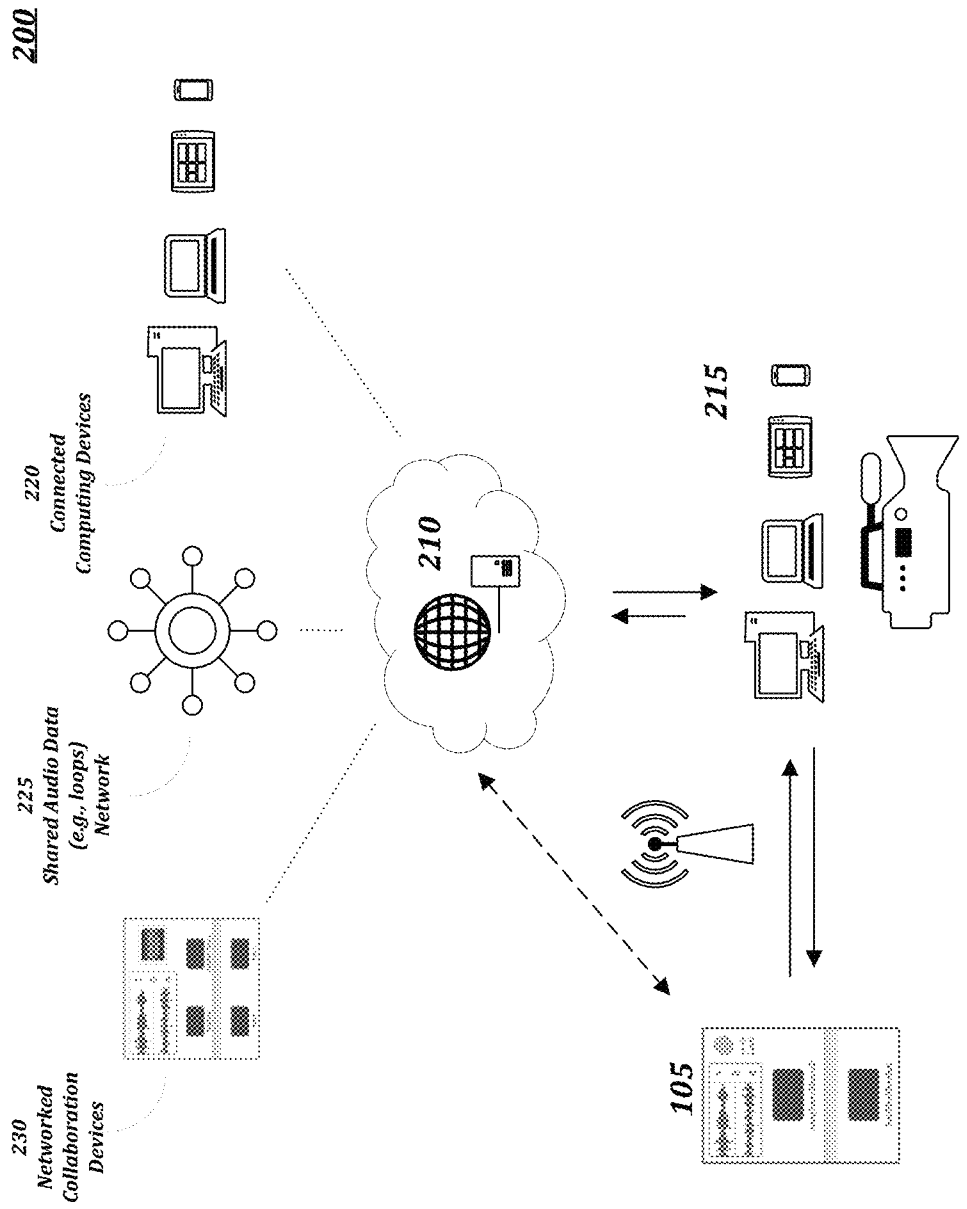
FIG. 11A illustrates a block diagram of an example operating environment for recording and rendering multimedia.

FIG. 11A illustrates one possible operating environment through which an apparatus, method, and systems consistent with embodiments of the present disclosure may be provided. By way of non-limiting example, components of system 1200 (e.g., referred to herein as the platform) may be hosted on a centralized server 1210, such as, for example, a cloud computing service. Looper 1105 may access platform 1600 through a software application and/or an apparatus consistent with embodiments of the present disclosure. The software application may be embodied as, for example, but not be limited to, a website, a web application, a desktop application, and a mobile application compatible with a computing device integrated with looper 1105, such as computing device 1700 described in FIG. 16. The software application may be configured to be in bi-directional communication with looper 1105, as well as other nodes connected through centralized server 1610.

In some embodiments, centralized server 1210 may not be necessary and a plurality of loopers 1230 may be configured for, for example, peer-to-peer connection (e.g., through a direct connection or a common access point). A plurality of nodes (looper 1105 and networked loopers 1230) in a local area (e.g., a performance stage) may all be interconnected for the synchronization of audio data and corresponding configuration data used to arrange, playback, record, and share the audio data. In this way, a collaboration module may be used in conjunction with the embodiments of the present disclosure.

Similarly, looper 1105 may be configured for a direct connection to external devices 1215. A software application 240 operable with both looper 1105 and external device 1215 may provide for the interaction between the devices to enable the various embodiments disclosed herein. The software application may further enable looper 1105's interaction with server 1210 (either indirectly through external devices 1215 or directly through a communications module) and, thus, in turn, with network 1225 and other networked computing devices 1220. One possible embodiment of the software application may be provided by the suite of products and services provided by Intelliterran, Inc. dba Singular Sound.

As will be detailed with reference to FIG. 16 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

B. Embodiments of the Present Disclosure Provide a Software and Hardware Apparatus Comprised of a Set of Modules, Including, but not Limited to the Following.

Figure 11B:
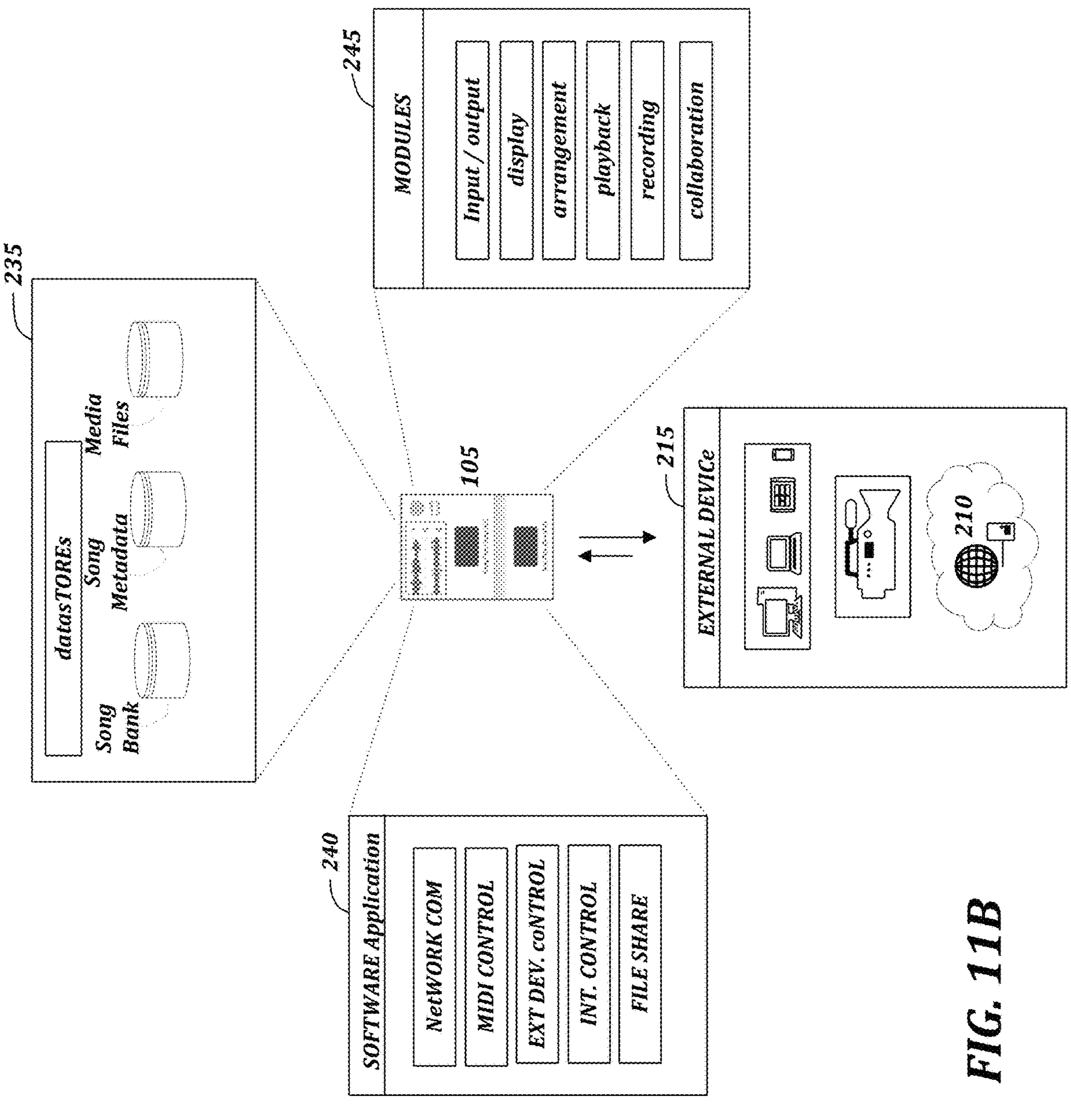
FIG. 11B illustrates a block diagram of an example operating environment for recording and rendering multimedia.

Referring now to FIG. 11B, software application 1240 may comprise, for example, but not be limited to, a plurality of modules including a network communication module, a midi controller, an external device controller, as well as internal control and file share protocols. These modules may enable the operation of the various looper modules 245 in conjunction with, for example, external devices 1215 and datastores 1235. In some embodiments, looper 1105 may be configured for connection to server 1210 without the need for an intermediary external device 1215.

The operation segments of the platform may be categorized as, but not limited to, for example, the following modules:

i. an input/output module;
ii. a display module;
iii. an arrangement module;
iv. a playback module;
v. a recording module; and
vi. a collaboration module.

In some embodiments, the present disclosure may provide an additional set of modules for further facilitating the software and hardware platform. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage, feature or function disclosed with reference to one module can be considered independently without the context of the other stages, features or functions. In some cases, each stage, feature or function disclosed with reference to one module may contain language defined in other modules. Each stage, feature or function disclosed for one module may be mixed with the operational stages of another module. It should be understood that each stage, feature or function can be claimed on its own and/or interchangeably with other stages of other modules. The following aspects will detail the operation of each module, and inter-operation between modules.

a. An Input/Output Module

The platform may be configured to receive audio data. As disclosed in greater detail below, the audio data may be received by, for example, an input signal into looper 1105. The input may be received from a wired or wireless medium. For example, the input may be a direct wired signal (e.g., direct line input or removable memory storage) into the platform or wireless signal for importing audio data from an external data source (e.g., a near-field or network communication).

The received audio data may be associated with, for example, but not be limited to, at least one track corresponding to an analog audio signal, a digital audio signal, a MIDI signal, a data signal from an external computing device. As will be detailed below, the signals may be compiled into at least one track with an associated visual representation displayed by a display module.

The received audio data may further comprise configuration data. The configuration data may comprise, but not be limited to, for example:

- at least one arrangement parameter employed by an arrangement module configured to arrange the at least one track associated with the audio data;
- at least one playback parameter employed by a playback module configured to playback the at least one track associated with the audio data; and
- a display parameter employed by a display module configured to display the visual representation associated with the audio data.

In some embodiments, the configuration data may be saved as metadata and/or within a name of the corresponding data file. In this way, the arrangement of the data file may be based on said metadata and/or file name. The setting and manipulation of the configuration data may affect an operation of the various modules disclosed herein. In some embodiments, these configuration data may be embodied as user-configurable metadata to the audio data. User configuration may be enabled via user-selectable controls provided by the platform. In various embodiments, and as will be disclosed in greater detail below, the user-selectable controls may be tied to foot-operable switches of an apparatus associated with the platform. In turn, the foot-operated controls may enable a hands-free composition, management, navigation and performance of an audio production on the platform.

Figure 13A:
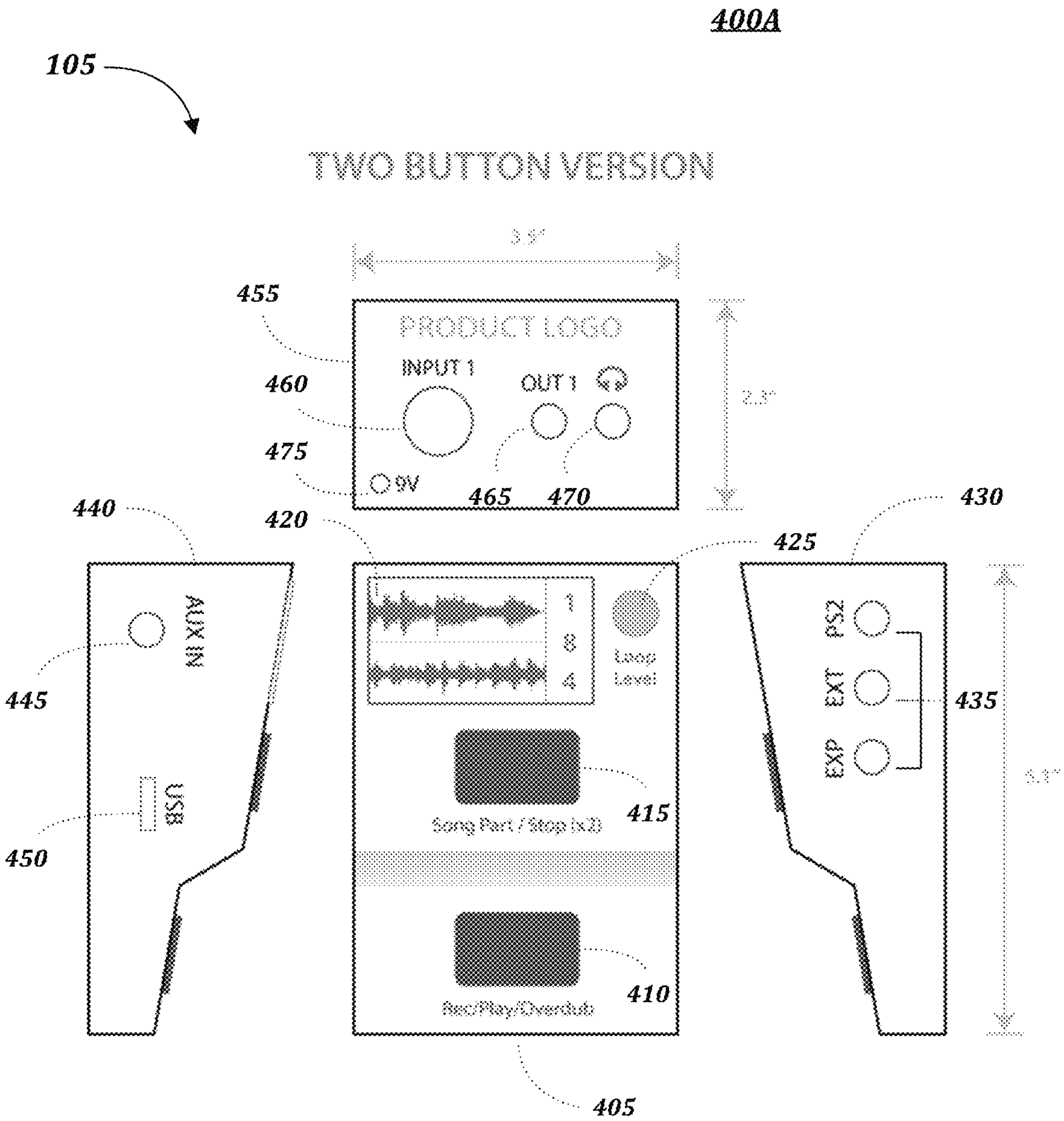
FIG. 13A illustrates additional embodiments of an apparatus for recording and rendering multimedia.
Figure 13B:
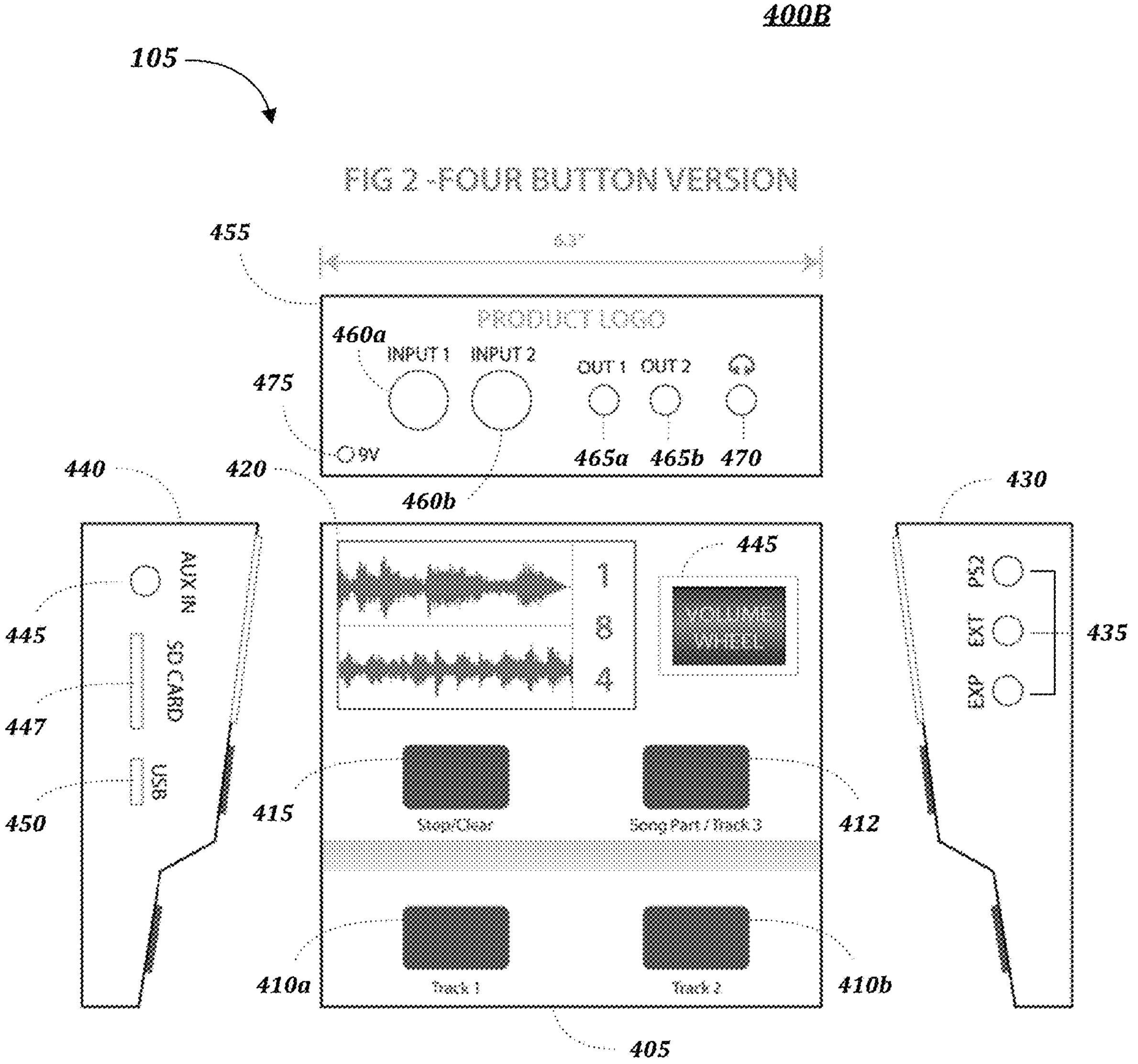
FIG. 13B illustrates additional embodiments of an apparatus for recording and rendering multimedia.

Still consistent with embodiments, looper 1105 may comprise a plurality of outputs (see FIGS. 13A-13B. In some embodiments, output may be provided by, for example, an external device 1215 or a networked device 1230.

b. A Display Module

The audio data may be represented as, but not limited to, for example, audio waveforms, MIDI maps, and other visual representations of the audio data (collectively referred to as "visual representations"). The visual representations may be organized and arranged into visual segments. The visual segments may be determined from the configuration data associated with the audio data (e.g., the display parameter). FIGS. 5A-5B and FIG. 15A-15C provide a more detailed disclosure with regard to the visual representations.

The visual segments may then be organized and displayed through various apparatus and systems disclosed herein. For example, the visual representations may be provided on a display unit an apparatus associated with the platform. In some embodiments, the visual representations may further be provided on a remote display unit associated with, for example, a computing device in network communication with the platform.

The display of the visual segments may be configured to provide detailed contextual visual cues and feedback to enable composition, management, navigation and performance of, for example, but not limited to, an audio production through the platform (referred to herein as a "song"). By way of non-limiting example, a visual segment may provide a visualization associated with at least one of the following: a layer within a track, a track within a song part, a song part within a song, a song, a measure currently being played/recorded with a track, layer, song part, or song, and a timing associated with the playback/recording. In this way, the visual segments corresponding to song parts and song layers may be operative to serve as visual cues to performing ensemble and/or the audience members on upcoming song parts or changes in the song.

In some embodiments, where one apparatus of the present disclosure is in network communication with another similarly-functional apparatus, the visual representations provided to an end-user may correspond to the operation of the remote-apparatus (e.g., external devices 1215). For example, a first apparatus may display visual representations associated with a remotely connected second apparatus so as to enable an end-user of the first apparatus to control playback and arrangement parameters associated with the second apparatus. As another non-limiting example, a first apparatus may display visual representations indicating an upcoming transition initiated by a remotely connected second apparatus.

c. An Arrangement Module

Figure 12A:
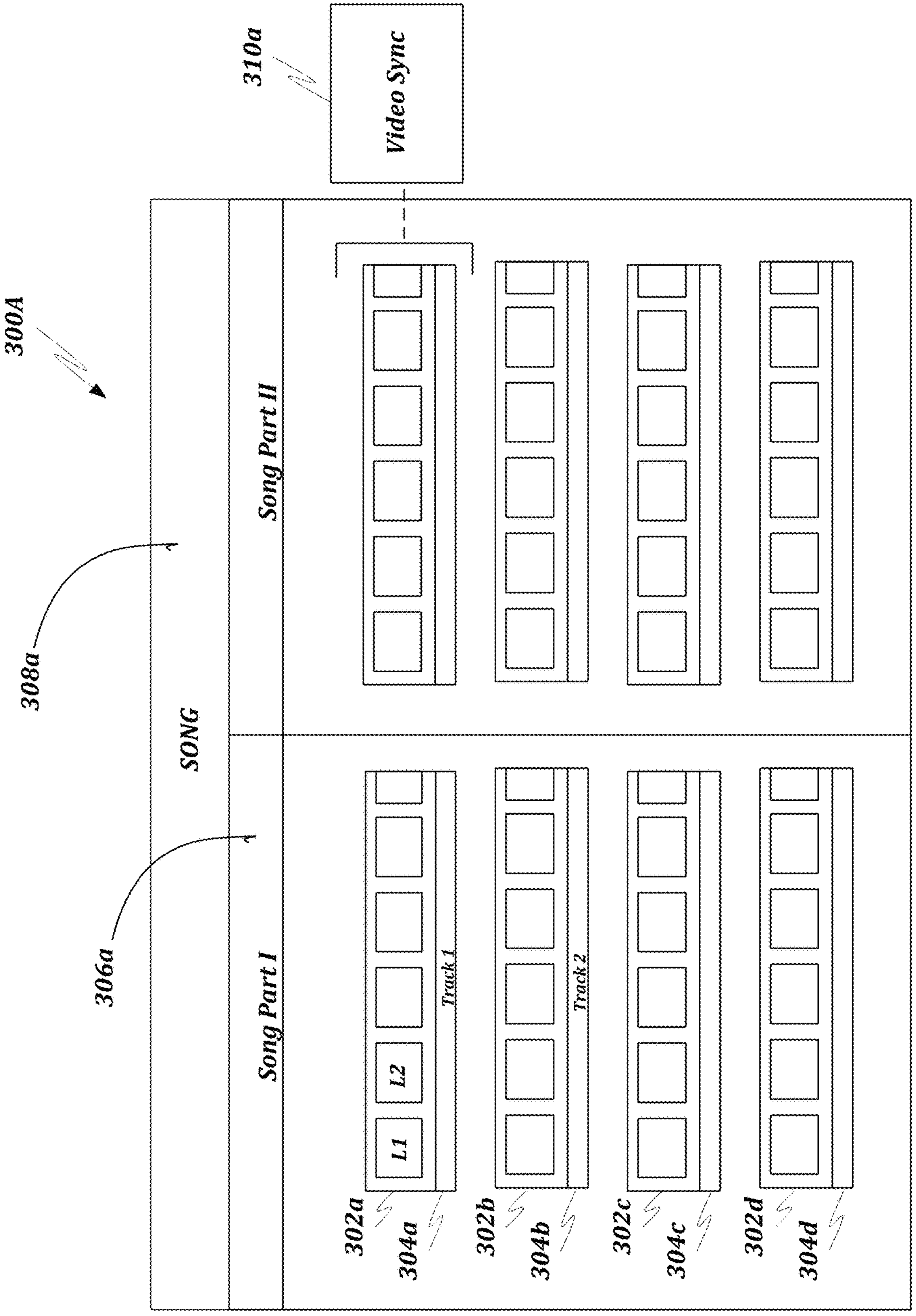
FIG. 12A illustrates an embodiment of a song structure and rendering for recording and rendering multimedia.

The platform may be configured to arrange one or more tracks associated with the audio data into, for example, but not limited to, a song comprised of song parts. The arrangement of the audio data may be based on, at least in part, an arrangement parameter associated with the audio data. FIG. 12A illustrates a song arrangement architecture 300A consistent with embodiments of the present disclosure.

A song may be segmented into, for example, but not limited to, layers 1302*a* of a track 1304*a*, tracks of a song part 1306*a*, and song parts of a song 1308*a*. Song parts 1306*a* may be comprised of tracks 1304*a* (e.g., looped segments). In turn, the platform may enable a user to, by way of non-limiting example, designate song parts, associate tracks to each song part, add/remove/edit/rearrange each track within a song part, and control the playback cycle and sequence of song parts. The arrangement module, at least in part, may enable the user to perform a plurality of the aforementioned operations, including, for example, transition from one song part to the next, record new tracks or layers, and turning on/off different tracks or layers in each song part.

In some embodiments, the song arrangement architecture 1300A may include synchronized video content 1310*a* associated with a track 304*a*. The synchronization may be enabled by, for example, a software application as described with regard to the platform (e.g., system 1200). The synchronization may be enabled via metadata associated with audio and video tracks, and is detailed with reference to FIG. 12C below.

Still consistent with the embodiments herein, each song 1308*a* may be comprised of one or more song parts 1306*a*. Song parts 1306*a* may be played in a user-selectable sequence. The user-selectable sequence may be triggered by a user-selectable control associated with the platform. The user-selectable control may be embodied as, but not limited to, a foot-operable switch embedded on an apparatus associated with the platform (e.g., on looper 1105). In other embodiments, the user-selectable control may be configured remotely (e.g., external device 1215).

The user-selectable control may be configured in a plurality of states. In this way, a single control may be enabled to perform a plurality of different operations based on, at least in part, a current state of the control, a previous state of the control, and a subsequent state of the control. Thus, the arranged playback of a subsequent song part may be associated with a state of the control designated to affect the arrangement configuration parameter associated with the song part. A display 1100 of looper 1105 may indicate a current state and provide the appropriate labels for the selectable controls (e.g., 1125-1135).

Each song part 1306*a* may be comprised of one or more tracks 1204*a*. Tracks 1304*a* may be structured as parallel tracks enabled for concurrent playback within song part 1306*a*. The playback of the tracks may correspond to a user selectable control configured to set the at least one playback parameter. Each track may comprise one or more layers 1302*a*. By default, a track may comprise a first layer. The duration of the first layer, measured in 'bars', serves as the duration of all subsequently recorded layers in each track. In contrast, a song part may comprise a plurality of tracks with varying duration. Further, each track may comprise a midi segment as disclosed herein.

As will be disclosed in greater detail below, the user-selectable control may be embodied as, but not limited to, a foot-operable switch embedded on an apparatus associated with the platform. In other embodiments, the user-selectable control may be configured remotely. As mentioned above, the user-selectable control may be configured in a plurality of states. In this way, the single control may be enabled to perform a plurality of different operations based on, at least in part, a current state of the control, a previous state of the control, and a subsequent state of the control. Thus, an "ON" or "OFF" playback state of a layer (e.g., parallel track of a song) may be associated with a state of a control designated to affect the playback configuration parameter associated with the track.

The arrangement module may also embody the platform's ability to add, remove, modify, and rearrange the song by virtue of the song's corresponding parts, tracks, and layers. As will be disclosed in greater detail below, the rearrangement of the aforementioned components may be associated with the modification of configuration data tied to the audio data, including, but not limited to, pitch and tempo modulation.

d. A Playback Module

The platform may be configured to playback the song parts, tracks, and layers. The playback may be based on, at least in part, a playback configuration parameter associated with the audio data corresponding to the song. It should be noted that the disclosure of functions and features with regard to a track, as used herein, may incorporate by reference one or more layers comprising the track. Furthermore, the disclosure of functions and features with regard to a layer, as used herein, may be similarly applicable to the functions and features of a track. Thus, a reference to a function, feature, or limitation for a layer may imply the same function, feature, or limitation upon a track (e.g., a single layer track) or midi segment.

Consistent with embodiments of the present disclosure, the platform may receive a playback command. The playback command may be comprised of, but not limited to, for example, a straight-through playback command and a loop playback command. A straight-through command may be configured to cause a sequential playback of each song part between a starting point and an ending point, in a corresponding playback sequence for each song part. A looped playback command may be configured to cause a looped playback of a song part. In some embodiments, the platform may be enabled to loop a plurality of song parts in between a designated loop starting point and a loop ending point. In these embodiments, each song part may have a different quantity of loop cycles before a transition to the subsequent song part.

Still consistent with embodiments of the present disclosure, the platform may be configured to transition between playback types and song parts. For example, a transition command may be received during a playback of a song part. The command may cause the platform to playback a different song part. The different song part may be determined based at least in part on a song part in subsequent playback position. The subsequent playback position may set by the configuration data associated with the song the song part, and the tracks therein.

In some embodiments, the different song part may be determined based at least in part on a song part associated with a state of a selectable control that triggered the transition command. As will be disclosed in greater detail below, the selectable control may comprise multiple states corresponding to different user engagement types with the selectable control. Each state may be associated with a playback position of a song part, and, when triggered, may cause a transition of playback to a song part corresponding to the playback position.

Still consistent with embodiments of the present disclosure, the playback of each song, song part, and track, may be regulated by the configuration data associated with the audio data corresponding to the song, song part, and track. The configuration parameter may comprise at least one playback parameter comprising at least one value associated with, but not limited to, at least one of the following: a tempo, a level, a frequency modulation, and effect.

As will be disclosed in greater detail below, the selectable control may be embodied as, for example, a foot-operable switch or configured remotely. Having set the playback parameter values, the platform may output a playback signal. The output signal may transmitted through a direct line output. In some embodiments, the output signal may be transmitted by a communications module operatively associated with a near-field or network connection.

e. A Recording Module

A recording module may be configured to capture signals and data received from the input module. The details to such operations are detailed below. Consistent with embodiments of the present disclosure, the recording module may be further configured to extend a song part based on a duration of, for example, a newly recorded track. The extension of a song part may comprise, but not be limited to, for example, automatically extending other song part layers (e.g., an initially recorded layer) by recording a longer secondary layer on top of the other song part layers. As will be further detailed below, the length of the other song part layers may be extended, in whole or fractional increments, to match the length of the first layer within the track. Similarly, embodiments of the present disclosure may enable a user to extend the duration of a track by recording an overdub to a track layer that is longer than the initial recording.

Figure 12B:
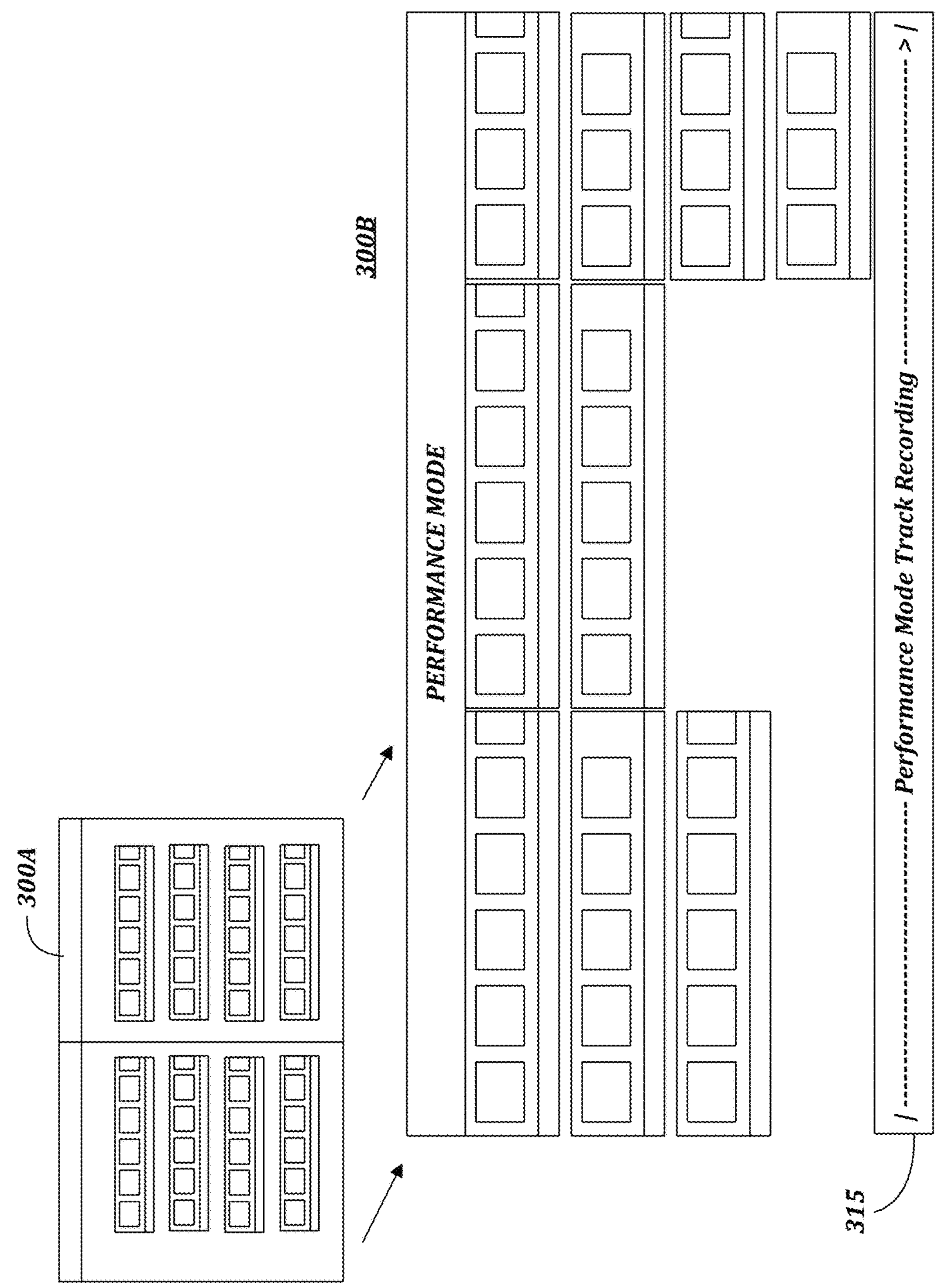
FIG. 12B illustrates an embodiment of a song structure and rendering for recording and rendering multimedia.

Still consistent with embodiments of the present disclosure, a performance capture mode may be provided (also referred to as 'performance mode'). FIG. 12B illustrates a performance mode architecture 1300B. The performance capture mode may allow the creation a single recorded track 1315 concurrently recorded with the playback of individual loops. This enables the capturing of a non-looped performance (e.g., a guitar solo over a looped chord progression) while playing back the various looped tracks in various song parts. In some embodiments, and as will be detailed with reference to FIG. 3C, the capture performance may be comprised of a single file. The single file may, in turn, be published. In this way, the performance can be shared for listener enjoyment or in order to collaborate with other musicians to add additional musical elements to the work.

A user may enter performance mode by operation of one or more looper switches. In this way, during the same session, a user can initiate performance mode without any secession of the session activity. In other words, embodiments may enable the user to enter into performance mode without resetting the session. Once receiving a command to enter performance mode, looper 1105 may be operative to begin performance mode recording at, for example, an upcoming bar or at the resetting of a corresponding song part. An external device may also be triggered to begin a corresponding recordation. Similarly, a user may operate one or more looper switches to exit performance mode. In other embodiments, performance mode may be set as a parameter prior to commencing a session.

In performance capture mode, as the musician plays and operates looper 1105, the musician may enable and disable various background layers/loops with a song part. The musician may further transition from one song part to the next song part. The performance may be captured as a single, sharable file through the platform to enable collaboration. In some embodiments, the performance may be captured as, for example, metadata along with the various song layers and parts. Then, a user of the platform can edit/modify the performance without needing to re-capture the performance.

For example, the metadata data may include, but not be limited to, the time of each layer/parts playback and various data associated therewith or the number of repetitions of a main midi sequence within a midi segment and the location of any midi fill sequences within the main midi sequence or midi segment. Time signature and tempo information may be saved so that this file can be used in other devices with the quantizing feature enabled (in accordance to a collaboration module detailed below). This information may be saved dynamically so that if the tempo is changed during a performance, this information is captured as it happens and can adjust collaborating devices accordingly. A digital marker may be used for various actions, such as changing a song part and the resulting performance file displays these changes visually so that collaborating musicians can see where these actions have taken place and can prepare themselves accordingly. Performances may further comprise an arrangement of midi segments which may be played back and dynamically interacted with during playback using the auto-pilot feature as described herein.

f. Video Controller Module

Embodiments of the present disclosure may provide a software application for interfacing looper 1105 with external devices 1215. As one example, a user may install a smartphone application to sync the operation of looper 1105 with the smartphone. The application may be configured to operate the video controller module to synchronize the smartphone's recording a video with looper 1105's recording of an audio signal (e.g., a track). In a plurality of ways, the application may combine or otherwise stitch the captured video content with the captured track. In turn, each time the particular track is played back, the application may cause a playback the captured video segment associated with the recorded track.

Figure 12C:
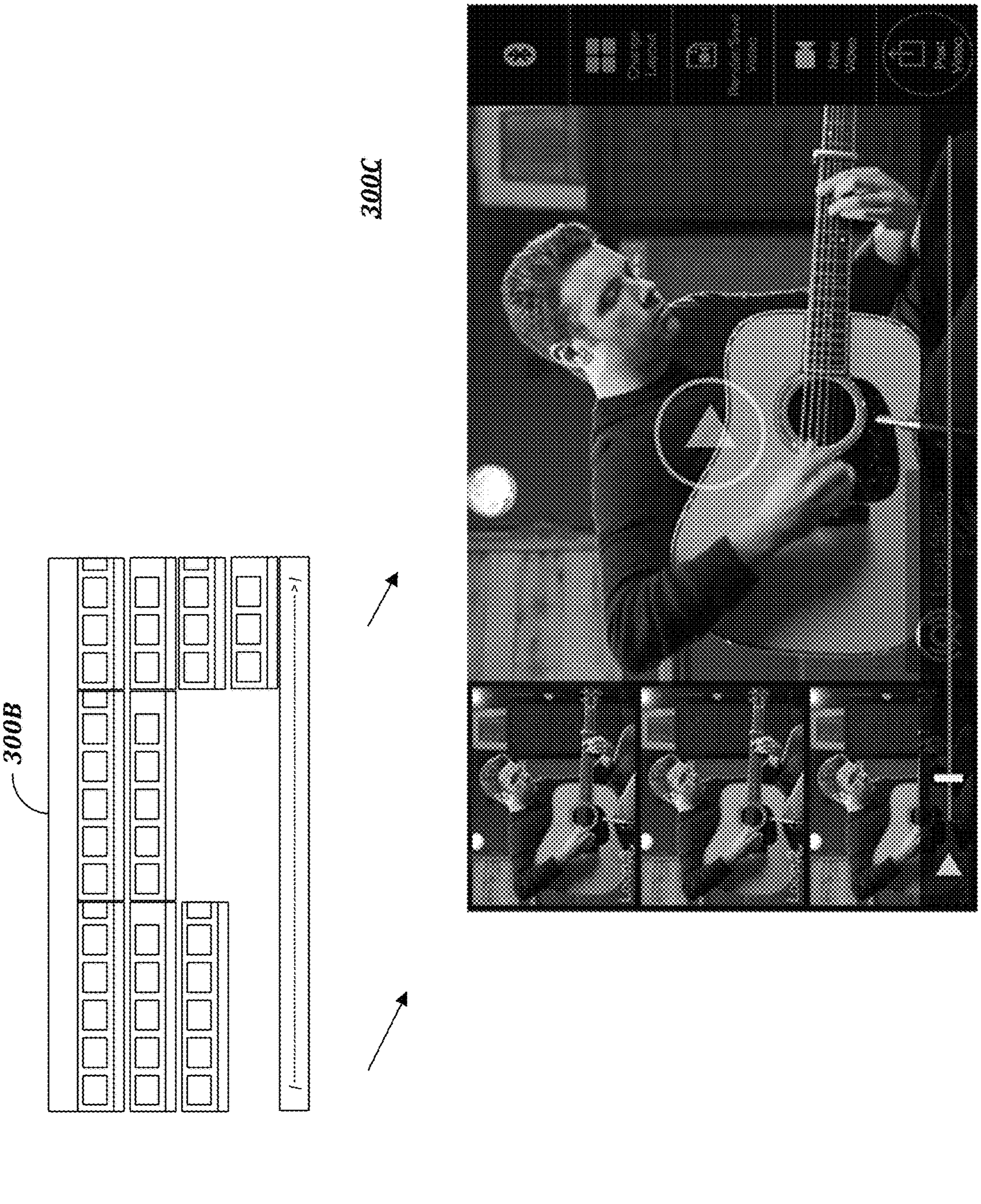
FIG. 12C illustrates an embodiment of a song structure and rendering for recording and rendering multimedia.

FIG. 12C illustrates on example of a rendered multimedia file 1300C in accordance with embodiments of the present disclosure. One application of this functionality may be to record music videos of a musician performing each recorded track. For example, the musician may position their smartphone camera to capture the musician's performance. Then, as the musician operates looper 1105, the software application may operate the smartphone so as to capture a video segment associated with a currently recorded track. In this way, the musician's trigger of a record function of audio on looper 1105 also triggers a record function of video on the smartphone. Then, each recorded video may be assigned to a corresponding audio track for playback and rendering.

For example, when a song part is comprised of, for example, six song parts, all six videos associated with each track is played back synchronously with the audio. Continuing with the same example, when one track within a song part is turned off, the video associated with the track is also turned off. when the user transitions from one song part to the next song part, the video for the new tracks is played back.

Embodiments of the present disclosure may provide for a plurality of video and audio synchronization methods. For example, in some embodiments, the recorded video data may be stored in a first datastore, while the recorded audio data may be stored in a second datastore. The data stores may or may not be local to one another. Herein, the software application may read the metadata associated with each video and audio dataset and trigger a simultaneous playback. In some embodiments, the playback of the video may be performed on an external device, while the playback of the audio may be performed by looper 1105. The software application may monitor, for example, the playback commands provided by a user on either the looper 1105 or the external device and cause a simultaneous playback to be performed on both devices. In other embodiments, the data stores may be local to one another and, therefore, operated upon by the same device (e.g., for playback and rendering).

Some embodiments may employ time-based synchronization using time-coding techniques known to those of ordinary skilled in the field. Other embodiments may further employ unique IDs to each audio and video segment. The platform may in turn use these IDs to rearrange (via reference) of the audio files to create a composition is close to how we will track the loop order of the user's performance (e.g., in performance mode).

Accordingly, platform may be configured to operate external devices 1215 in parallel to the operation of looper 1105. So, as soon as a user starts a recording session activity, the platform may be configured to automatically turn on/off video recording, label/apply metadata to the captured video components, and then, during the rendering of the track (e.g., after recording performance mode), the system will use metadata of those video files to sync the captured video segments to the right loops in the song.

It should be understood that the use of metadata only provides for one potential solution to synchronizing multimedia content. In other solution, external lists of data (much like a database) may be employed.

g. A Collaboration Module

A collaboration module may be configured to share data between a plurality of nodes in a network. The nodes may comprise, but not be limited to, for example, an apparatus consistent with embodiments of the present disclosure. The sharing of data may be bi-directional data sharing, and may include, but not be limited to, audio data (e.g., song parts, song tracks) as well as metadata (e.g., configuration data associated with the audio data) associated with the audio data.

Still consistent with embodiments of the present disclosure, the collaboration module may be enabled to ensure synchronized performances between a plurality of nodes. For example, a plurality of nodes in a local area (e.g., a performance stage) may all be interconnected for the synchronization of audio data and corresponding configuration data used to arrange, playback, record, and share the audio data.

In some embodiments of the present disclosure, any networked node may be configured to control the configuration data (e.g., playback/arrangement data) of the tracks being captured, played back, looped, and arranged at any other node. For example, one user of a networked node may be enabled to engage performance mode and the other networked nodes may be configured to receive such indication and be operated accordingly. As another example, one user of a networked node can initiate a transition to a subsequent song part within a song and all other networked nodes may be configured to transition to the corresponding song-part simultaneously. As yet another example, if one networked node records an extended over-dub, then the corresponding song part on all networked nodes may be similarly extended to ensure synchronization. In this way, other functions of each networked node may be synchronized across all networked nodes (e.g., play, stop, loop, etc.).

By way of further non-limiting example, the synchronization may ensure that when one node extends a length of a song part, such extension data may be communicated to other nodes and cause a corresponding extension of song parts playing back on other nodes. In this way, the playback on all nodes remains synchronized. Accordingly, each node may be configured to import and export audio data and configuration data associated with the audio data as needed, so as to add/remove/modify various songs, song parts, and song layers of song parts.

Furthermore, in accordance to the various embodiments herein, the collaboration module may enable a first user of a first node to request additional tracks for a song part. A second user of a second node may accept the request and add an additional track to the song part. The updated song part, comprised of the audio data and configuration data, may then be communicated back to the first node. In some embodiments, the second node may extend the length of the song part (see recordation module details) and return updated audio data and configuration data for all song tracks. The updated data may include datasets used by a display module to provide visual cues associated with the updated data (e.g., transition points between song parts).

The collaboration module may further be configured to send songs, song parts, song tracks and layers, and their corresponding configuration data to a centralized location accessible to a plurality of other nodes. The shared data can be embodied as, for example, a request for other nodes to add/remove/modify layers and data associated with the shared data. In some embodiments, the centralized location may comprise a social media platform, while in other embodiments, the centralized location may reside in a cloud computing environment.

Further still, embodiments of the present disclosure may track each nodes access to shared audio data as well as store metadata associated with the access. For example, access data may include an identify of each node, a location of each node, as well as other configuration data associated with each node.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

C. Embodiments of the Present Disclosure Provide a Hardware and Software Apparatus Operative by a Set of Methods and Computer-Readable Media Comprising Instructions Configured to Operate the Aforementioned Modules and Computing Elements in Accordance with the Methods.

The methods and computer-readable media may comprise a set of instructions which when executed are configured to enable a method for inter-operating at least the modules illustrated in FIGS. 11A and 11B. The aforementioned modules may be inter-operated to perform a method comprising the following stages. The aspects disclosed under this section provide examples of non-limiting foundational elements for enabling an apparatus consistent with embodiments of the present disclosure.

Although the method stages may be configured to be performed by computing device 1700, computing device 1700 may be integrated into any computing element in system 1200, including looper 1105, external devices 1215, and server 1210. Moreover, it should be understood that, in some embodiments, different method stages may be performed by different system elements in system 1200. For example, looper 1105, external devices 1215, and server 1210 may be employed in the performance of some or all of the stages in method stages disclosed herein.

Furthermore, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated.

A computing device 1700 may be configured for at least the following stages.

1. Recording a signal, wherein the signal comprises least one of the following:
   - Wired signal,
   - Wireless signal,
   - An analog signal, and
   - digital signal.
2. Capturing the received signal as audio data, wherein the audio data is segmented into at least one track;
   - Wherein the at least one track comprises an audio track, and
   - Wherein the at least one track comprises a midi track.
3. Associating configuration data with the at least one track, wherein the configuration data comprises at least one of the following:
   - Arrangement data employed configured to specify an arrangement of the at least one track within a song part of a song,
   - Playback data employed configured to specify playback properties of the at least one track, and
   - A display data employed configured to specify a visual representation associated with the at least one track.
4. Arranging the at least one track based on the at least one arrangement parameter, wherein the at least one arrangement parameter determines a position of the at least one track, the position being at least one of the following:
   - A layer within a track,
   - A track within a song part, and
   - A song part within a song;
5. Playing back at least one song part within a song,
   - Wherein the playback is configured for at least one of the following:
     - a. Looping a song part, wherein looping the song part comprises:
       - i. Playing a plurality of parallel layers within a track,
       - ii. Playing a plurality of tracks within the song part,
       - iii. Switching on/off the playback of layers within a track, and
       - iv. Switching on/off the playback of tracks within a song part;
     - b. Transitioning to from a first song part to a second song part.

The computing device 1700 may be further configured as follows:

- Wherein configuration parameters are stored as metadata associated with the audio data,
- Wherein the configuration parameters are user-configurable,
  - Wherein the configuration parameters are user-configurable based on selectable controls, hands-free controls of an apparatus,
- Wherein additional configuration parameters are associated with each song part of the song, and
- Wherein yet additional configuration parameters are associated with the song.

The aspects disclosed under this section provide examples of non-limiting functions that may be performed on a stand-alone, self-enclosed apparatus, that is operable by foot controls in a simple and intuitive way, as will be disclosed in detail below. Accordingly, computing device 1700 may be further configured for the following.

1. Displaying visual representations associated with the audio data, wherein displaying the visual representations comprises:
   Displaying a visual segment associated with at least one of the following:
      A track within a song part,
      A song part within a song
      A song,
      A measure currently being played/recorded with the track, and
      A timing associated with the playback/recording.
2. Displaying visual cues associated with at least one of the following:
   A playback of the visual segment,
   A transition associated with the visual segment, and
   A recordation associated with the visual segment.

Wherein the visual ques facilitate the navigation between song parts within a song, and Wherein the visual ques identify layers and/or tracks being played back within a song part.

3. Recording a signal,
   Simple Layering Embodiments
      Wherein the recording of the subsequent signal is captured as a new layer within a track of a song part to which the subsequent signal is being recorded,
      Wherein the song part comprises at least one track being played back during the recording of the subsequent signal based upon playback parameters associated with the tracks,
      Wherein a first layer of a track determination the length/duration of the track such that all subsequent layers recorded to the track are limited to the same length/duration,
         Wherein subsequent tracks are padded to fill the length/duration of the track as needed, and
      Wherein a song part may comprise tracks of varying length/durations.
   Loop Extension Embodiments
      Wherein the recording of the subsequent signal is configured to cause an extension of the track to which the subsequent signal is being recorded, wherein the track is extended by at least one of the following:
         a duration of the new layer corresponding to the recording of the subsequent signal, and
         a quantized increment of the layers within the extended song part;
      Wherein the recording of the subsequent signal is configured to cause an extension of the song part to which the subsequent signal is being recorded, wherein the song part is extended by at least one of the following:
         a duration of the new track corresponding to the recording of the subsequent signal, and
         a quantized increment of the tracks within the extended song part.
   Performance Mode Embodiments
   A. Receiving a command to engage in a performance capture mode of recording; and
   B. Recording a received signal in performance capture mode, wherein the recording of the signal comprises enabling at least one of the following operations to be performed by the user during the playback of the recording of the subsequent signal:
      initiating playback of the song at a starting point determined by a user,
      receiving at least one modification to at least one playback parameter of at least one track within the song part currently being played back (e.g., turning song part tracks or layers on/off),
      continuing playback of the song part with the modified at least one playback parameter,
      receiving at least one transition command to switch to another song part,
      transitioning playback to the other song part,
      receiving at least one modification to at least one playback parameter of at least one track within the song part currently being played back (e.g., turning song part tracks or layers on/off),
      continuing play back of the song part with the modified at least one playback parameter, and
      terminating play back of the song at a termination point determined by the user.
   Rendering as a File Embodiments
      Wherein the recording of the subsequent signal further comprises capturing, as a single file, the recorded signal along with the playback in accordance to the aforementioned user operations enabled during the playback, and
      Wherein the recording of the subsequent signal further comprises capturing, as a single file, the recorded signal without the playback in accordance to the aforementioned user operations enabled during the playback.
   Rendering with Metadata Embodiments
      Wherein the recording of the subsequent signal further comprises:
         capturing, as a single file, the recorded signal as at least one track within at least one song part,
         establishing metadata corresponding to the user operations enabled during the playback, and
         packaging each track of each song part within along metadata so as to enable a playback of the song as captured during the recordation of the subsequent signal.
4. Enabling collaboration on at least one of the following: a song, song part, and song layers,
   Wherein enabling the collaboration on the song, song part, and song tracks and layers comprises at least one of the following:
   Remote Operation Embodiments
   A. Sharing data between a plurality of networked devices, wherein sharing the data comprises the bi-directional sharing of at least one of the following:
      audio data comprising at least one of the following: an audio track and a midi track,
         wherein the capture of audio data at one node is configured to be shared with another node, and
      configuration parameters associated with the audio data, comprising at least one arrangement parameter, at least one playback parameter, and at least one display parameter,
         wherein the modification of a configuration parameter associated with the audio data at one node is configured to cause the modification of the configuration parameter at another node, including, for example:
            a modification of a playback parameter, enabling a first node to turn on/off the playback of loops associated with a second node, a modification of an arrangement parameter, enabling a first node to effect of a transition from a first song part to another song part on a second node, and a modification of a display parameter, enabling an update to the visual cues/audio data information indicating the playback layers and upcoming transitions;

Requesting and Sharing Embodiments

A. Initiating a request, by a first node, for audio data from a second node, wherein the request is accompanied by audio data and configuration parameters associated with the first node, B. Receiving the request, from the first node, at the second node, wherein receiving the request comprises loading the audio data and configuration parameters received from the first node at the second node, C. Providing, by the second node, the requested audio data to the first node, wherein providing the requested audio data comprises providing at least one of the following: a layer, a track, a song part, and a song;

Remote Apparatus Synchronization Embodiments

A. Enabling collaboration between nodes with the requested and provided data, wherein enabling collaboration nodes comprises:

the synchronized display of visual segments and visual ques between the plurality of nodes;

the synchronized operation of the configuration parameters associated with the audio data between the plurality of nodes;

the synchronized extension of song parts in accordance to the aforementioned recording stage; and the synchronized capture of a performance in performance mode in accordance to the aforementioned recording stage.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones detailed below. Moreover, various stages may be added or removed from the without altering or deterring from the fundamental scope of the depicted methods and systems disclosed herein.

It should be understood that features of the aforementioned disclosure may be compatible with synthesized or recorded percussion tones used with midi-sequences. In this way, the apparatus may serve as a percussion section accompaniment to a musician. Furthermore, it should be understood that the various functions disclosed herein may be performed by either a processing unit or memory storage built-in with the apparatus, or associated with a docked or otherwise connected mobile device operating in conjunction with the apparatus. The customizations and configurations may be set with software accompanying the processing unit and memory storage of either the apparatus or the mobile device. Reference to the processing unit, memory storage, and accompanying software is made with respect to FIG. 6 below.

II. Device Design/Hardware Components and Functions

Figure 3:
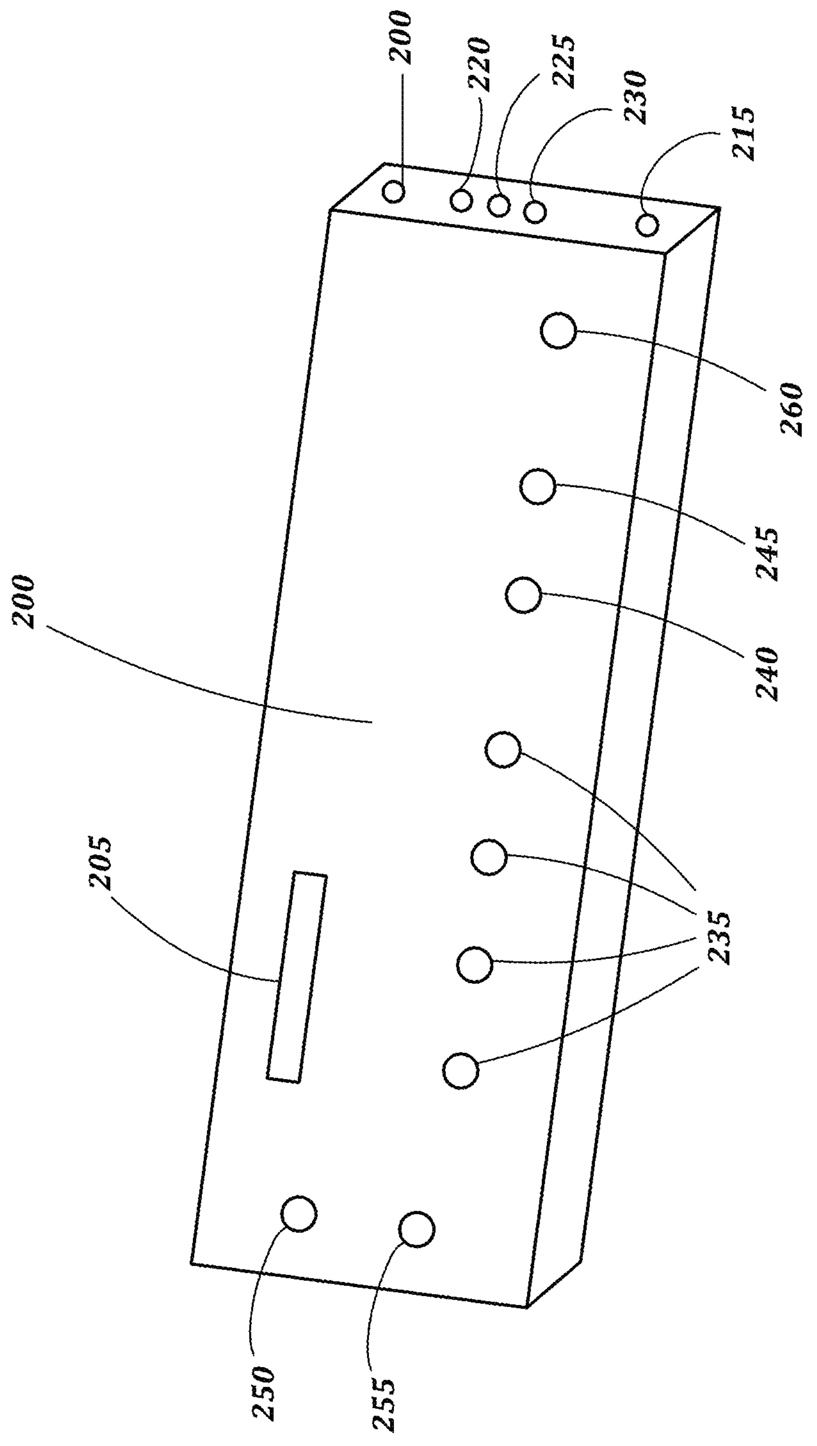
FIG. 3 is a diagram of yet another embodiment of an apparatus consistent with embodiments of the present disclosure.

The apparatus may take the form of a plurality of different designs, such as those shown in FIGS. 1-3. Referring back to FIGS. 1A-1E of the drawings, an embodiment of a device 10 consistent with embodiments of the present disclosure may comprise a case 12, a selector 14, a selector 16, one or more selectors 18, a selector 20, one or more selectors 22, a display 24, a sensor 26, a pedal 28, inputs 30, a card slot 32, a port 34, a port 36, a port 38, outputs 40 and 45, phones volume 31, foot switch 57, and a midi sync 46. Consistent with embodiments of the present disclosure, the selectors may be programmed by the user using software associated with device 10 (also referred to as the 'apparatus' throughout the present disclosure).

Generally, embodiments of the present disclosure comprise a MIDI (musical instrument digital interface) sound generator housed in a case 12 constructed of a rigid and durable material such as metal or a high impact polymer to survive significant abuse, wear and tear.

A plurality of controls are located on the upper face of the case 12 so that they are viewable when standing above the pedal. One possible configuration of the controls is shown in FIGS. 1A-1E, comprising of a volume selector 14, a drum set selector 16, a selector 18, a tempo selector 20 and a selector 22.

An internal memory storage means, such as solid state memory, flash memory, hard-drive or other memory device is fixed inside the case 12, and will be detailed with reference to FIG. 5. The memory storage means may hold a pre-selected set of MIDI or audio rhythms. Each set of associated MIDI rhythms may be designated by a name that may correspond to a song the user wishes to play. The songs may be organized in folders for easy categorization and access.

In various embodiments, the apparatus may optionally display loop numbers. Loop numbers may correspond to the style selector. In various embodiments, for each style (e.g., rock, jazz, etc.) there may be an unlimited quantity of loop sequences (or 'songs'). Various parameters and settings of the apparatus, such as, for example, but not limited to, the loop number, rhythm style, and the like, may be displayed on display 24 for easy reference and navigation through the various available loops.

In the device's most simple use, the MIDI sequence is repetitively looped. In other words, the full MIDI file may be played, and when completed, may immediately start over from the beginning to repeat the cycle.

By way of example, in another use, one or more MIDI segments are automatically, consecutively played. In other words, an entire song may be played by initiating playback of one or more MIDI segments comprising the song.

Selector 18, when pressed, may enable the user to move between a folders display (i.e., where songs may be categorized). Selector 22, when pressed, may enable the user to scroll up and down to, for example, select a folder or song. In various embodiments, an external footswitch may serve as a selector button to enabling the scrolling between songs or folders.

Consistent with embodiments of the present disclosure, the MIDI sequence may be initiated by a brief tap with the foot onto the pedal 28. The device may then execute the MIDI file and send an analog audio signal out through the outputs 40. Typically, the signal may then be transmitted to an external amplifier where it is broadcast to the audience. In some embodiments, the outputs may be fed into (or "daisy chained") another external device that may manipulate or otherwise interact with the signal as produced by the device.

Still consistent with embodiments of the present disclosure, the MIDI sequence may be outputted and provided to another computing device. For example, the MIDI sequence may be streamed to a computer which, in turn, may playback sound based on the MIDI sequence instructions. In this way, both the memory and processing limitations of an otherwise stand-alone apparatus may be overcome by adding external capabilities.

In some embodiments, the MIDI-sequence triggered may be inputted to the apparatus and played back by the apparatus as though the MIDI-sequence was generated by the apparatus itself. In this way, a user is enabled to input a plurality of MIDI-sequences and operate the apparatus to control the MIDI-sequences in the methods described herein. In yet further embodiments, MIDI-sequences may be uploaded to a memory storage of the apparatus.

The internal storage means may store dozens or hundreds or thousands of unique groups of associated MIDI files or 'songs', each representing a distinct percussion sequence. The selector 22 may be utilized to move between the various songs. In some embodiments, the memory storage of a docked or otherwise connected mobile device may be used to store MIDI files that would, in turn, be played by the apparatus.

In some embodiments, the midi sequence triggered is a main midi sequence of a midi segment. The midi segment may comprise a main midi sequence that is repeated for a predetermined number of loops, and may include one or more fill midi sequences at predetermined times within the midi segment or main midi sequence.

The drum set selector 16 may apply any of a predetermined set of MIDI instrument voices onto the percussion loop played. Typically, the drum set selector 16 may be set to a specific instrument voice for the duration of a musical piece, score or other meaningful distinction point. Standard drum set instrument voices may include, for example, but not be limited to, pop, jazz, rock or other classification of voice. In the example shown in FIGS. 1A-1E, the drum set selector 16 takes the form of a dial that rotates to select from the stored drum sets in the device as displayed on the device's screen.

The volume selector 14 may be used to set the line level of the outputs 40. This allows for a simple and customizable output level for the device. Other third party pedals up line in a daisy chain of pedals may also be affected by the volume selector 14. Typically, the volume selector is used to affect the prominence of the percussion sound generated by the device relative to the instrument sounds that pass unmodified through the device. In some embodiments of the device, the volume of the instrument signal may not be affected by the device and may otherwise be unaffected. The overall volume of the sounds generated by the apparatus may be generally controlled at the main amplifier level, external to the apparatus. In the example shown in FIG. 1, the volume selector 14 takes the form of a dial that rotates to any infinitely variable position. The volume selector 14, in some embodiments, may only affect the volume of the midi-sequences produced by the device.

The style selector 18 adds a further component to the output by the device. Typical styles may include, for example, jazz, blues, pop, rock or other styles pre-selected by the user. These styles may be preselected by the user through a user-interface of a software associated with the apparatus which may, in some embodiments, be provided by a docked or otherwise connected mobile device. As with the drum set selector 16, the style may be often left unchanged for a musical piece or longer.

The tempo BPM (beats per minute) selector 20 may comprise one possible means to adjust the rate or tempo of the beat produced by the device. Generally, the tempo selector 20 may comprise a knob with a range of tempos. For example, in some embodiment, the tempo may range from one to two hundred BPM. The tempo can then be dialed in manually to any of an infinite number of BPMs in the range.

The alternate means of selecting BPM may comprise the tap sensor 26. In some optional embodiments, the tempo selector 20 may be set to zero which initiates the tap sensor 26 to be ready for a manual input. The musician may physically tap a beat on the tap sensor 26 which will then make a BPM calculation to match the musician's finger taps and match that rate to the tempo output. When the tempo selector 20 is then later moved, the tempo selector 20 knob takes precedence over the tap sensor 26 and the tempo of the beat will then match that set on the tempo selector 20 indicator.

Yet another means of selecting BPM may comprise a holding down pedal 28 while no song is playing, and then tapping pedal 28 at the desired tempo rate. Further still, a dedicated tempo switch may be available so as to enable tempo switching during song playback. In yet further embodiments, tempo control may be provided via an expression pedal or a roller wheel integrated into the apparatus.

An optional functionality of the tap sensor 26 may be activated by, for example, tapping the tap sensor 26 only once. This may indicate to the processor controlling the apparatus to receive input from the pedal 28 or external footswitch to match the tempo inputted from the pedal 28 or tap sensor 26. This provides a means to adjust the tempo in an almost hands-free fashion. Some musicians prefer to tap a tempo with their foot rather than with their finger.

Embodiments of the present disclosure provide the ability to produce a looped rhythm and have the ability to introduce short "fills" or embellishments to the rhythm. It may be desirable to be able to interject different fills into a rhythm at specific places in a musical piece. It may also desirable to have different looped rhythms in a single musical piece. Taken one step further, embodiments of the present disclosure may allow each different rhythm loop to have associated with it a series of fills specific to that rhythm loop. In other words, the device has the ability to cycle between a pre-determined series of MIDI rhythms, each having a pre-selected sub-set of available fills.

Figure 9:
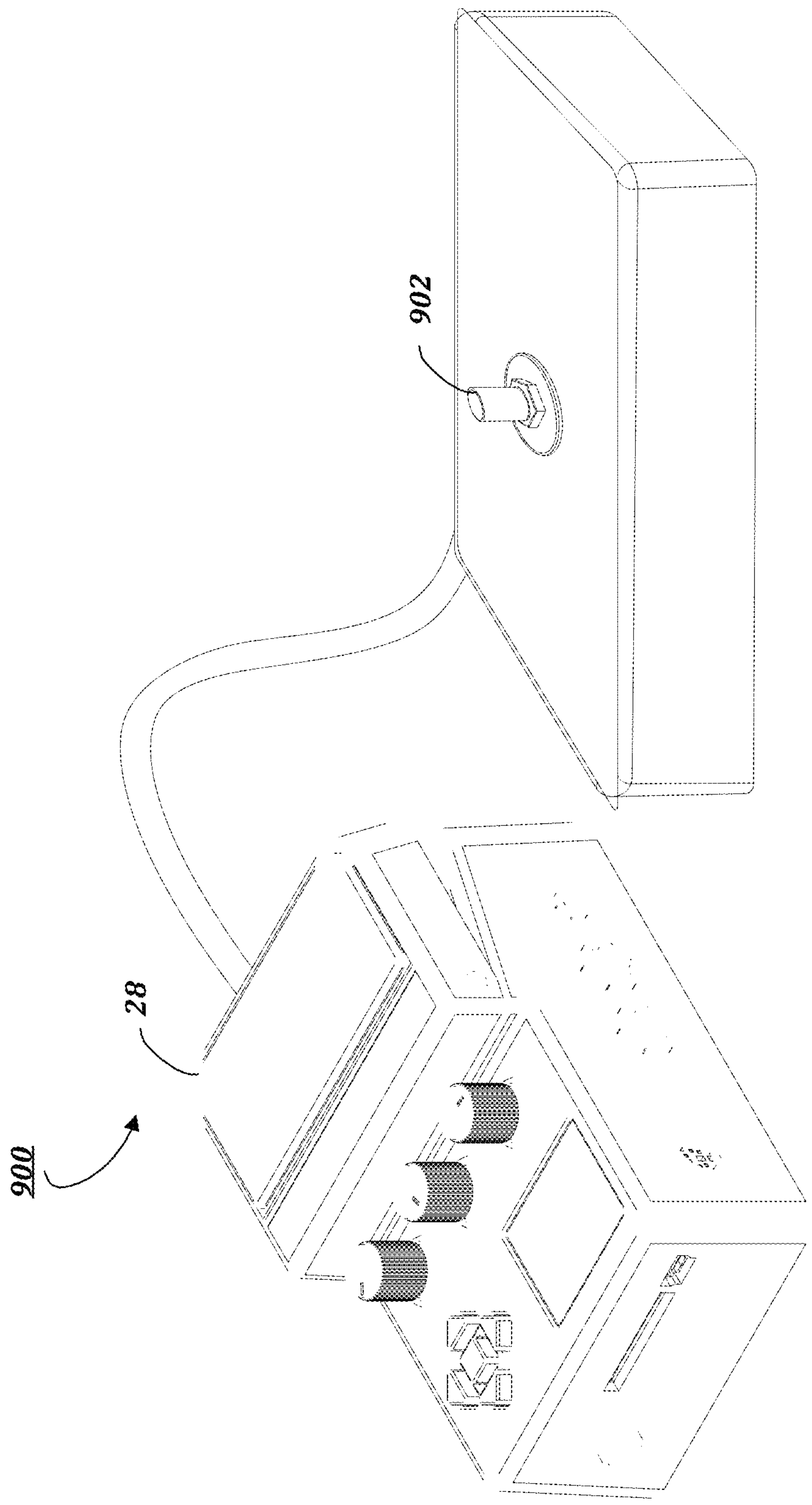
FIG. 9 illustrates a perspective view of an apparatus consistent with embodiments of the present disclosure.

Various embodiments with reference to FIGS. 2-3 disclose possible implementations of this functionality. Moreover, although FIGS. 2-3 disclose variations of the midi-sequence playback and interjection capability, FIGS. 8-9 illustrates yet another variation, which may be employed in separately or in combination with the aforementioned disclosure related to FIGS. 2-3.

Figure 4A:
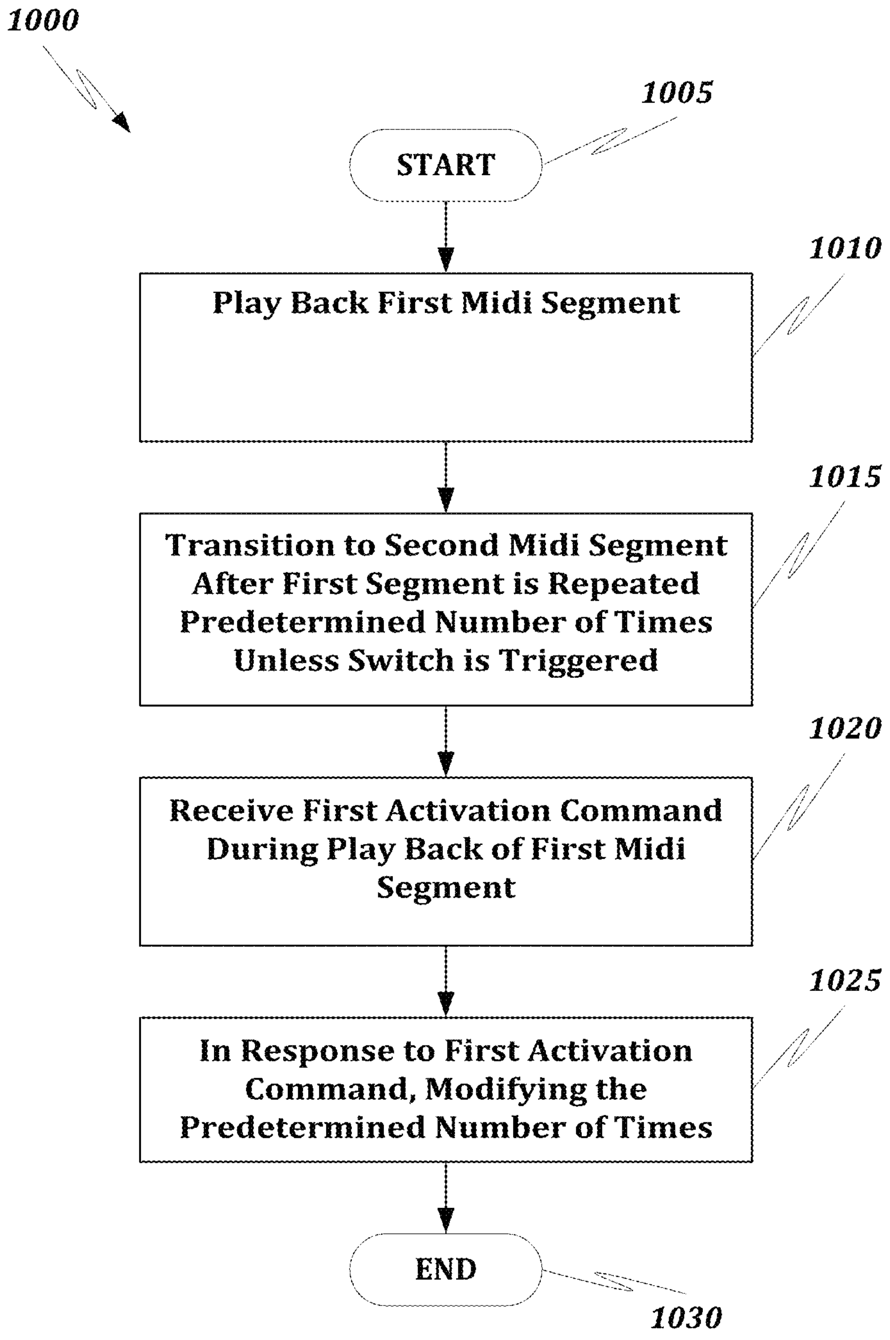
FIG. 4A is a flow chart demonstrating a method consistent with embodiments of the present disclosure.

FIG. 4A is a flow chart setting forth the general stages involved in an example method 1000 according to some embodiments of the disclosure for providing a music generation platform as described herein. Method 1000 may be implemented using a device or any other component associated with the platform described herein. For illustrative purposes alone, the device is described as one potential actor in the follow stages.

Method 1000 may begin at starting block 1005 and proceed to stage 1010 where the device may back a first midi segment of a song, the first midi segment comprising a first main midi sequence repeated a predetermined number of times.

From stage 1010, where the device plays back a first midi segment, method 1000 may advance to stage 1015 where the device may transition to a second midi segment of the song after the first midi segment is repeated for the predetermined number of times unless a foot-operable switch is triggered.

From stage 1015 where the transitions to a second midi segment, method 1000 may continue to stage 1020 where the device may receive a first activation command during the playback of the first midi segment. The first activation command associated with the first foot-operable switch may be triggered based on, at least in part, a duration and frequency of a user application of the first foot-operable switch.

One the device receives the first activation command at stage 1020, method 1000 may proceed to state 1025 where the device, in response to the first activation command, may modify the predetermined number of times the first midi segment is to be repeated. After the device modifies the predetermined number of times at stage 1025, the method 1000 may then end at ending block 1030.

Referring to FIG. 4B where the percussion sequence begins with a tap of the foot pedal 28 and loop segment 85 begins the first rhythm loop "A", which may repeat indefinitely. To introduce a fill, the musician taps the pedal 28 again to begin fill segment 86. Fill segment 86 concludes after it completes one play of the fill and then automatically reverts to rhythm loop "A", beginning loop segment 87, which repeats indefinitely.

At the musician's subsequent tap onto pedal 28, fill segment 88 begins consisting of a new distinct fill. When that fill plays once through, the beat again returns automatically to rhythm loop "A" represented by loop segment 89. Yet a third distinct fill may be initiated by another tap onto the pedal 28 represented by fill segment 90 which when completed reverts back to rhythm loop "A" in segment 90*a*. Continuing the example in FIG. 4B, the musician taps the pedal 28 again and the fill segment cycle repeats by again playing fill variation one, shown in segment 90*b*. Once this fill segment completes rhythm loop "A" returns in segment 90*c*. The user then presses and holds down pedal 28 and the transition fill may be initiated as demonstrated in segment 90*d*. When the pedal 28 is released, segment 91, the next in the series of rhythm loops, identified in this example as "B", may be initiated and begins cycling indefinitely. Pedal 28 may be tapped to begin segment 91*a* and the first fill associated with this rhythm loop may be played once and then reverts to rhythm "B" in segment 91*b*. The second fill sequence associated with rhythm "B" begins with another tap to the pedal 28 at segment 92 and naturally reverts the rhythm loop "B" in segment 93. Alternatively, these fills may be set to play in random, rather than sequential, order. A transition fill, designated by segment 94 may be initiated by holding the pedal 28 and when released the next rhythm loop, in this example back to type "A" is begun as shown in segment 95. If the user holds down pedal 28, the transition fill may be played (and looped, if necessary) for the duration of the hold. Once the user releases the pedal, the transition fill will end at the nearest beat or alternatively, at the end of the musical measure.

Although the chart in FIG. 4B shows two rhythm loops, each having three associated fills, it must be appreciated that with enough memory and processing power that there may be a many rhythm loops each with a large number of fills. The number of rhythm loops and fills utilized may be largely limited by how many the musician has the ability to manage and play. For most songs a musician might use about no more than ten rhythm loops with each having ten or fewer fills. This is in no way limiting to the capability of the device, because, with sufficient memory and processing power, there may be no practical limit to the number of rhythm loops and associated fills that could be programmed.

Similarly, in some scenarios the device may be programmed with fewer rhythm loops and fills than shown in FIG. 4B. For example, a musician may prefer to have two rhythm loops with each having only one or two associated fills. This may be easier for the musician to manage while the device could retain the expanded functionality to add more complex patterns at other times.

Also, each of the above-referenced features with regards to FIG. 4B may also be operational during a "performance mode" of the device, as disclosed herein.

Referring to FIG. 4C, where an auto-pilot percussion sequence begins with a tap of the foot pedal 28 to begin the first loop of a main midi sequence 185 of a midi segment or rhythm loop "A". To introduce a fill, the musician may tap the pedal 28 again to begin fill segment 186. Fill segment 186 concludes after it completes one play of the fill and then automatically reverts to rhythm loop "A", beginning loop segment 187.

After a certain number of measures, or a certain number of loops of the main midi sequence, the beat may automatically transition to a next rhythm loop or midi segment "B," and may automatically insert a fill at the transition. Further, fills may be automatically or manually inserted or removed at any point by a user, or at quantized positions, such as at the beginning or end of a measure and users may restart segments or initiate a transition to a next segment, which may be automatically or manually chosen from a plurality of segments, which may be preset or loaded into the device. In this way, a user can play an entire song by letting the device automatically transition to the next song part after a preset number of loops of a main midi sequence for that part.

In the example shown in FIG. 4C, the beat automatically transitions by inserting fill 188 then beginning midi sequence 189. The user taps again to play fill 190 and the beat automatically resumes midi segment B by playing midi sequences 193*a-c*. The user taps again to manually change to segment C and a fill 194 is automatically inserted before midi sequence 195. A user taps again to pause midi segment C during fill 196, manually selects the next midi segment as segment A, and taps again to unpause and insert fill 198 before transitioning to midi sequence 199.

With reference to FIG. 4D, a performance mode is activated with a tap of foot pedal 28 to the first loop of a performance sequence comprising a main midi sequence 285. At 286, the user taps again to begin fill 286. The beat then automatically resumes rhythm type A and plays midi sequence 287. The user taps again to transition to another rhythm loop "B". A transition fill 288 may be automatically or manually inserted before midi sequence 289. A user taps again to insert fill 292 before midi segment B automatically resumes with midi sequence 291. A user taps again to insert fill 292 before midi segment B automatically resumes with midi sequence 293*a-c*. The user taps again to transition to another rhythm loop "C," and a fill 294 may be inserted before the beat automatically transitions to midi sequence 295. The user taps again to insert fill 296 before rhythm loop C automatically resumes with midi sequence 297. A user taps again to insert a fill 298, and again to end performance mode at 299.

The device may then automatically generate midi segments A, B, and C by recording the rhythm loop type, number of repetitions, and the position of any fills. The device may save an ordering of such segments as a "performance" which may then be played back using the "auto-pilot" feature. Further, features described herein may enable a user to edit various parameters, compose or arrange, upload, download, share, or collaborate on "performances"

which may be played back, such as being later played back using an "auto-pilot" feature as described herein.

Figure 4E:
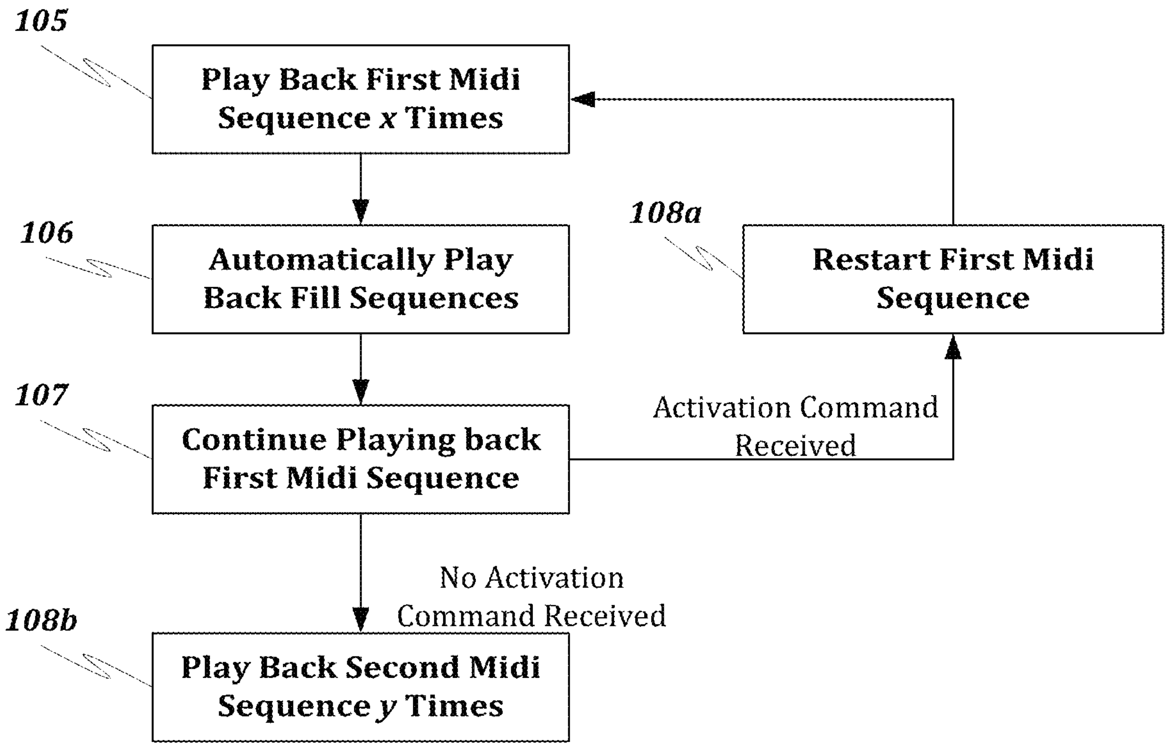
FIG. 4E is a flow chart demonstrating an example method of the present disclosure.

FIG. 4E is a flow chart of an example method according to the present disclosure. The method enables a user to (1) playback 105 a first midi segment comprising a first main midi sequence that is repeated for a predetermined number of times. The device may then (2) automatically insert 106 one or more midi fill sequences into the first midi segment at preselected or automatically determined times. The first midi segment may (3) continue or repeat 107 after any fills until the predetermined number of loops has been completed. In response to an activation command on a foot-operated pedal, the first midi sequence of the first midi segment may be (4) restarted 108*a*. If the activation command is absent, a (5) automatic transition 108*b* to a next midi segment occurs after the last loop of the main midi sequence of the first midi segment is complete. In this way, a user can play through each segment of an entire song, while interacting dynamically with each individual segment.

With reference to FIGS. 4B-D there are at least two rhythm loops identified as a first type ("A") and a second type ("B"). In one example, the first type and second type may be individually associated with three pre-selected fills, designated with a numerical subscript. Segments 85 through 95 in FIG. 4B are an example of how the device might ideally work to play a complex percussion set. In this example, there are unique fills and a transition fill associated with each of loops "A" and "B", designated by subscript notation. Note that although these charts may be temporal, the length of time of any particular segment cannot necessarily be directly extrapolated. In other words, each segment may be played for a distinct length of time.

Various embodiments of the present invention may include a "round robin" feature that assists in creating tension and release or a more natural sounding result during playback. With reference to FIGS. 4A-C, sequence, midi sequences, main midi sequences, and/or midi fill sequences, may be manually or automatically inserted in various embodiments. These sequences may each be grouped by association with a rhythm loop or midi segment. Further, each sequence may comprise a set of similar sequences with slight variation in, i.e., tone, velocity, or timing, such as the natural variation that would occur as the result of a physical instrument being played by a live musician. Each time a sequence is to be played, the device may automatically select the sequence from a plurality of similar sequences having natural variation as described above, to facilitate creating a desired sound or song dynamic, or to produce a more natural sounding result. The selection can occur by performing an analysis of song structure, metadata about the sequences or samples, or the like.

It also is noted that references to a user tapping or taps of the foot pedal 28 may comprise of one or more short or long taps of the foot pedal 28, or one or more presses and holds of the foot pedal 28, some other command, or some combination thereof. Further, it is noted that these figures demonstrate nonlimiting example, and that this disclosure contemplates that the features described could be omitted or used in various other combinations. Further, it is noted that although the sequences are referred to as beats, this reference is by way of non-limiting example only, and the sequences could comprise any instrument, such as bass, guitar, keyboards, vocals, etc., or some layered combination thereof.

In some embodiments, an apparatus may be configured to enable the user to insert a desired fill sequence into a main midi-sequence. Accordingly, the apparatus may include a plurality of foot-operated switches configured to operate the midi-sequence module. Further, a first set of foot-operated switches may be configured to trigger a corresponding main midi-sequence from a plurality of main midi-sequences. Additionally, a second set of foot-operated switches may be configured to trigger a corresponding fill sequence from a plurality of fill sequences to be interjected into a main midi-sequence. Accordingly, a user may be able to trigger a main midi-sequence by activating a first foot-operated switch and interject a fill sequence into the main midi-sequence by activating a second foot-operated switch associated with the fill sequence.

Further, in some embodiments, the second set of foot-operated switches may be associated with a plurality of fill sequences. Additionally, the plurality of fill sequences may be characterized by a corresponding plurality of intensity levels.

Further, in some embodiments, each of the second set of foot-operated switches may be associated with a common fill sequence. Additionally, each of the second set of foot-operated switches may be further associated with an intensity level characterizing the common fill sequence. Furthermore, in some embodiments, wherein the second set of foot-operated switches may include three switches, such as secondary foot-operated switches 802, 804 and 806, as illustrated in FIG. 8. Further, a first switch 802 may be associated with a low intensity level, a second switch 804 may be associated with a medium intensity level and a third switch 806 may be associated with a high intensity level.

Further, in some embodiments, at least two switches of the second set of foot-operated switches may be configured to trigger each of the common fill sequence characterized by a first intensity level and the common fill sequence characterized by a second intensity level. For example, activating each of the first switch 802 and the second switch 804 may cause both a low intensity version and a medium intensity version of the common fill sequence to be interjected together into a main midi-sequence.

Further, in some embodiments, a foot-operated switch of the second set of foot-operated switches may be configured to cause a transition from a main midi-sequence to a fill sequence associated with the foot-operated switch. For example, the foot-operated switch may be configured to cause the transition based on holding down of the foot-operated switch.

Further, in some embodiments, the apparatus may further include a third set of foot-operated switches configured to trigger a plurality of accent hit sounds to be interjected into a main midi-sequence.

In some embodiments of the present disclosure, every time an input causes a change in the MIDI, loop or fill playing, such as tapping pedal 28, the background of the display 24 may change colors to visually indicate the change in the state of the midi-sequence output being played by the device. For example, in some embodiments of the present disclosure, the display 24 may show a red background during the intro and/or outro, a green background during a song part, a yellow background during a fill, and a white background during a transition and a black background while paused. In this way, a user of the device may be easily enabled to determine which midi-sequence is playing and, therefore, will be enabled to better discern the action that may be taken by the device upon a subsequent tap of pedal 28. The user may be enabled to program the sequence of the rhythms, their corresponding display colors, and corresponding functionality of the pedal 28 within those sequences though a user-interface of associated software. As mentioned above, the user-interface may be adapted on a docked mobile device or other external connection to the device.

Consistent with embodiments of the present disclosure, display 24 may indicate which songs, parts of songs (e.g., as corresponding to, for example, header 545 in FIG. 5C), beats, fills, and/or accents are currently being played (or will be played in the future).

Furthermore, in some embodiments of the present disclosure, the background of display 24 may be enabled to visually display the current beat that is being played. Display 24 may display in writing what the current time signature is (for example, "4/4" indicating there are four beats in the measure). Display 24 may further provide a visual representation of each beat in the measure as the beats progress through the measure. For example, if the song has four beats per measure, the background of display 24 may be segmented into four equal portions. Each portion may be sequentially illuminated to indicate the progression of the beat in the measure. Accordingly, the first beat of the measure may be indicated by display 24 with a color of the first segment distinguished from the remainder three segments. For the second beat of the measure, the color of first segment may now be restored to its original shading while the second segment may now be distinguished in color. Similarly, for the third beat of the measure, the third segment of the display may be distinguished in color while the remainder of the segments maintains a uniform color. Finally, for the fourth beat of the measure, the fourth segment may be distinguished in color while the remainder segments maintain their uniform color. In this way, a user of the apparatus may be able to quickly derive the beat within the measure by viewing which segment of display 24 has a differentiating display characteristic.

Still consistent with the embodiments of the present disclosure, display 24 may indicate a progression of the beat with a vertical bar propagating across display 24. In other words, during a first beat of the measure, a vertical bar may be displayed at a first position. Then, during a second beat of the measure, the vertical bar may be displayed in a second position that is adjacent to the first position. If the time signature changes to a different measure, the width of the vertical bars may change to become longer for a lower number of beats per measure, or shorter for a greater number of beats per measure. In this way, a user may be enabled to visually keep track of how many beats there are in the current measure, how many beats in the current measure have already been played and how many remain. It should be understood that the previous description of the use of vertical bars to indicate beats within a measure is merely illustrative and this concept may be displayed in a variety of visual representations other than vertical bars.

A port 57 for an external switch may be provided. This external switch may be a dumb foot switch that acts as a signaling means to cause the device to overlay a pre-selected sound, such as a hand clap, cymbal crash, or any other single-shot sound, to be played by the device. FIGS. 2-3 show an accent hit switch 245 providing similar. Alternatively, the external switch may contain an external audio generator that contains its own single-shot sound that may then be incorporated into the sounds generated by the device itself and transmitted on to an external amplifier through the outputs 40.

In some embodiments of the present disclosure, an external foot switch may be operable to pause and unpause the MIDI sequence that is currently being played by the device. The device may be set to continue playing where the loop was paused or alternatively to restart the loop from the beginning when unpaused in order to allow the musician easier rhythmic coordination. Additionally, a second external foot switch may be operable to advance to the next MIDI sequence in the program, or act as a dedicated tap tempo input so the user can enter tap tempo mode hands-free while playing and change the tempo as the song is being played. Furthermore, one or more expression pedals, such as for example, pedal 902 as illustrated in FIG. 9, may be paired with the device in order to control various sound aspects, such as but not limited to, volume, tempo and dynamics (for example, making the drums hit harder or softer, controlled by MIDI values 0-127). The function of one or more external foot switches or expression pedals may be programmed by the user through a software interface associated with the apparatus.

Power may be supplied to the device by an internal supply such as a replaceable or rechargeable battery. It is anticipated that a common Lithium Ion battery would be sufficient. If the device is included in a rack system or daisy chained to other effects pedals, an external wired power supply may also be delivered to the device via a power supply interface means such as shown by port 34.

Inputs 30 are provided to receive an external audio source such as other effects pedals or instruments such as a keyboard or guitar. These inputs 30 are available for stacking a variety of devices in a daisy chain format where all signals generated by a variety of devices are funneled through a single stream through the outputs 40 to a final stage such as a mixing board, amplifier and speaker combination, or other device designed for receiving line level input from the device. The inputs 30 may channel the incoming audio stream through the audio processors integral to the device, or may alternatively bypass the signal processing capability of the device and deliver an unaltered signal to the outputs 40 where the signal may be combined with the processed signals generated by the device.

Inputs 30 may be designed to readily accept digital or analog audio signals in monophonic (mono), stereophonic (stereo) or other multi-track format. If a known signal source is mono, then one specific channel may be designated as such. Similarly, the outputs 40 may be digital or analog and carry any pre-designated number of parallel signals, typically mono or stereo format.

The device may be highly flexible and adaptable due, inter alia, to its internal signal processor and memory module. The memory module may be adapted to store a plurality each of MIDI percussion segments, MIDI fills, MIDI instrument voice processes, style processes and other related data to perform the functions described, herein. In various embodiments, the memory module may be pre-loaded with several MIDI drum set voices, several MIDI style processes, and a number of rhythm loops and fills. In this form, the device can be used directly off the shelf.

For more sophisticated users the device can be interfaced with an external computer device via a port 38 which may take the form of universal serial bus (USB) port or other type of interface commonly available in the art. Similarly, the device may have a wireless communication means such as Wi-Fi, Bluetooth or other wireless communication means that may become commonly available as technology progresses from time to time. Port 38 may also be used to plug in external LCD screen to more clearly display the contents of display 24.

Additionally, available as an option may be an external memory card slot 32 that can provide other rhythms, voices, processes and other data that may be used by the device.

Current technology for an external memory card slot 32 interface could be memory cards, flash drives, solid state drives or other types of data storage or transmission means that may become available from time to time as technology progresses. The external memory card slot 32 may be utilized to deliver additional content to the internal memory means provided with the device or may augment the provided on board storage capacity that is integral to the device.

Figure 5A:
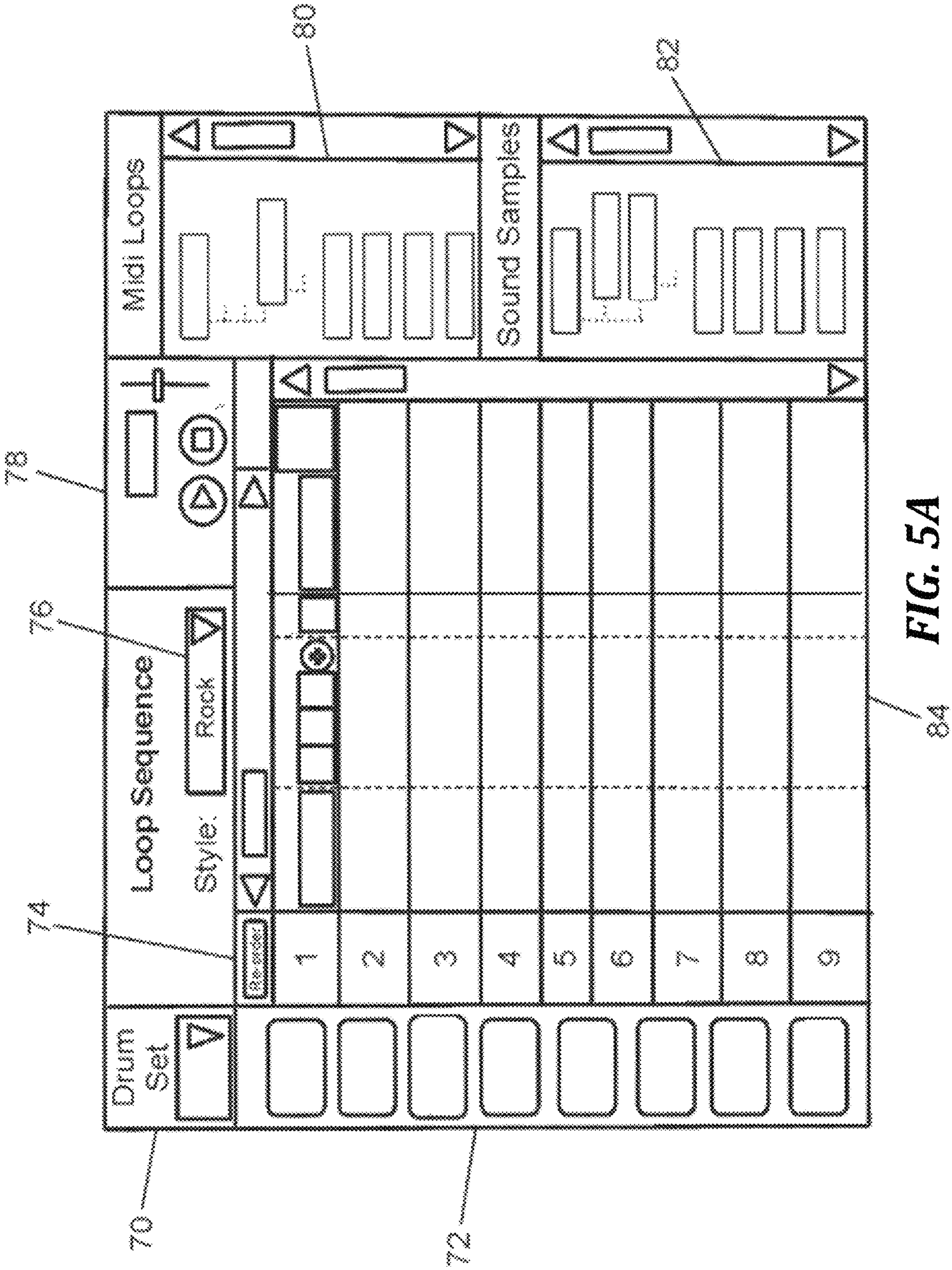
FIG. 5A illustrates an example of a screen shot of a control panel screen consistent with some embodiments of the present disclosure.

FIG. 5A is one example of what a software interface screen shot might look like. The interface may be provided on a mobile device docked or connected to the apparatus (as described above with reference to FIGS. 2-3), or on a computer connected to the apparatus. The computer could be a personal computer directly connected to the device via a cable to the port 36 or connected wirelessly. If wirelessly, then the device could be Internet connected and would then be accessible anywhere on the cloud from other portable devices. Some mixing boards or other audio equipment may also be designed to interact with the device to make changes to the MIDI files, rhythms, loops, fills, drum sets, sound samples, processes or other variables stored on the device or affecting how the audio generated is manipulated or produced. It may also include a selection of whether the signal received from the inputs 30 is filtered through the processor logic or simply passes unaffected to the output 40 on the device.

When the device is interfaced with a computer or docked mobile device, a software program can be used to manipulate the various features of the device and the software interface may appear similar to the example shown in FIG. 5A that comprises, inter alia, a drum set 70 identifier with instrument voice definitions for the component instruments 72. Here the drum set 70 can be conveniently categorized and named according to the musician's needs. For each drum set 70 the several component drums can be set individually as component instruments 72. Typically, the component instrument 72 are individual MIDI instrument voice instructions or processes that may simulate, for example, a specific snare drum or type of cymbals, which give personalized characteristics to each individual instrument. Drum set elements are sound files, for example MP3 or WAV files. Multiple drum sets 70 may be organized, each having a predetermined set of component instruments 72. By dragging and dropping individual files from the host computer the manipulation of component instruments is easily made and verified in a graphical format.

By organizing the drum set 70 from individual files of instrument voice files in memory, storage space may be saved by merely referencing the instrument voice as a component instrument 72 from a catalog held in the storage means. If needed, the musician may then substitute out an instrument voice from a specific component instrument 72 instead of creating a whole new drum set 70 which is an inefficient use of storage space. This also provides for maximum flexibility of what a drum set 70 may sound like.

The style of the loop sequence 76, such as rock, metal, jazz or others, can be set for a particular set of percussion loops. For testing purposes, the percussion selection may be played with options in the control pane 78. The several MIDI loops may be organized and changed in pane 80, which references the style selector 18 found on the device.

Sound samples 82 can also be moved in a drag and drop fashion to any of the other panes in the computer interface screen. This may include a browse-able library of loops, fills, instrument voices, processes and any other files which may be utilized for the various effects and uses of the device.

The main window 84 may be where the queued loops and their associated fills may be established. In this example shown in FIG. 5A, there are two main drum loops and an auxiliary sound defined. The auxiliary sound may be executed with an external foot pedal connected to the port 38. The first drum loop has three fills designated. More drum loops may be added into the sequence for a particular set. The sets are numbered from one to nine in this example, but may be expanded to include any number of sets. The sets may be easily re-ordered by selecting the "re-order" function. Alternatively, all of these files and functions may be controlled with the drag and drop method.

Figure 5B:
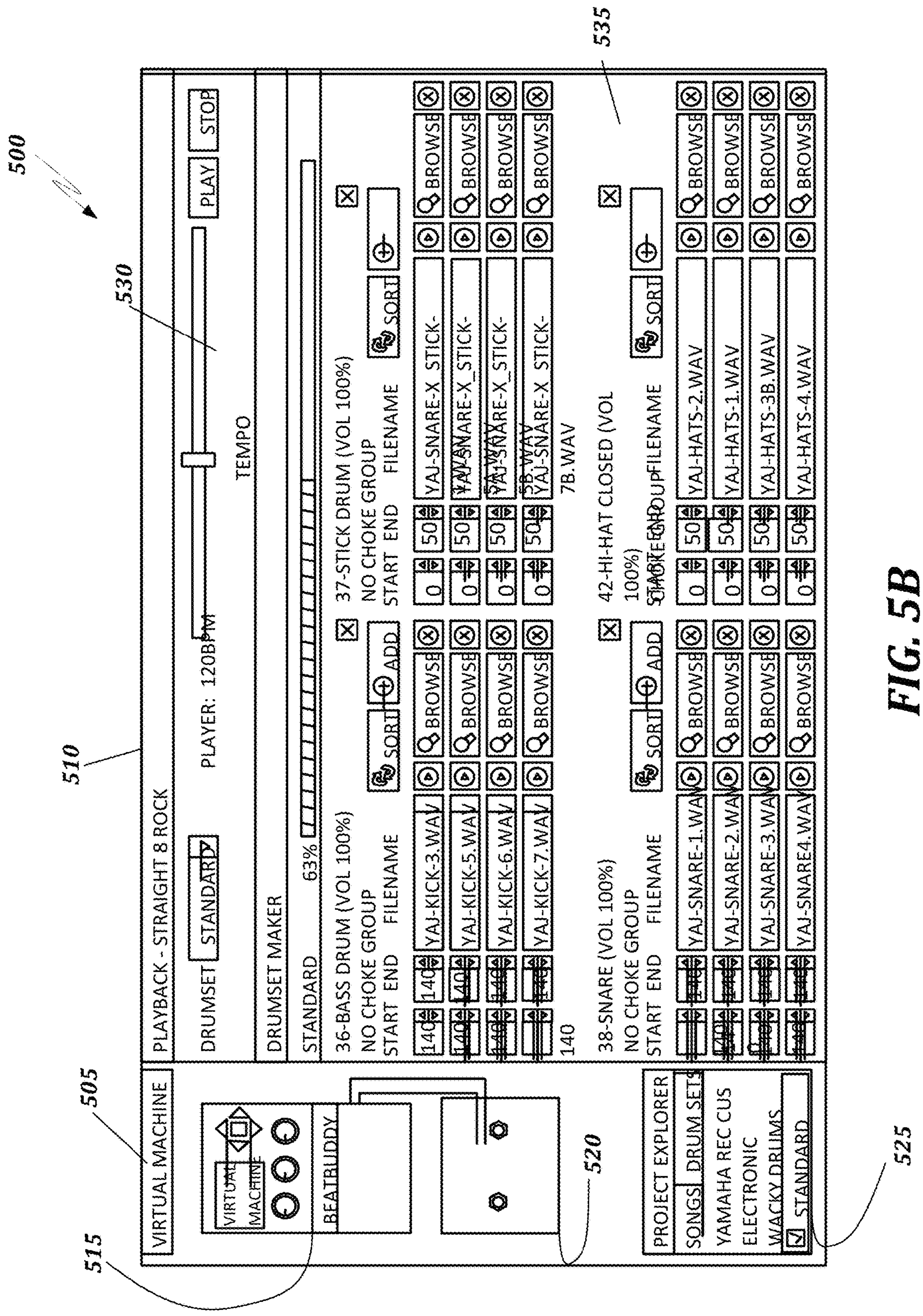
FIG. 5B illustrates an example of another screen shot of a control panel screen consistent with some embodiments of the present disclosure.

FIG. 5B illustrates another embodiment of what a software interface 500 might look like. Software interface 500 may be, for example, a virtual machine enabling a computing device (e.g., docked mobile device), to simulate the functionality and switches of a connected apparatus.

The interface may comprise a first frame 505 and a second frame 510. First frame 505 may show a graphical rendering of the apparatus 515, as well as any connected foot switches or expression pedals. In some embodiments, the connected peripherals 520 (e.g., foot switches or expression pedals) may only be displayed if their connection is detected. Still consistent with embodiments of the disclosure, a user may click on a graphically rendered switch or knob of the displayed device to set its desired functionality. Accordingly, the switches and knobs of the apparatus may be programmed through the software interface in this way.

In yet further embodiments, first portions of displayed apparatus 515 and displayed peripherals 520 may act as a selectable button that may be activated by a user to initiate the various fills and beats of a song. In turn, a tap of pedal 28 may cause a similar functionality.

First frame 505 may further comprise a project explorer window 525 where the user may select different songs and drum sets. In various embodiments, using, for example, selectors on the apparatus may enable a user to, for example, navigate the project explorer upon the users selection of a new song or project with the selectors. In this way, a selection on the apparatus itself may impact a display or cause an action in the software interface.

Second frame 510 may comprise a playback window 530 and a drum-set maker window 535. Playback window 530 may enable a user to select a drum-set, a tempo, and initiate a playback of the selected drum-set and tempo. Drum-set maker window 535 may enable a user to customize the sounds and tones associated with the drum-set, much like that as described for FIG. 5A.

To improve the functionality of the software, custom file extensions, preferably having a proprietary format will be utilized. For example, in some embodiments of the software a ".bdy" file extension may be used to save the profile of the user including most settings for the way the device may be configured by default for that user, including drum sets, drum sequences, etc. The user can then load this file on another copy of the device and get the exact same setup. Alternatively, the user may then be able to have multiple profiles, one for each ".bdy" file. This is beneficial, for example, if the user is playing a different concert which needs different sequences and drum sets, he can quickly load this ".bdy" file and have the device set up in a customized way.

Another proprietary extension used with the software may be a ".seq" file extension which may designate a loop sequence file. This file will be a combination of the MIDI and WAV files that make the loop sequence (or "song"). This allows the user to save a loop sequence he likes and use it on another copy of the device or share it with his friends without having to re-build it again out of the separate MIDI and WAV files.

Yet another proprietary extension used with the software may be a ".drm" file extension which may designate a drum set file. This file may save the combination of WAV files used in the drum set. The user can make his own drum set and then share it with his friends by just sending this file instead of all the separate WAV files and avoids having to re-build the drum set instructions again in the interface software.

Figure 5C:
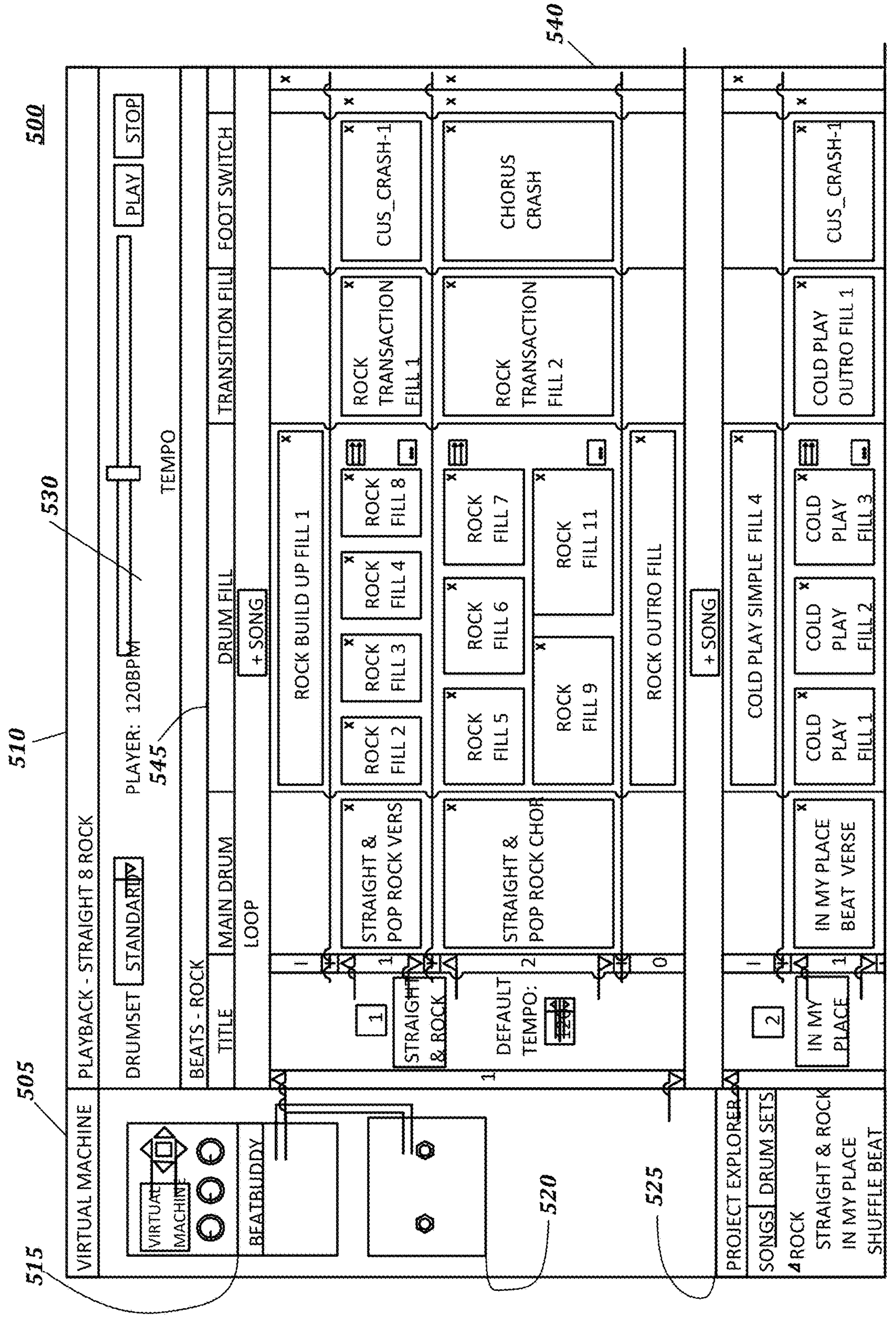
FIG. 5C illustrates an example of a third screen shot of a control panel screen consistent with some embodiments of the present disclosure.

There may be a variety of software packages that can be used to manipulate various features of the device. FIG. 5C illustrates yet another embodiment of what a software interface 500 might look like. Software interface 500 may further comprise song window 540. Within the song window 540, a user may be enabled to create and save a list of songs, wherein each song may be comprised of, but not limited to, for example, an intro fill, a first verse beat, fills associated with the verse beat, a transition fill, a second verse beat (a chorus beat), fills associated with the second verse beat and an outro fill. The corresponding portions of song may be labeled in columns in header 545. It should be noted that when a user accidentally triggers the playing of a fill (e.g., an outro fill), the user may cancel the accidental trigger by quickly tapping on pedal 28 again.

The sound files may be stored as 16 or 24 bit WAV files. Likewise, the foot switch portion of the icon may act as a button to trigger these WAV files. The software may enable a user to add fills to a song by selecting standard general MIDI files in any time signature. The software may also enable a user to delete fills in the song. The software may provide a button that allows a user to select whether to play fills in either sequential or in random order. The software may further enable a user to add additional song parts (such as a bridge), rearrange song parts, and delete song parts. The software may enable a user to select different drum set types to play each song. Songs may be arranged in any order such that a user may create a specific set list. The software may further enable a user to export a song as a single file or backup the entire content of the device, so that it may be stored or shared. The user may then use pedal 28 to navigate and playback the various programmed sequences, while viewing a corresponding color associated with those sequences (or group of sequences) on the device display. In various embodiments, the device display, as well as the software interface, may be provided by a mobile device docked to the apparatus.

The software may further enable the use of specialized temporary "choke groups" to allow the smooth transition between any two percussion loops. Generally speaking, a choke group is used to tell a superseding instrument to mute the sound of a preceding instrument if it is still being played when the superseding instrument begins to play. For example, when an open hi-hat is played, the sample can last for two or three beats if just left ringing unchecked. If it is followed by a closed hi-hat being played, the closed hi-hat sound will "choke" or mute the open hi-hat sample, such that they are not both sounding at the same time. The software may enable the use of choke groups to conditionally mute certain instruments in the drum kit transitioning between different loops, such as main beats and fills. This may be beneficial because many fills end with a crash, and many main beats start playing with a hi-hat or a ride cymbal, however a real drummer would generally never play a hi-hat or ride cymbal on the very first beat together with the crash, therefore the use of choke groups create a more realistic sound. As such, when certain notes end the fill (for example, a crash), certain other notes (for example, a hi-hat or ride cymbal) may be omitted if present in the first sixteenth (1/16), or some other pre-determined period of time, of a beat of the main beat. This also applies when beginning a fill. For example, if the main beat played a crash when the fill was triggered, the hi-hat or ride cymbal may be omitted in the beginning of the fill. Additionally, the specialized temporary choke group can omit notes if the same note is present within a determined time period of time after transitioning to a new loop, such a fill. This will prevent the same note from being played in succession too rapidly to sound natural. For example, when using samples (e.g., midi or audio) that were recorded by a real drummer, rather than created by a computer program, the notes are not exactly on beat as there are variations to a real drummer's playing. This would mean that when transitioning between two midi loops, if a drummer hit the kick drum slightly early at the end of one loop and slightly late at the beginning of the loop that is being transitioned into, the kick drum would be triggered twice in very rapid succession, creating an unnatural repeating or delay effect. This choke group would prevent the second note from being played if it is too close to the first note. This may allow any fill to be used with any main beat and the smooth transition between any two percussion loops and avoids playing conflicting notes at the same time or too rapidly in succession.

Figure 14A:
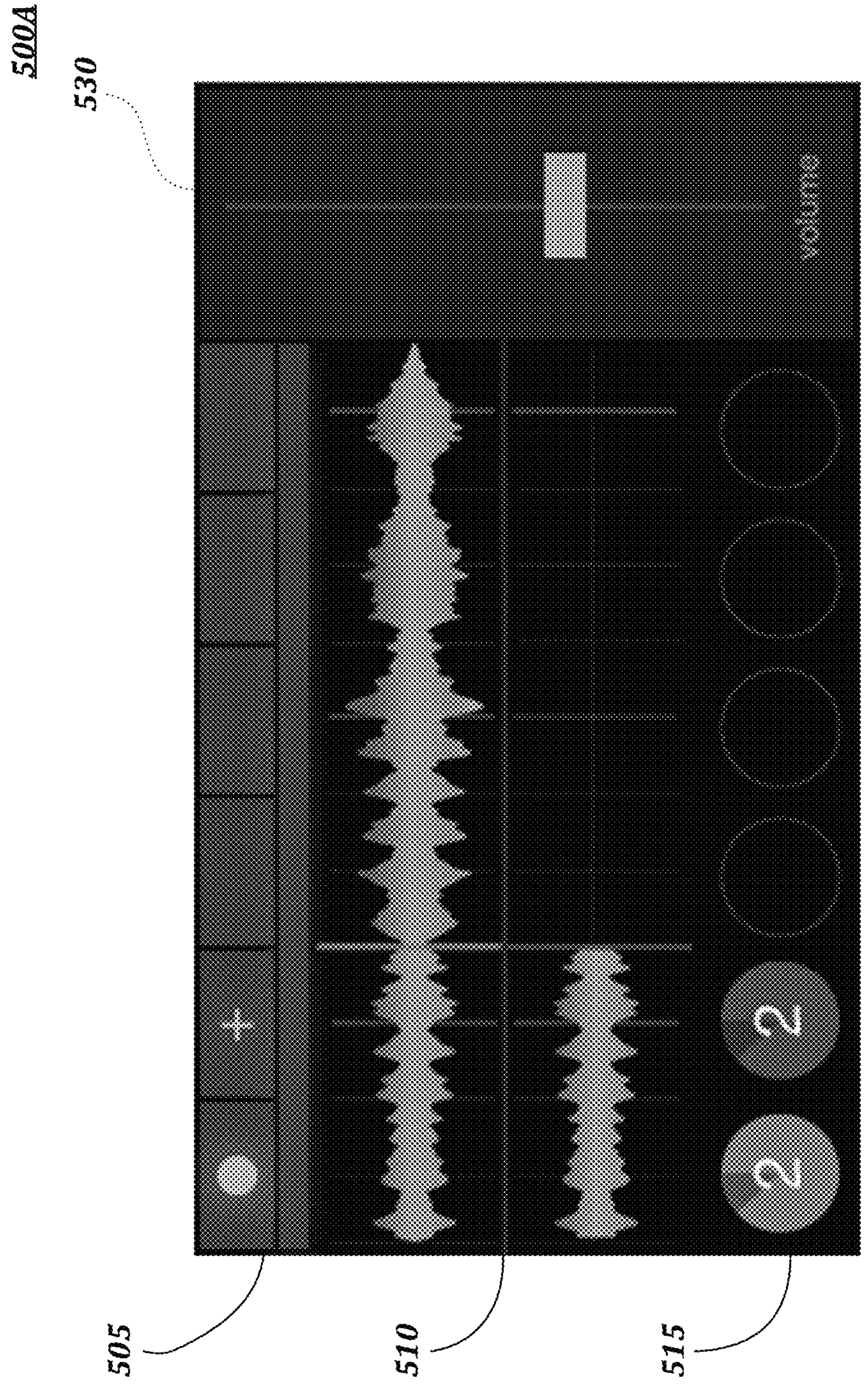
FIG. 14A illustrates an example user interface for recording and rendering multimedia.
Figure 14B:
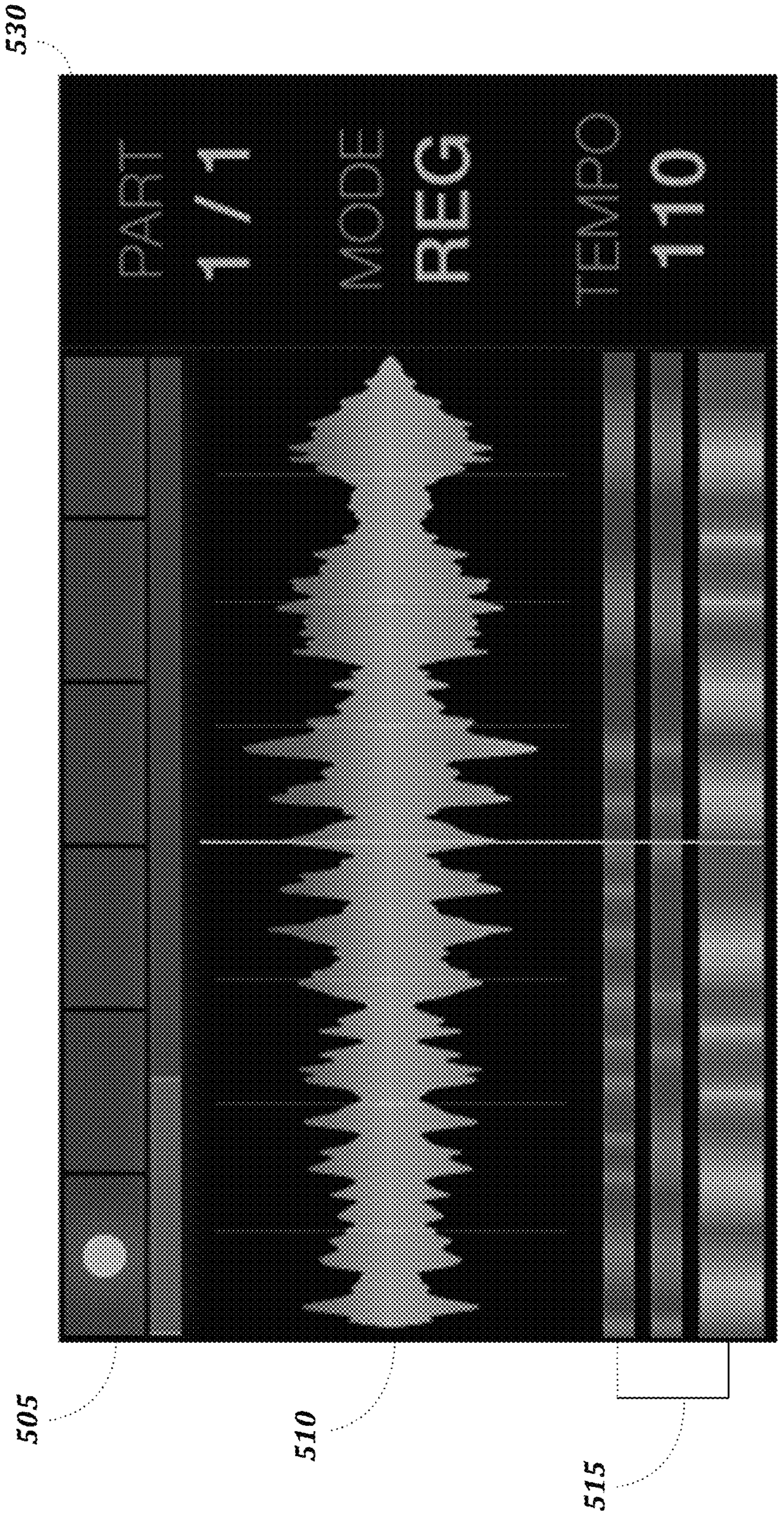
FIG. 14B illustrates an example user interface for recording and rendering multimedia.

FIG. 14A-14B illustrate indicators of song, track, and layer playback according to some embodiments, and will be detailed below. For instance, as shown in a user interface 1500A illustrated in FIG. 14A, track playback control and progress may be provided by indicators positioned in a first segment 1505 of display 1110, song part playback control and progress may be provided by indicators positioned in a second segment 1515 of display 1110, and track or layer waveform may be positioned in a third segment 1510 of display 1110. In some embodiments, as illustrated in FIG. 14B, tracks may be represented as density charts, indicating the signal density in track overlays.

Looper 1105 may display a plurality of waveform data in third segment 1510. For example, the segment 1510 may be comprised of a top waveform and a bottom waveform. The top waveform may display a first or most recent track that is recorded for a song part, while the bottom waveform may display a second or previous track that was recorded for the song part. In the event that a song part comprises more than two tracks (e.g., six tracks), tracks 3-6 may alternate or auto-group as overlays on top of waveform 1 and waveform 2 (see segment 1515 in user interface 1500B). In such embodiments where the waveforms are implemented as overlays, the platform may detect the density of the waveforms and then group high density ones with low density ones. For example, high density representations tend to correspond to strums of a guitar which are visually thick, while low density representation tend to correspond to a rhythmic portion, which visually have pulses.

Accordingly, embodiments of the present disclosure may provide a method for displaying a waveform using gradients. The gradients may be comprised of variations to, for example, color density of at least one color. The variations in color density may depict the relative or absolute magnitude of a corresponding waveform.

Continuing with the example, each new parallel loop recording (or overdub) will push a previously recorded waveform down into the gradient display section 1515 and represented in gradient form. There may be a plurality of gradients displayed in section 1515, with a base waveform (first recorded waveform) displayed with a larger visual representation. Different quantities of gradient waveforms may be displayed in varying colors, intensities, and sizes.

It should be noted that one benefit of the gradient form is that it communicates pulses and their magnitudes without the visual "noise" of a waveform. These elements of a waveform may be important for a musician to know, to ensure synchronization and timing across a set of parallel loops. Consider a musician playing and recording multiple waveforms stacked in a parallel loop. In this scenario, one waveform may be visually digestible to the musician. More than one waveform becomes more difficult to follow. The gradient form is a clean way for the user to see and easily decoded the location of the dynamics in a track.

Consistent with some embodiments of the present disclosure, third segment 1510 may be configured to display layer information corresponding to each track, much like of the display of the track information corresponding to each song part. In this instance, both the display and corresponding button functionality may be modulated/transposed (e.g., the 'song part' display and functions now correspond to 'track' display and functions, and the previous 'track' display and functions may then correspond to 'layer' display and functions). In this way, the buttons and switches of looper 1105 may be configured to navigate songs, song parts, tracks, and layers, and the display 1110 as well as user interfaces may be updated in accordance to the functionality state of looper 1105.

Looper 1105 may display song part data in a first segment 1505. In this segment, a user may be enabled to ascertain a current song part as well as a queued song part. The queued song part may be displayed with, for example, a special indicator (e.g., a color or flashes). The user may further be enabled to add/remove song parts by activation of a corresponding song part switch. The song part switch may operate to queue a song part and the RPO button may trigger the queued song part to play (if there at least one existing track in the queued song part) and record (if there is not an existing track in the queued song part). A track part switch may function in a similar way.

Looper 1105 may display track data in a second segment 1515. In this segment, a user may be enabled to ascertain the tracks being played back and the track being recorded with a various of indicators. The indicators may display the progress of the playback or recordation within a looped measure. Each indicator may have a visual status for current tracks and queued tracks.

Figure 15A:
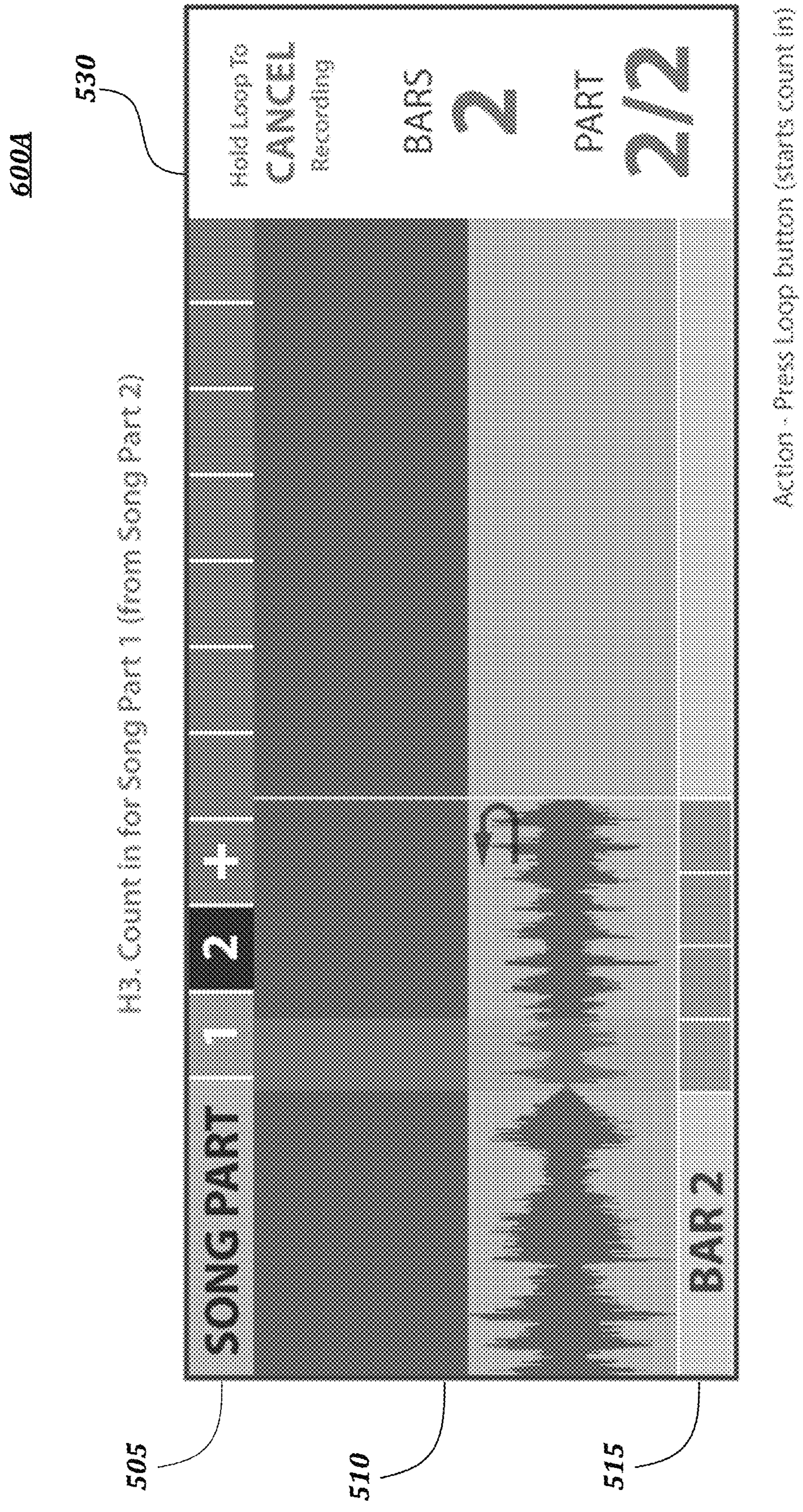
FIG. 15A illustrates additional examples of a user interface for recording and rendering multimedia.
Figure 15B:
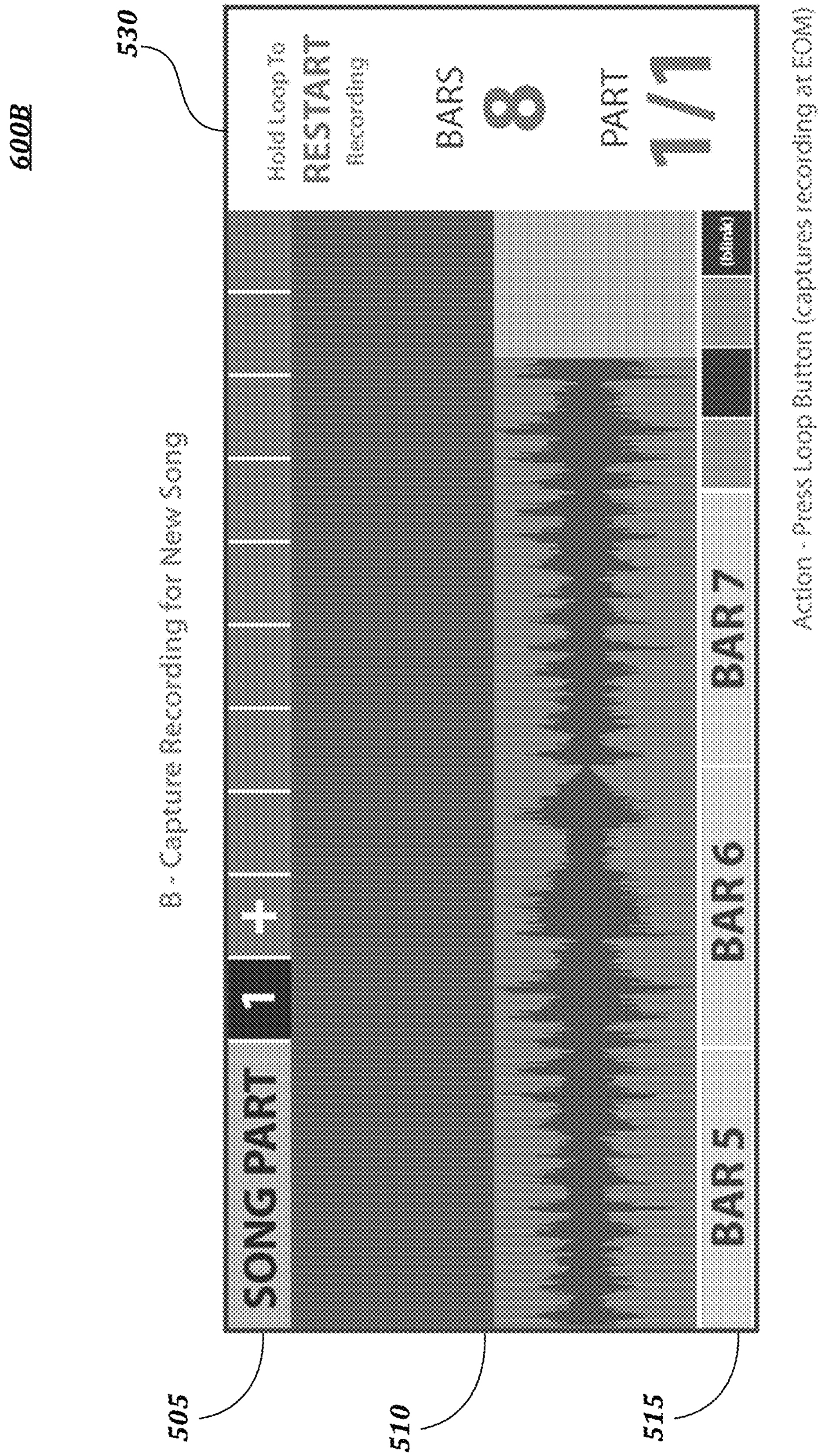
FIG. 15B illustrates additional examples of a user interface for recording and rendering multimedia.
Figure 15C:
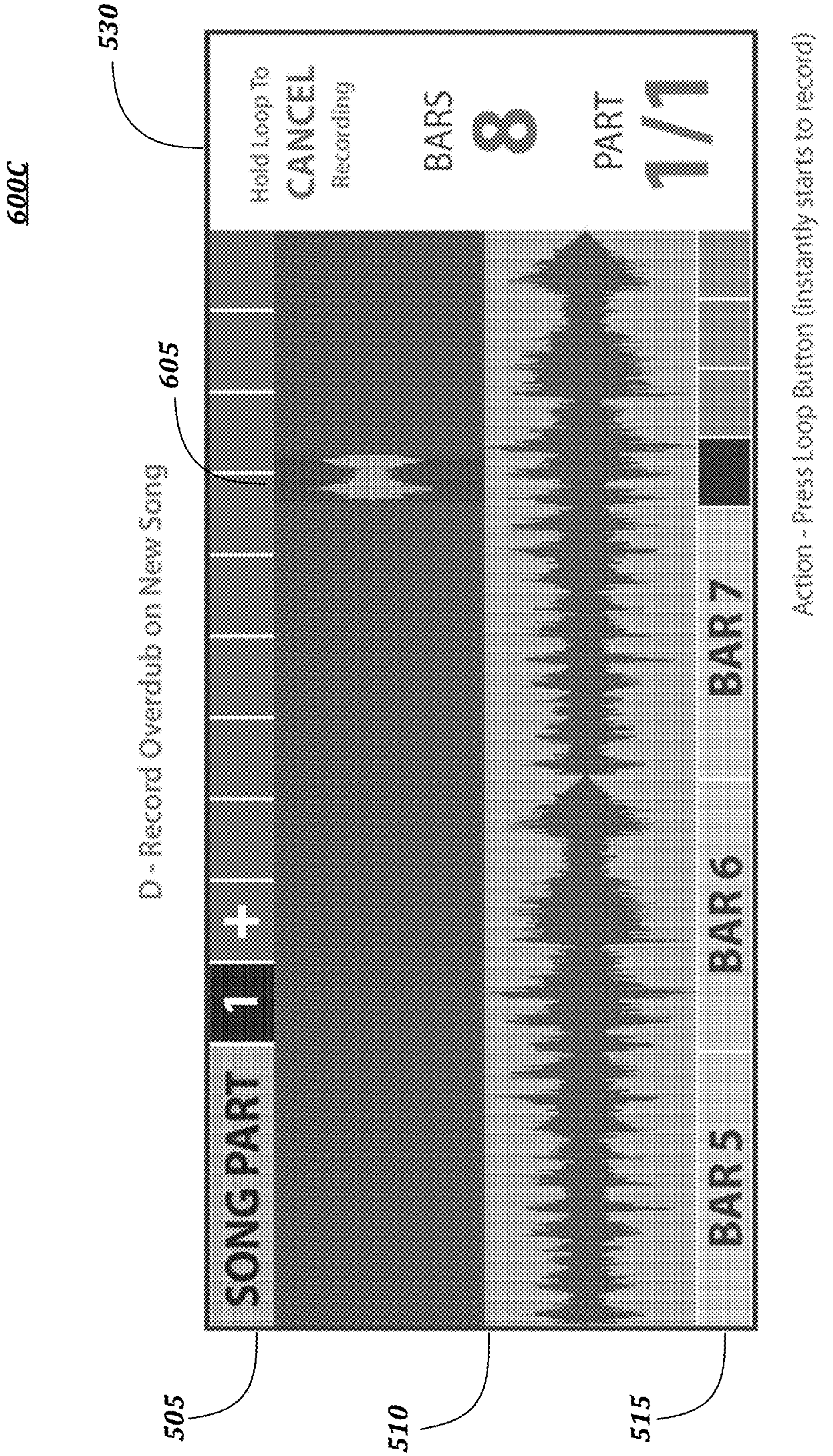
FIG. 15C illustrates additional examples of a user interface for recording and rendering multimedia.

FIGS. 15A-15C illustrate embodiments of a user interface for looper 1105. In general, interfaces 1600A-11600C may comprise a song part display 505 (e.g., an indicator as to which song part is being recorded), a waveform display 1510—(e.g., a visual representation of recorded/played back waveform), a track display 1515 (e.g., shows the progression of the tracks); and a details view 1530 (e.g., displaying song part and track parameters).

FIG. 15A illustrates a user interface 1600A depicting a Count In. FIG. 15B illustrates a user interface 1600B depicting a capture recording. FIG. 15C illustrates a user interface 1600C depicting a Record Overdub 1605.

In some embodiments of the present disclosure, a user may be enabled to pre-program tempo presets for individual song parts using the pedal 28 and/or a mobile device paired with the device. The programming may be done by, for example, using pedal 28 in conjunction with the software interface. As mentioned above, the software interface may be provided through a mobile device docked or otherwise connected to the apparatus.

The user may want to select specialized transition fills to shift from verse to chorus and chorus to verse. For example, when the user wants to switch from verse to chorus, he may press down the pedal and hold it down. The transition fill may be played over and over until he releases the pedal and the beat reverts back to the subsequent percussion segment of the underlying drum loop. In this way, the user may be enabled to transition between drum parts more in the way an actual drummer would by timing the switch exactly by lifting his foot off the pedal when he wants the switch to take place. The transition may take place at the end of the musical measure to keep the rhythm in time. A similar procedure may be followed when the user wants to switch from chorus back to verse.

The device according to some embodiments can also be fairly described as a percussion signal generator comprising a memory module, a foot operable pedal, an audio signal output and a signal processor. The memory module stores a plurality of percussion-segments and a plurality of fills that are adapted to be executable audio files. The percussion-segments are adapted to be played in a perpetual loop, playing seamlessly from the end of the loop and starting again at the beginning indefinitely. The memory module can store one or more pre-determined fill-subsets comprised of a sequence of one or more of said fills and each percussion-segment has an associated fill-subset of one or several distinct fills. The memory module can store at least one pre-defined percussion-compilation comprised of one or more of said percussion-segments, sequentially ordered and combined with said associated fill-subset.

The processor module may be adapted to execute said audio files resulting in generation of a percussion signal and delivery of said percussion signal to said audio signal output. Simultaneously, the signal processor may be adapted to receive and recognize from said foot operable pedal any of several cues. When a discrete percussion-compilation is selected a first cue causes said signal processor to execute a first of said percussion-segments of a said discrete percussion-compilation. When the first cue is repeated, it may cause the signal processor to execute a selected fill in an associated fill-subset and then revert again to the same percussion-segment. A repeat of the first cue may cause the signal processor to execute a subsequent fill in the associated fill-subset or if the final fill of said associated fill-subset has been executed then the first fill in said associated fill-subset is again executed and then revert again to the same percussion segment. A second type of cue may cause the signal processor to execute the subsequent percussion-segment of the percussion compilation and individual instances of the first cue cycle through one of each sequential, associated fill-subset. A third cue may cause the signal processor to cycle through executing subsequent associated fills without interruption. A fourth cue may stop the execution of said percussion compilation.

Variations of the percussion signal generator can further include a signal input means that may receive a music signal feed from an external source and an adjustable reverb effect generator that imparts a reverb effect onto the music percussion signal without affecting the percussion signal and delivering said music signal and said percussion signal to said audio signal output. Generally, the percussion segments and fills may be comprised in any format currently know in the art or combination thereof, including for example MIDI, WAV or MP3. In further embodiments, the device may use non-proprietary files, such as open source formats, and may be compatible with proprietary formats developed by other entities.

The device may include a memory card slot, an external signal generator, an external power supply and/or an external computer connector. Optionally, a style selector, a tempo selector or a drum set selector may be included individually or in combination to further control the percussion signal generated or to affect the music signal passing through the device from another source, such as a guitar.

Still consistent with embodiments of the present disclosure, electric drum pads may be connected to the apparatus. The connection may be a wired or wireless connection. Each drum pad may be assigned a function. The function may be, for example, a function that would otherwise be controlled by pressing the pedal or footswitches. In this way, a user may be enabled to control the device by hitting one or more of the connected drum pads. Accordingly, electric drum pads may serve as additional switches that, upon activation, trigger functionalities of the apparatus much like the footswitches and pedals associated with the apparatus.

In yet further embodiments, a 'song part' button may be provided. The button may be configured to cycle through multiple song parts or segments (e.g., 1>2>3>back to 1) to 'arm' the song part or segment that will start playing after the main pedal is operated to begin a transition. In this way, the user has the ability to select which next song part or segment to transition to, without being required to sequentially go through the song parts or segments. In some embodiments, two 'song part' buttons may be provided-one for forward cycling through the song parts or segments, and another for backward cycling.

The following presents a plurality of structural variations to the hardware design of a looper 1105 consistent with the present disclosure. However, hardware embodiments of the looper 1105 are not limited to any particular design. It should be noted, dimensions are provided for illustrative purposes only.

In general, the hardware may be configured to operate in a plurality of states. Each state may provide for a corresponding function to a switch or button. By way of non-limiting example, and referring back to FIG. 10, in a "Two Song Part" mode, switch 1125 may serve as an 'undo' function, undoing the recordation of the most recent layer. A subsequent selection of switch 1125 may cause a 'redo', thereby serving as an effect mute/unmute feature a most recently recorded layer in a track. Switch 1130 may be an RPO for Song Part I, while Switch 1135 may be an RPO for Song Part II.

As another, non-limiting example, in a "Six Song Part" mode, switch 1125 may serve as to select, queue, and transition to another song part. Switch 1130 may serve to select, queue, and transition to another song track. Display 1110 may provide visual indicators as to a queued or selected song part or track. Switch 1135 may be an RPO for a selected track in the selected song part. Here, the undo/redo function may be provided by, for example, holding the RPO switch.

In various embodiments, external switches and controls may be employed. By way of a non-limiting example, a drum machine such as a BEATBUDDY® may be configured to interact with looper 1105. The configuration may enable a transition of a state in the drum machine to cause a transition in playback of, for example, a song part in looper 1105. Other external controllers may be employed, such as midi controllers or other networked loopers 1230. Moreover, looper 1105 may similarly affect the operation of external devices.

While FIG. 10 illustrates on possible embodiment of looper 1105, FIGS. 13A and 13B illustrate alternative configurations. The following is a listing of the components in the alternative configures.

- FIG. 4A—Configuration 400A
  - Front Side 405
    - First Button 410—Record, Play, Overdub
    - Second Button 415—Song Part/Stop (×2)
    - Display 420
    - Loop Level Knob 425
  - Right Side 430
    - Outputs 435*a*
    - Output 435*b*
    - Output 435*c*
  - Left Side 440
    - Input AUX 445
    - USB 450
  - Front Side 455
    - Input 1 460
    - Output 1 465
    - Headphones 470
    - Power 475
- FIG. 4B—Configuration 400B
  - Top Side 405
    - First Button 410*a*—Track 1
    - Second Button 410*b*—Track 2
    - Third Button 412—Song Part/Track 3
    - Fourth Button 415—Stop/Clear
    - Display 420
    - Volume Wheel 425
  - Right Side 430
    - Outputs 435*a*
    - Output 435*b*
    - Output 435*c*
  - Left Side 440
    - Input AUX 445
    - SD Card 447
    - USB 450
  - Front Side 455
    - Input 1 460*a*
    - Output 1 465*a*
    - Input 2 460*b*
    - Output 2 465*b*
    - Headphones 470
    - Power 475

The foregoing description conveys the best understanding of the objectives and advantages of the present disclosure. Different embodiments may be made of the inventive concept of this device. Although certain buttons, switches, functions, and features were described with reference to the 'device' or 'apparatus', it should be understood that those buttons, switches, functions, and/or features may be integrated into external or add-on devices in operative communication with the 'device' or 'apparatus'. It is to be understood that all matter disclosed herein is to be interpreted merely as illustrative, and not in a limiting sense. Furthermore, though various portions of the present disclosure reference "midi" sequences or notes, it should be understood that the scope of the present disclosure is intended to cover non-midi audio sequences as well.

III. Software and Computing Device

Figure 6:
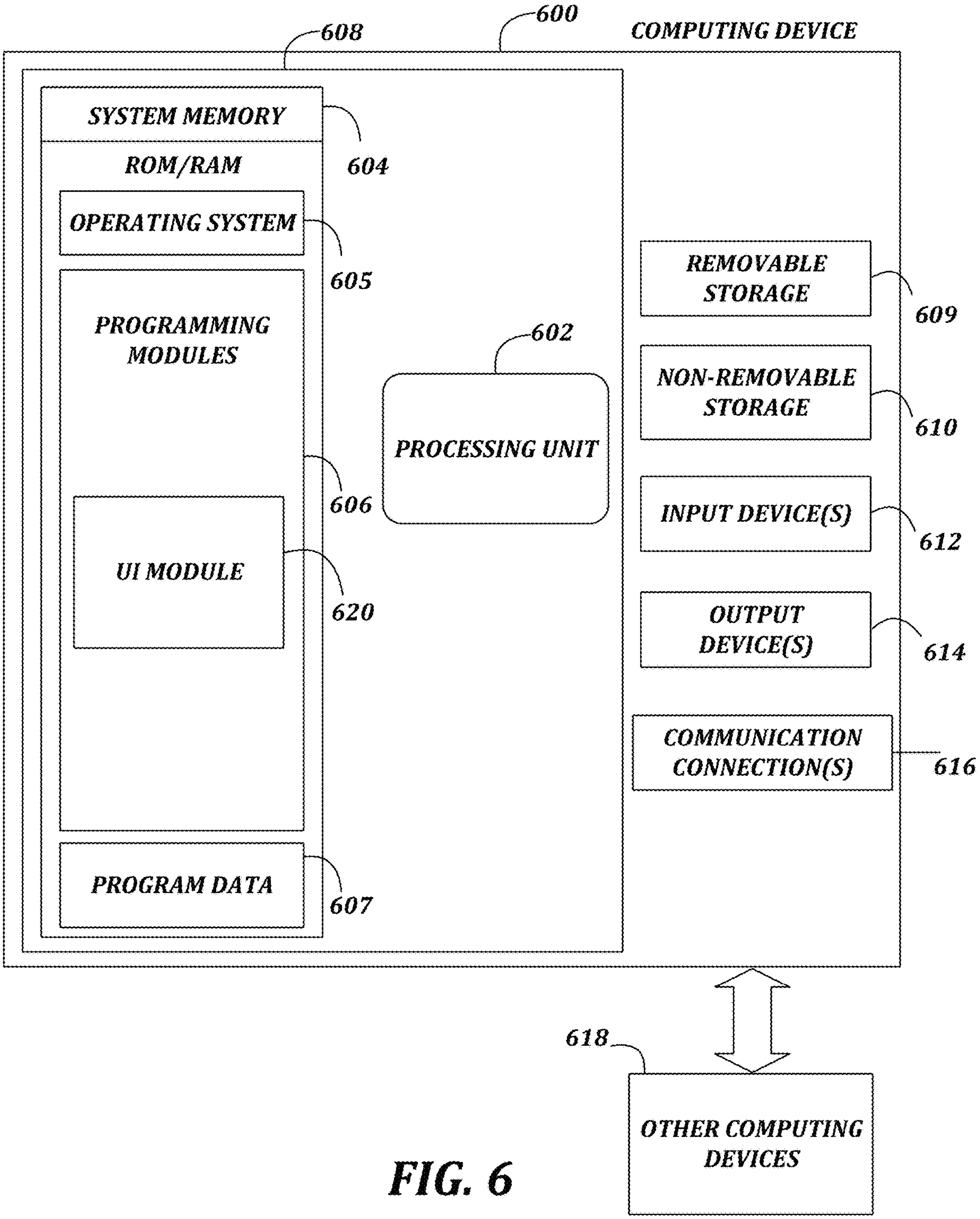
FIG. 6 is a block diagram of a computing device consistent with embodiments of the present disclosure.

As mentioned above, various operations may be performed on the apparatus itself or (separately or in combination with) a mobile computing device docket or otherwise connected to the apparatus. FIG. 6 is a block diagram of a system including computing device 600, which may comprise either the mobile computing device docketed to the apparatus, or be internal to the apparatus itself. Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure. Furthermore, computing device 600 may comprise an operating environment for system 100 as described above. System 100 may operate in other environments and is not limited to computing device 600.

With reference to FIG. 6, a system consistent with an embodiment of the disclosure may include a computing device, such as computing device 600. In a basic configuration, computing device 600 may include at least one processing unit 602 and a system memory 604. Depending on the configuration and type of computing device, system memory 604 may comprise, but is not limited to, volatile (e.g., random access memory (RAM)), non-volatile (e.g., read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include a user interface module 660 for providing, for example, the user interface shown in FIG. 5. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of computing device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection(s) 616 that may allow computing device 600 to communicate with other computing devices 618, such as over a network in a distributed computing environment, for example, an intranet or the Internet. Communication connection(s) 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., user interface module 620) may perform processes associated with providing a user interface. The aforementioned process is an example, and processing unit 602 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 16:
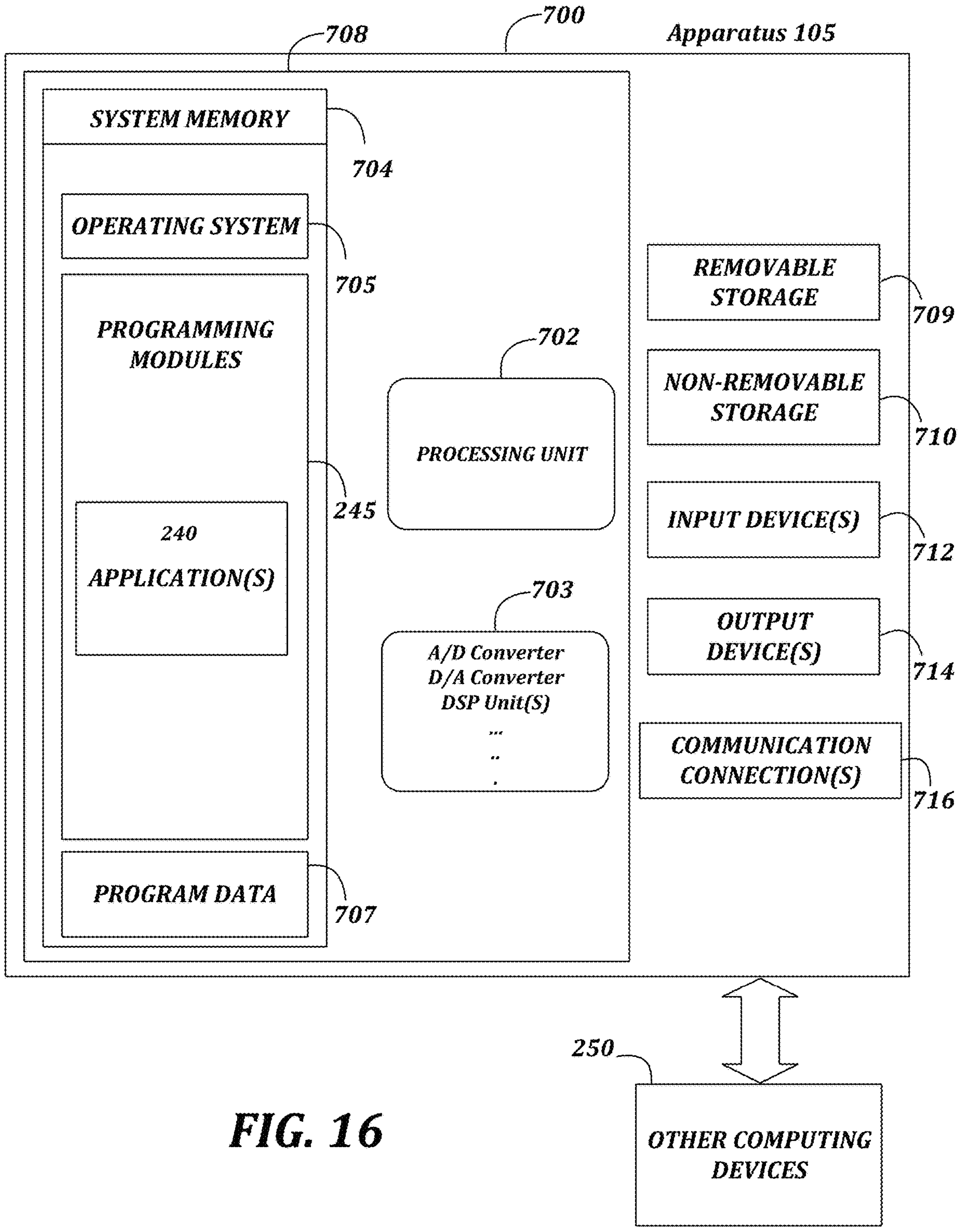
FIG. 16 is a block diagram of a computing device for recording and rendering multimedia.

FIG. 16 is a block diagram of a system including computing device 700. Computing device 700 may be embedded in an apparatus consistent with embodiments of the present disclosure. Furthermore, computing device 1700 may be in operative communication with an apparatus consistent with embodiments of the present disclosure. One of ordinary skill in the field will recognize that computing device 1700, or any portions thereof, may be implemented within any computing aspect in the embodiments disclosed herein (e.g., system 1200). Moreover, computing device 700 may be implemented in or adapted to perform any method of the embodiments disclosed herein.

A memory storage and processing unit may be implemented in a computing device, such as computing device 1700 of FIG. 16. Any suitable combination of hardware, software, or firmware may be used to implement the memory storage and processing unit. For example, the memory storage and processing unit may be implemented with computing device 1700 or any of other computing device, such as, for example, but not limited to, device 1100, device 1200, and device 1605, in combination with computing device 1700. The aforementioned system, device, and processors are examples and other systems, devices, and processors may comprise the aforementioned memory storage and processing unit, consistent with embodiments of the disclosure.

With reference to FIG. 16, a system consistent with an embodiment of the disclosure may include a computing device, such as computing device 1700. In a basic configuration, computing device 1700 may include at least one processing unit 1702 and a system memory 1704. Additionally, computing device 700 may include signal processing components 1703. Depending on the configuration and type of computing device, system memory 1704 may comprise, but is not limited to, volatile (e.g., random access memory (RAM)), non-volatile (e.g., read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 706 may include application 1720. Furthermore, embodiments of the disclosure may be practiced in conjunction with a graphics library, other operating systems, or any other application program and is not limited to any particular application or system. This basic configuration is illustrated in FIG. 7 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 16 by a removable storage 1709 and a non-removable storage 1710. Computer storage media may include volatile and nonvolatile, removable and non-removable media implemented in any method or technology for storage of information, such as computer readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1245 (e.g., applications 1240) may perform processes including, for example, one or more of the stages as described below. The aforementioned process is an example, and processing unit 1702 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), a carrier wave from the Internet, or other forms of RAM or ROM. Further, the disclosed methods' stages may be modified in any manner, including by reordering stages and/or inserting or deleting stages, without departing from the disclosure.

IV. Multimedia Recording and Rendering

Figure 17:
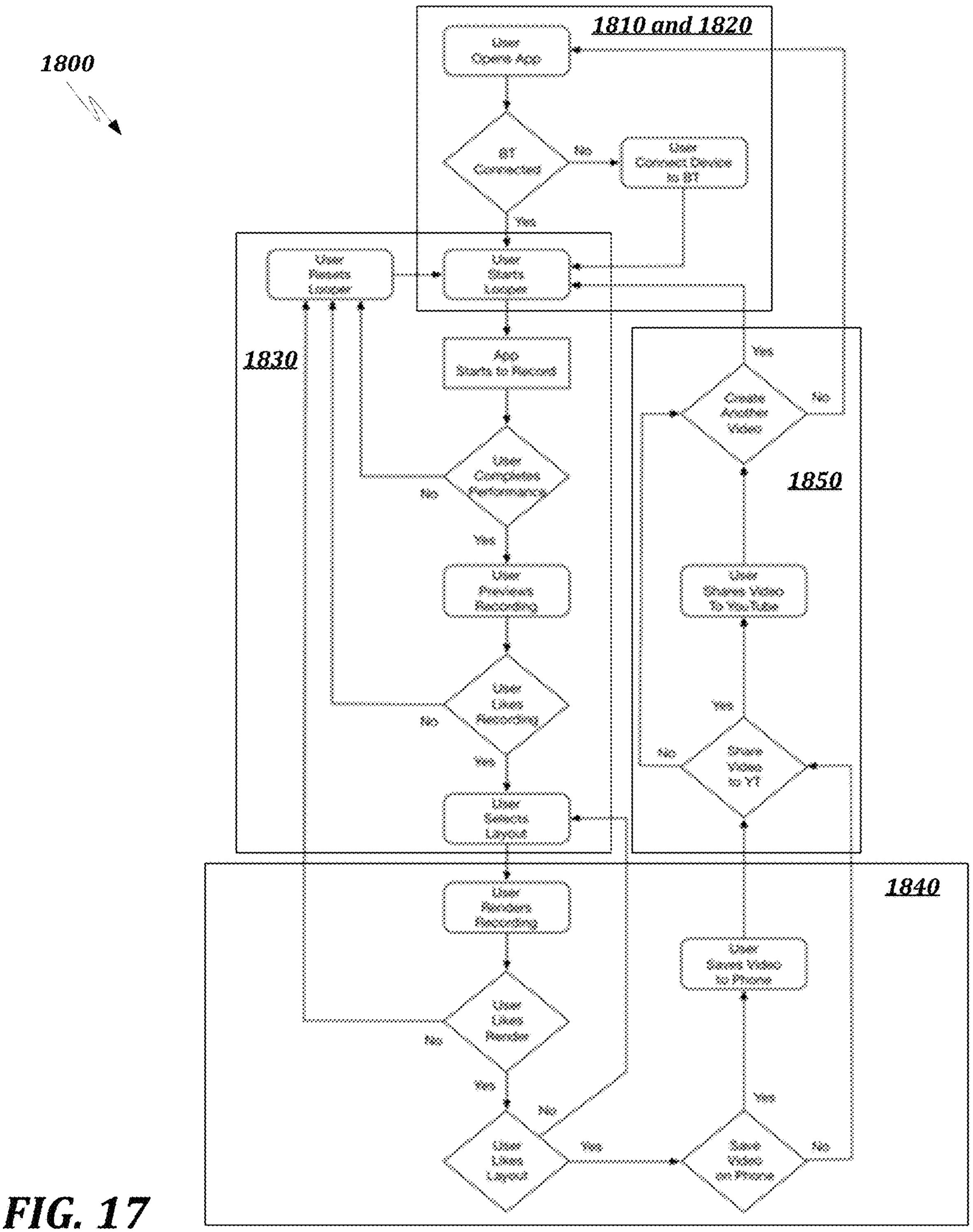
FIG. 17 is a flow chart for an embodiment of recording and rendering multimedia.

FIG. 17 is a flow chart setting forth the general stages involved in a method 1800 consistent with an embodiment of the disclosure for providing recording and rendering multimedia. Method 1800 may be implemented by any computing element in system 1200 and in the context of an example embodiment which includes video and audio synchronization.

Example embodiments referenced herein disclosing method 1800 are designed for a non-limiting, illustrative example of some functions features provided by system 1200. In example embodiments, looper 1105 allows the user to record overdub loops (or tracks). The user can create up to six Song Parts each with their own set of background loops. A software application (an "app") working in conjunction with the looper records video of the user playing while using the Looper. The app may create separate scenes for each song part and creates on-screen overlays for the first three background recorded loops per song part. The app may play the video associated with an audio loop in a repeated looped fashion such that it is synced with the associated audio loop. The app may capture and render the video such that the on-screen video overlays will change as the user changes song parts.

Although method 1800 has been described to be performed by a computing element, the computing element may be referred to as computing device 1700. It should be understood that the various stages in the system may be performed by the same or different computing device 1700. For example, in some embodiments, different operations may be performed by different networked elements in operative communication with computing device 1700. For example, looper 1105, server 1210, external devices 1215, network loopers 1230, data network 1225, and connected devices 1220 may be employed in the performance of some or all of the stages in method 1800.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1800 will be described in greater detail below.

Figure 18A:
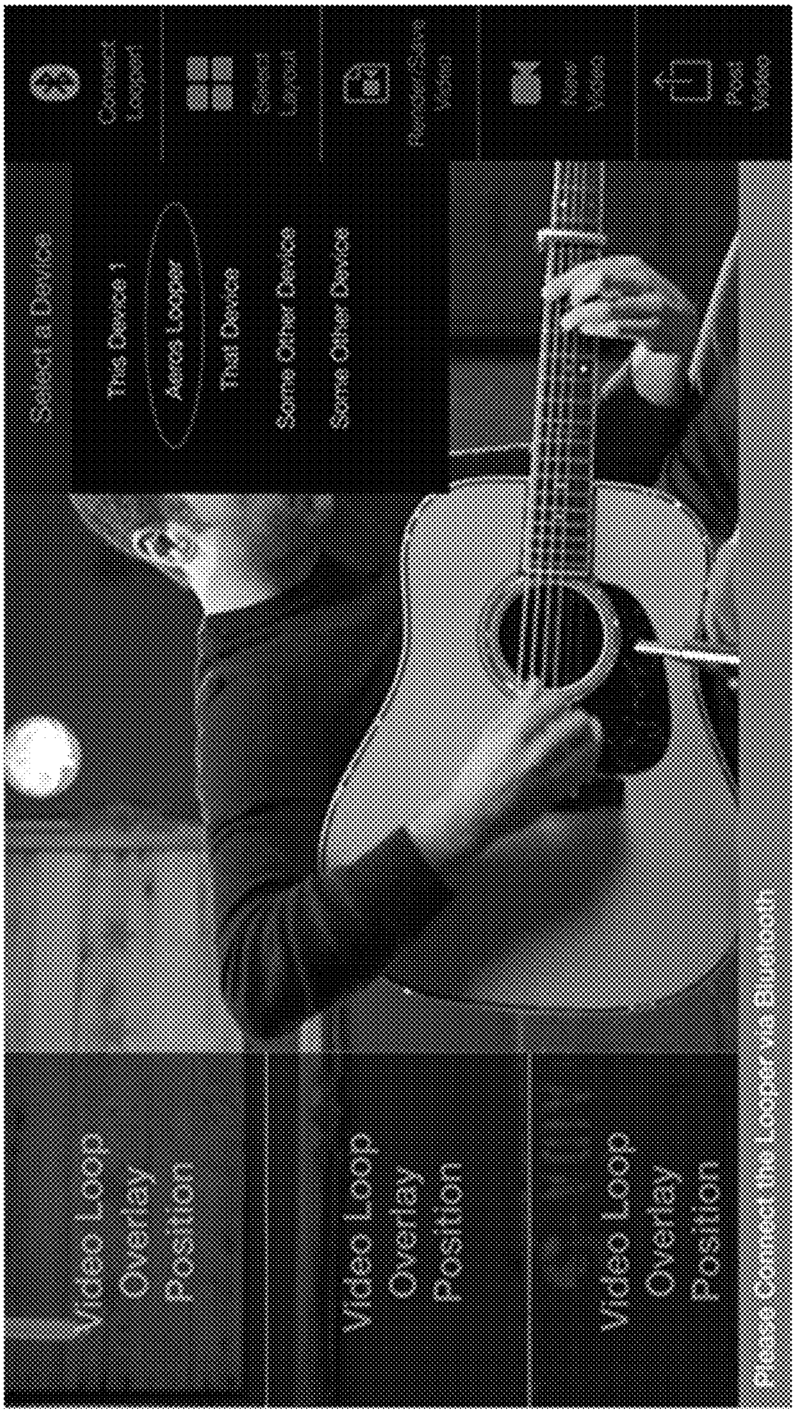
FIG. 18A illustrates an additional example of a user interface for recording and rendering multimedia.

Method 1800 may begin at starting block 1805 and proceed to stage 1810 where computing device 1700 may a network communication may occur. For example, for the app to function, its computing element (e.g., a smartphone or tablet) must be connected to, for example, looper 1105 via Bluetooth. Referring now to FIG. 18A, stage 1810 may comprise any one of the following substages:

a) The user may open the app on their computing element and see the live video feed on the screen with the main menu, overlay guides and message bar;
b) The user may open the Bluetooth Device list by pressing the "Connect Looper!" button;
c) The user may select a device from a list of available devices;
d) The app may display a "Connecting . . . " dialog box; and
e) The app may display the Bluetooth Button with the Connected message.

Figure 18B:
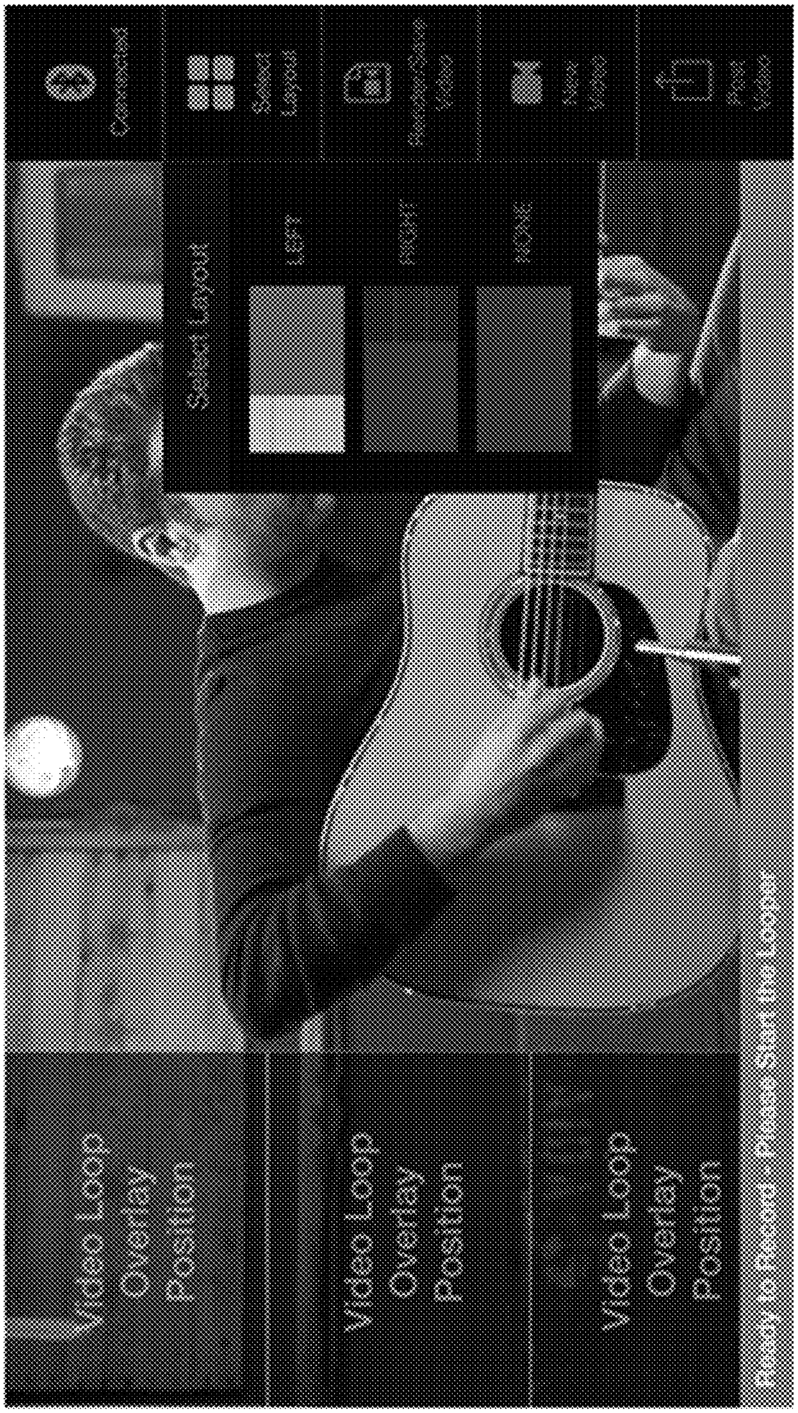
FIG. 18B illustrates an additional example of a user interface for recording and rendering multimedia.
Figure 18C:
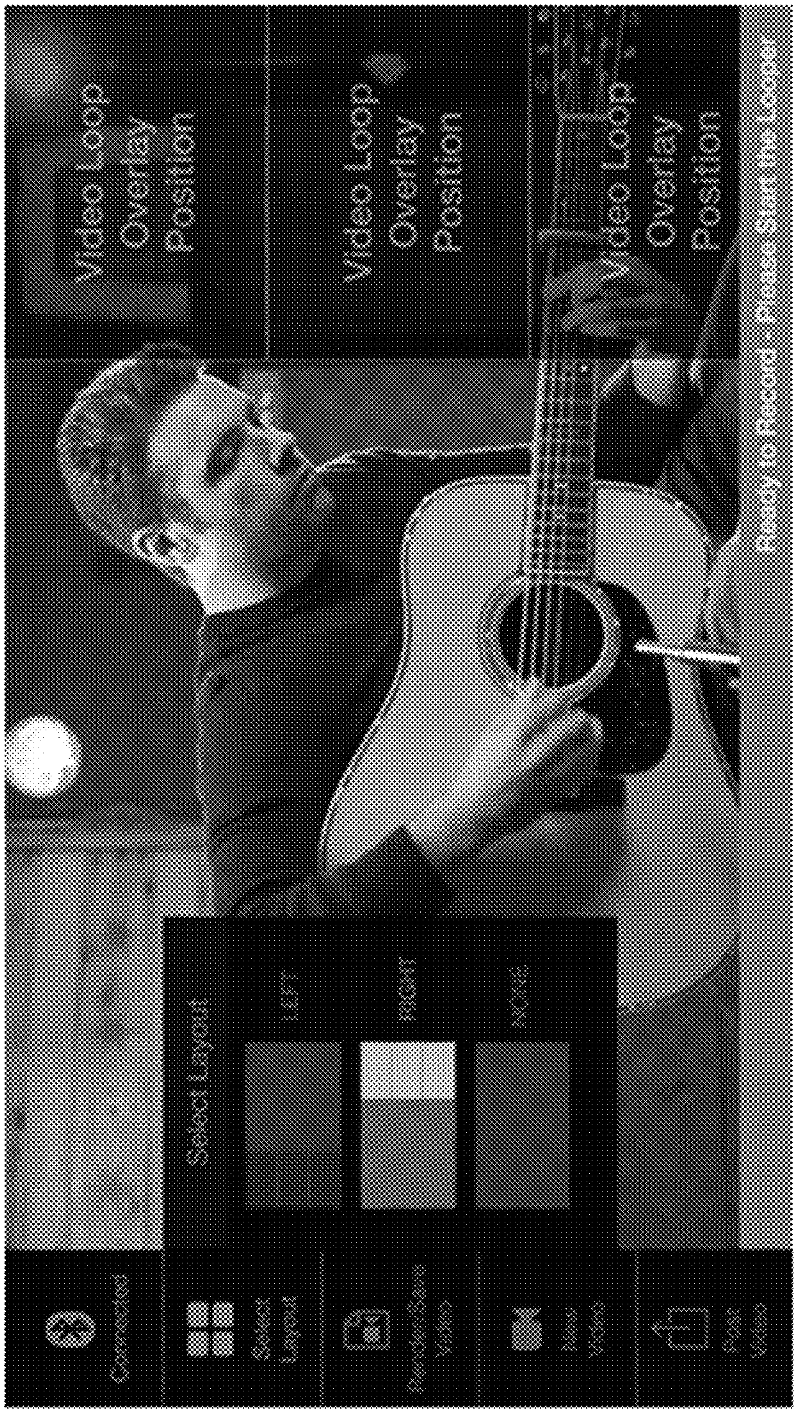
FIG. 18C illustrates an additional example of a user interface for recording and rendering multimedia.

From stage 1810, method 1800 may advance to stage 1820 where computing device 1700 may receive a selection for a video layout. For example, referring to FIG. 18B and FIG. 18C, the user may select a layout that best fits their position on the screen by pressing the "Select Layout," such as, for example, a left aligned layout or a right aligned layout. In some embodiments, layouts may be selected and organized post-production.

It should be noted that the menus displayed in the referenced FIGS. 18A-18D may slide out of view during session activity. In some embodiments, the display may indicate the session activity in progress (e.g., that a video recording is in progress). Once the session activity has stopped, the menus may be redisplayed.

Method 1800 may continue to stage 1830 where computing device 1700 may a commence a recordation session. See FIG. 18C. The trigger to begin the recordation session may be triggered by any computing element in system 1200, such as for example, through a session activity on looper 1105 (e.g., playback or recording). Similarly, the trigger to end a recordation session may also correspond to any session activity in system 1200. As each track loops, so too may the recorded video segment loop. As each new track is recorded, an additional video segment is displayed concurrently with previously recorded videos that correspond to other tracks looping at a designated song part. In some embodiments, a user can preview each recorded track prior to accepting the track into a rendering.

Figure 18D:
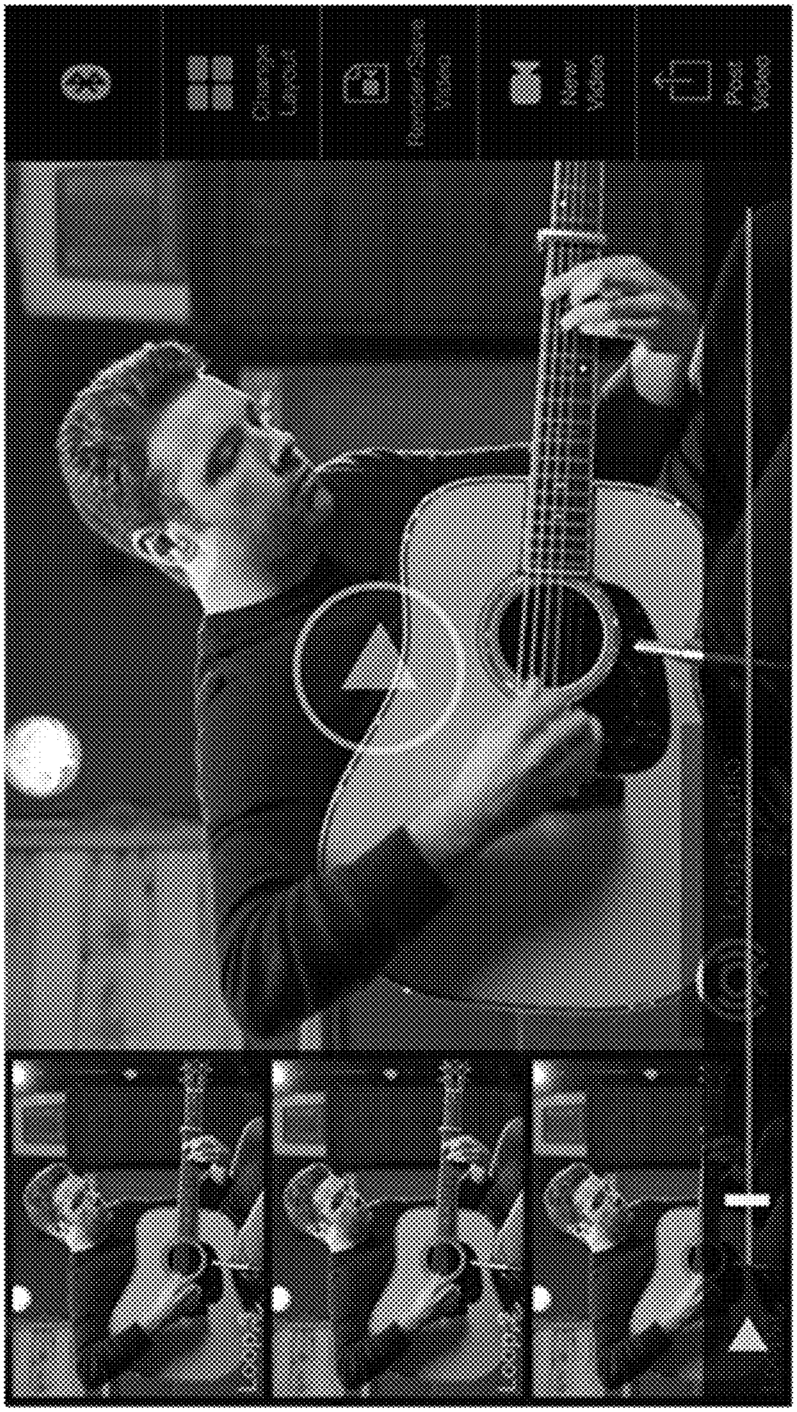
FIG. 18D illustrates an additional example of a user interface for recording and rendering multimedia.

Method 1800 may continue to stage 1840 where computing device 1700 may a commence a rendering of the recorded session. FIG. 18D illustrates an example of a rendered video. The app may display the rendered version of the video in the main viewing area after the render is complete. Stage 1840 may comprise any one of the following substages or aspects:

a) The most recent Loop may be shown at the top;

b) The "Render Videos to View Overlays" message may be removed when the video is being rendered and saved;

c) The "Change Layout" option may not be available after rendering the video;

d) The "Render/Save Video" option may not be available after rendering the video;

e) The user may preview the video using the play transport;

f) The menu slides out of view each time the video preview is started;

g) The menu slides into view each time the video preview is stopped;

h) The user can scrub to a new location in the video by dragging the playhead in the transport; and i) The user can start and pause the video by pressing the anywhere on the video (as indicated with the play button on the screen).

After rendering the video in stage 1840, method 1800 may proceed to stage 1850 where computing device 1700 may publish the rendered video.

A. Audio Management

Still referring to the example in method 1800, and consistent with some embodiments of the present disclosure, looper 1105 may send the audio to the app when the recording is finished. The app may replace the audio that was captured by the phone with the audio that was sent from looper 1105.

B. Video Management

Still referring to the example in method 1800, and consistent with some embodiments of the present disclosure, the App may capture the video as one file. The App may log and save the following information (sent from Looper 1105) for use during the rendering process:

Song Part Associated with each loop

Index Number of each loop (loop1, loop2, etc.)

Start and stop time of each loop

Start and stop time of each Song Part

Furthermore, in some embodiments, the App may use at least one of the following stages to create the Rendered Video:

1. Record the performance and log the control data that is sent from looper 1105;
2. Receive the audio file from the looper 1105 (when the performance is complete);
3. Replace the phone audio with the looper audio for use in the video file;
4. Create files of the video loop/overlays and name them with the associated index (SP1L1, SP1L2, SP2L1, etc.) where SP is the song part number and L is the loop number (track) in the Song Part); and
5. Render the video, displaying the loop/overlays in the correct position and at the correct time.

In some embodiments, there may be two methods required to tag and track the video loops. The first method is to tag and track the start and end of each loop. This method is used to render the overlay of the video. The second method is to track which loops overlays are displayed at a given time in the video. This may take into account that loops can be undone or muted after they are recorded.

Furthermore, in some embodiments, it is suggested that each time a loop is undone or muted that the internal Timeline Tracking Model (database, JSON, etc.) write the list of what is displayed, instead of tracking undo/redos and mutes/unmutes. This method is demonstrated in the following example.

i. Example of Writing to the Loop Timeline Tracking Model (TTM)

Capture SP1L1—(DB Record 1, VRT1, SP1L1)

Capture SP1L2—(DB Record 2, VRT2, SP1L1, SP1L2)

Capture SP1L3—(DB Record 3, VRT3, SP1L1, SP1L2, SP1L3)

Undo—(DB Record 4, VRT4, SP1L1, SP1L2)

Redo—(DB Record 5, VRT5, SP1L1, SP1L2, SP1L3)

Mute SP1L2—(DB Record 6, VRT6, SP1L1, SP1L3)

Unmute SP1L2—(DB Record 7, VRT7, SP1L1, SP1L2, SP1L3)

Capture SP2L1—(DB Record 8, VRT8, SP2L1)

Play SP1—(DB Record 9, VRT9, SP1L1, SP1L2, SP1L3)

Play SP2—(DB Record 10, VRT10, SP2L1)

C. Hardware Communication Protocol

Still referring to the example in method 800, and consistent with some embodiments of the present disclosure, the following commands may be used for the app to communicate with looper 1105.

SongStart

LoopStart

LoopEnd

UndoRedo

MuteLoop

UnmuteLoop

SongStop

GetAudio i. SongStart

In some embodiments, the SongStart command may sent from looper 1105 to the app when the song is started on the device. This command may not have any parameters.

In some embodiments, the app may send a "Success" or "Fail" response. If the app sends a "Success" response, the device may continue to record. If the app sends a "Fail" response the device may stop the recording and show an error message, such as, "Error Communicating with the Video App. Please clear the song and restart the recording process."

ii. LoopStart

In some embodiments, the LoopStart command may be sent from the device to the app when the actual recording of a loop is started on the device. The LoopStart command may have at least one the following parameters:

SongPartNumber (integer)—The index of the current song

LoopNumber (integer)—The index number of the loop within the current song part a) Example Command: Loop 3 in Song Part 2

LoopStart (2,3)

Response: The app will send with "Success" or "Fail" response with parameters echoed back. If the app sends a "Success" response, the device will continue to record. If the app sends a "Fail" response or sends the incorrect parameter echo, then the device will stop the recording and show the following message "Error Communicating with the Video App. Please clear the song and restart the recording process."

b) Example Response: Loop 3 in Song Part 2

Success (2,3)

Fail (2,3)

iii. LoopEnd

In some embodiments, the LoopEnd command may sent from the device to the app when the actual recording of a loop is captured on the device (at End of Measure, not when the device button is pressed). The LoopEnd command may not have parameters.

In some embodiments, the app will send a "Success" or "Fail" response. If the app sends a "Success" response, the device may continue to play. If the app sends a "Fail" response the device may stop the song and show an error message, such as, "Error Communicating with the Video App. Please clear the song and restart the recording process."

iv. UndoRedo

In some embodiments, the Undo command requires that the app keep track of the following loop states.

Case 1—First SP, the most recent Loop is currently recording (LoopStart without a subsequent LoopEnd). In this case, the loop recording was canceled on the device and the app should remove the LooperStart tag from the video timeline model (database, JSON, etc.).

Case 2—First SP, the most recent Loop was completed (LoopStart/LoopEnd pair successfully sent). In this case the most recent loop is removed. Since an Undo can be undone (via a Redo) the app will send a DB Record to the Timeline Tracking Model (TTM). The app will set an Undo flag to false to know that the next UndoRedo command will be a Redo.

Case 3—First SP, the most recent Loop was completed & Song Part did not change & Undo flag set to false. In this case, the most recent loop is added back. Since a Redo can be undone (via an Undo) the app will send a DB Record to the Timeline Tracking Model (TTM). The app will set the Undo flag to true to know that the next Undo/Redo command will be an Undo.

Case 4—First SP, the most recent Loop was completed & Song Part did not change & Undo flag set to true. In this case, the most recent loop is added back. Since a Redo can be undone (via an Undo) the app will send a DB Record to the Timeline Tracking Model (TTM). The app will set the Undo flag to true to know that the next Undo/Redo command will be an Undo.

Case 5—Next SP, the most recent Loop is currently recording (LoopStart without a subsequent LoopEnd). This is the same as Case 1. The Undo flag is set to true when the Song Part changes.

Case 6—Next SP, Most Recent Loop was Completed (Song Part changed). This is the same as Case 2. The Undo flag is set to true when the Song Part changes.

The app may send with "Success" or "Fail" response. If the app sends a "Success" response, the device may do nothing. If the app sends a "Fail" response the device will send the CancelLoop command again. The device will send the CancelLoop command a max of three times.

V. SongStop

In some embodiments, the SongStop command may be sent from the device to the app when the song is stopped on the device. This command may not have any parameters. This command may not have a response.

vi. GetAudio

In some embodiments, the GetAudio command may be sent from the app to the device to request the entire get the entire audio of the performance. This command may have at least one of the following parameters:

AudioQuality (wav or mp3)—This specifies the audio quality of the file that is sent from the device to the app.

a) Example Command: Loop 3 in Song Part 2

GetAudio (wav)

GetAudio (mp3)

This command may not have a response. The app may use the BTLE packet error checking to ensure that the packet is received properly. If there is an error in the receiving the packet, the app may display the following message: "There was an error receiving the audio file. Please try again."

V. Collaboration Module Operation

A collaboration module may be configured to share data between a plurality of nodes in a network. The nodes may comprise, but not be limited to, for example, an apparatus consistent with embodiments of the present disclosure. The sharing of data may be bi-directional data sharing, and may include, but not be limited to, audio data (e.g., song parts, song tracks) as well as metadata (e.g., configuration data associated with the audio data) associated with the audio data.

Still consistent with embodiments of the present disclosure, the collaboration module may be enabled to ensure synchronized performances between a plurality of nodes. For example, a plurality of nodes in a local area (e.g., a performance stage) may all be interconnected for the synchronization of audio data and corresponding configuration data used to arrange, playback, record, and share the audio data.

In some embodiments of the present disclosure, any networked node may be configured to control the configuration data (e.g., playback/arrangement data) of the tracks being captured, played back, looped, and arranged at any other node. For example, one user of a networked node may be enabled to engage performance mode and the other networked nodes may be configured to receive such indication and be operated accordingly. As another example, one user of a networked node can initiate a transition to a subsequent song part within a song and all other networked nodes may be configured to transition to the corresponding song-part simultaneously. As yet another example, if one networked node records an extended over-dub, then the corresponding song part on all networked nodes may be similarly extended to ensure synchronization. In this way, other functions of each networked node may be synchronized across all networked nodes (e.g., play, stop, loop, etc.).

By way of further non-limiting example, the synchronization may ensure that when one node extends a length of a song part, such extension data may be communicated to other nodes and cause a corresponding extension of song parts playing back on other nodes. In this way, the playback on all nodes remains synchronized. Accordingly, each node may be configured to import and export audio data and configuration data associated with the audio data as needed, so as to add/remove/modify various songs, song parts, song segments, and song layers of song parts.

Furthermore, in accordance with the various embodiments herein, the collaboration module may enable a first user of a first node to request additional layers or segments for a song part. A second user of a second node may accept the request and add an additional layer or segment to the song or song part. The updated song part, comprised of the audio data and configuration data, may then be communicated back to the first node. In some embodiments, the second node may extend the length of the song part (see recordation module details) and return updated audio data and configuration data for all song layers. The updated data may include datasets used by a display module to provide visual cues associated with the updated data (e.g., transition points between song parts).

The collaboration module may further be configured to send songs, song parts, song segments, song layers, and their corresponding configuration data to a centralized location accessible to a plurality of other nodes. The shared data can be embodied as, for example, a request for other nodes to add/remove/modify layers and data associated with the shared data. In some embodiments, the centralized location may comprise a social media platform, while in other embodiments, the centralized location may reside in a cloud computing environment.

Further still, embodiments of the present disclosure may track each nodes access to shared audio data as well as store metadata associated with the access. For example, access data may include an identify of each node, a location of each node, as well as other configuration data associated with each node.

VI. Aspects

The following disclose a first set of aspects of the present disclosure. The first set of aspects are not to be construed as patent claims unless the language of the Aspect appears as a patent claim. The first set of aspects describe various non-limiting embodiments of the present disclosure.

Aspect 1. An apparatus comprising:

a midi sequence module configured to:

store a plurality of main midi sequences, store a plurality of fill midi sequences, and playback the plurality of main midi sequences and the plurality of fill midi sequences;

a first foot-operable switch configured to operate the midi sequence module;

an instrument input;

a looping means configured to:

record a signal received from the instrument input, generate a plurality of recorded loops associated with a plurality of recorded signals, store the plurality of recorded loops, and playback the plurality of recorded loops; and a second foot-operable switch configured to operate the looping means, wherein the first foot-operable switch is configured to provide a plurality of activation commands to operate the midi sequence module by way of at least one of the following functions:

playback a main midi sequence in response to a first activation command associated with the first foot-operable switch, playback a fill midi sequence associated with the main midi sequence, in response to a second activation command associated with the first foot-operable switch, transition to a playback of another main midi sequence, in response to a third activation command associated with the first foot-operable switch, stop the playback of the main midi sequence, in response to a fourth activation command associated with the first foot-operable switch, and wherein each of the plurality of activation commands are triggered based on, at least in part, a duration and frequency of a user application of the first foot-operable switch.

Aspect 2. The apparatus of Aspect 1, wherein the second foot-operable switch is configured to provide a plurality of activation commands to operate the looping means by way of at least one of the following functions:

commence a recordation of the signal received from the instrument input in response to a first activation command associated with the second foot-operable switch, stop the recordation of the signal received from the instrument input in response to a second activation command associated with the second foot-operable switch, initiate a playback of a recorded loop in response to a third command associated with the second foot-operable switch, overdub the recorded loop in response to a fourth command associated with the second foot-operable switch, and wherein each of the plurality of activation commands are triggered based on a duration and frequency of a user application of the second foot-operable switch.

Aspect 3. The apparatus of Aspect 1, wherein one of the plurality of activation commands associated with the first foot-operable switch is configured to simultaneously:

commence a recordation of the signal received from the instrument input, and playback one of the plurality of main midi sequences.

Aspect 4. The apparatus of Aspect 1, wherein one of the plurality of activation commands associated with the second foot-operable switch is configured to simultaneously:

commence a recordation of the signal received from the instrument input, and playback one of the plurality of main midi sequences.

Aspect 5. The apparatus of Aspect 1, wherein one of the plurality of activation commands associated with the first foot-operable switch is configured to simultaneously:

playback one of the plurality of main midi sequences, and playback a recorded loop associated with the one of the plurality of main midi sequences.

Aspect 6. The apparatus of Aspect 1, wherein one of the plurality of activation commands associated with the second foot-operable switch is configured to simultaneously:

playback a recorded loop, and playback of one of the plurality of main midi sequences associated with the recorded loop.

Aspect 7. The apparatus of Aspect 2, wherein one of the plurality of activation commands associated with the first foot-operable switch is configured to simultaneously:

stop the playback of the main midi sequence, and stop the playback of the recorded loop.

Aspect 8. The apparatus of Aspect 2, wherein one of the plurality of activation commands associated with the second foot-operable switch is also configured to simultaneously:

stop the playback of the main midi sequence, and stop the playback of the recorded loop.

Aspect 9. The apparatus of Aspect 1, wherein one of the plurality of activation commands associated with the first foot-operable switch is configured to simultaneously:

transition to a playback of the other main midi sequence, and commence a recordation of the signal received from the instrument input.

Aspect 10. The apparatus of Aspect 1, wherein one of the plurality of activation commands associated with the second foot-operable switch is configured to simultaneously:

transition to a playback of the other main midi sequence, and commence a recordation of the signal received from the instrument input.

Aspect 11. The apparatus of Aspect 9, wherein one of the plurality of activation commands associated with the first foot-operable switch is also configured to simultaneously:

transition to a playback of the other main midi sequence, and stop the recordation of the signal received from the instrument input.

Aspect 12. The apparatus of Aspect 10, wherein the one of the plurality of activation commands associated with the second foot-operable switch is also configured to simultaneously:

transition to a playback of the other main midi sequence, and stop the recordation of the signal received from the instrument input.

Aspect 13. The apparatus of Aspect 1, wherein one of the plurality of activation commands associated with the first foot-operable switch is configured to simultaneously:

transition to a playback of the other main midi sequence, and transition from a playback of a first recorded loop to a playback of a second recorded loop.

Aspect 14. The apparatus of Aspect 1, wherein one of the plurality of activation commands associated with the second foot-operable switch is configured to simultaneously:

transition to a playback of the other main midi sequence, and transition from a playback of a first recorded loop to a playback of a second recorded loop.

Aspect 15. The apparatus of Aspect 1, wherein the looping means is configured to define a tempo associated with a playback of a recorded loop based at least upon a tempo associated with the midi sequence module.

Aspect 16. The apparatus of Aspect 2, wherein the looping means is configured to commence the recordation of the signal at a time that is synchronized with a beat or measure provided by the midi sequence module.

Aspect 17. The apparatus of Aspect 2, wherein the looping means is configured to stop the recordation of the signal at a time that is synchronized with a beat or measure provided by the midi sequence module.

Aspect 18. The apparatus of Aspect 1, wherein the looping means is configured quantize a recorded signal in accordance to an aspect of a beat or measure provided by the midi sequence module.

Aspect 19. The apparatus of Aspect 1, further comprising a display indicating progression through at least one of the following: a song, midi sequence, beats, and measures associated with, at least in part, the midi sequence module.

Aspect 20. The apparatus of Aspect 1, further comprising a display indicating progression through at least one of the following: a loop, loop parts, overdubs, beats, and measures associated with, at least in part, the looping means.

Aspect 21. The apparatus of Aspect 1, wherein the plurality of activation commands correspond to signals generated from at least one of the following:

a signal rapid depression of at least one of the following: the first foot-operable switch and the second foot-operable switch, two rapid depressions in succession of at least one of the following: the first foot-operable switch and the second foot-operable switch, three rapid depressions in succession of at least one of the following: the first foot-operable switch and the second foot-operable switch, a long depression of at least one of the following: the first foot-operable switch and the second foot-operable switch, and wherein any one of the aforementioned corresponds to one or more of the plurality of activation commands.

Aspect 22. The apparatus of Aspect 1, further comprising a fifth activation command associated with a control signal received from the first foot-operable switch, wherein the control signal corresponds to: a holding of the first foot-operable switch, during which the fill midi sequence associated with the main midi sequence is played back, and a release of the first foot-operable switch, in response to which the transition to the other main midi sequence is triggered.

Aspect 23. A system comprising:

a drum-machine comprising:

a midi sequence module configured to:

store a plurality of main midi sequences, store a plurality of fill midi sequences, and playback the plurality of main midi sequences and the plurality of fill midi sequences, a first foot-operable switch configured to provide a first plurality of activation commands to operate the main midi sequence module by way of at least one of the following functions:

playback a main midi sequence in response to a first activation command associated with the first foot-operable switch, playback a fill midi sequence associated with the main midi sequence in response to a second activation command associated with the first foot-operable switch, transition to another main midi sequence in response to a third activation command associated with the first foot-operable switch, and stop the playback of the main midi sequence in response to a fourth activation command associated with the first foot-operable switch, wherein each of the first plurality of activation commands are triggered based on a duration and frequency of a user application of the first foot-operable switch; and an instrument signal looper comprising:

an instrument input;

a looping means configured to:

record a signal received from the instrument input, generate a plurality of recorded loops associated with a plurality of recorded signals, store the plurality of recorded loops, and playback the plurality of recorded loops, and a second foot-operable switch configured to provide a second plurality of activation commands to operate the looping means by way of at least one of the following functions:

commence a recordation of the signal received from the instrument input in response to a first activation command associated with the second foot-operable switch, stop the recordation of the signal received from the instrument input in response to a second activation command associated with the second foot-operable switch, initiate a playback of a recorded loop in response to a third command associated with the second foot-operable switch, and overdub the recorded loop in response to a fourth command associated with the second foot-operable switch, wherein each of the second plurality of activation commands are triggered based on a duration and frequency of a user application of the second foot-operable switch.

Aspect 24. The system of Aspect 23, further comprising at least one external midi switch.

Aspect 25. The system of Aspect 24, wherein the at least one external midi switch is tied to at least one of the plurality of main midi sequences.

Aspect 26. The system of Aspect 25, wherein selecting the at least one external midi switch causes a transition to the specific main midi sequence.

Aspect 27. The system of Aspect 23, further comprising a computing device in connection to at least one of the following: the drum-machine and the instrument signal looper.

Aspect 28. The system of Aspect 27, wherein the computing device is configured to control at least one of the following: the drum-machine and the instrument signal looper.

Aspect 29. The system of Aspect 27, wherein the computing device is configured to provide midi data and audio data to at least one of the following: the drum-machine and the instrument signal looper.

Aspect 30. The system of Aspect 27, wherein the computing device is configured to receive midi data and audio data to at least one of the following: the drum-machine and the instrument signal looper.

Aspect 31. The system of Aspect 27, wherein the computing device comprises a digital audio workstation in operable communication with at least one of the following: the drum-machine and the instrument signal looper.

Aspect 32. The system of Aspect 27, wherein the computing device is configured to dock, either wirelessly or through a wired connection, to at least one of the following: the drum-machine and the instrument signal looper.

The following disclose a second set of aspects of the present disclosure. The second set of aspects are not to be construed as patent claims unless the language of the aspect appears as a patent claim. The second set of aspects describe various non-limiting embodiments of the present disclosure.

Aspect 1. An apparatus comprising:

a first foot-operated switch configured to operate midi sequence module by way of a first plurality of commands;

an instrument input;

a looping module configured to:

record a signal received from the instrument input, and playback a recorded loop associated with the signal; and a second foot-operated switch configured to operate the looping module by way of a second plurality of commands;

wherein the first foot-operated switch is configured to provide the first plurality of commands to operate the midi sequence module by way of at least one of the following functions:

playback a main midi sequence, playback a fill midi sequence associated with the main midi sequence, transition to a playback of another main midi sequence, and stop a playback of the main midi sequence;

wherein each of the first plurality of commands are triggered based on a duration and frequency of a user depression of the first foot-operated switch.

Aspect 2. The apparatus of Aspect 1, wherein the second foot-operated switch is configured to provide the second plurality of commands to operate the looping module by way of at least one of the following functions:

commence a recordation of the signal received from the instrument input, stop the recordation of the signal received from the instrument input, initiate a playback of the recorded signal, overdub the recorded signal, and wherein each of the second plurality of commands are triggered based on a duration and frequency of a user depression of the first foot-operated switch.

Aspect 3. The apparatus of Aspect 1, wherein one of the first plurality of commands is configured to:

commence a recordation of the signal received from the instrument input, and playback the main midi sequence.

Aspect 4. The apparatus of Aspect 1, wherein one of the second plurality of commands is configured to:

commence a recordation of the signal received from the instrument input, and playback the main midi sequence.

Aspect 5. The apparatus of Aspect 1, wherein one of the first plurality of commands is configured to:

playback the main midi sequence, and playback the recorded loop associated with the main midi sequence.

Aspect 6. The apparatus of Aspect 1, wherein one of the second plurality of commands is configured to:

playback the recorded loop, and playback the main midi sequence associated with the recorded loop.

Aspect 7. The apparatus of Aspect 2, wherein one of the first plurality of commands is configured to:

stop the playback of the main midi sequence, and stop the playback of the recorded loop.

Aspect 8. The apparatus of Aspect 2, wherein one of the second plurality of commands is configured to:

stop the playback of the main midi sequence, and stop the playback of the recorded loop.

Aspect 9. The apparatus of Aspect 1, wherein one of the first plurality of commands is configured to:

transition to a playback of the other main midi sequence, and commence a recordation of the signal received from the instrument input.

Aspect 10. The apparatus of Aspect 1, wherein one of the second plurality of commands is configured to:

transition to a playback of the other main midi sequence, and commence a recordation of the signal received from the instrument input.

Aspect 11. The apparatus of Aspect 1, wherein one of the first plurality of commands is configured to:

transition to a playback of the other main midi sequence not currently being played, and stop a recordation of the signal received from the instrument input.

Aspect 12. The apparatus of Aspect 1, wherein one of the second plurality of commands is configured to:

transition to a playback of the other main midi sequence, and stop a recordation of the signal received from the instrument input.

Aspect 13. The apparatus of Aspect 1, wherein one of the first plurality of commands is configured to:

transition to a playback of the other main midi sequence not currently being played, and transition from a playback of a first recorded loop to a playback of a second recorded loop.

Aspect 14. The apparatus of Aspect 1, wherein one of the second plurality of commands is configured to:

transition to a playback of the other main midi sequence, and transition from a playback of a first recorded loop to a playback of a second recorded loop.

Aspect 15. The apparatus of Aspect 1, wherein the looping module is configured to define a tempo associated with the playback of the recorded loop based at least upon a tempo associated with the midi sequence module.

Aspect 16. The apparatus of Aspect 1, wherein the looping module is configured to commence a recordation of the signal at a time that is synchronized with a beat or measure provided by the midi sequence module.

Aspect 17. The apparatus of Aspect 1, wherein the looping module is configured to stop a recordation of the signal at a time that is synchronized with a beat or measure provided by the midi sequence module.

Aspect 18. The apparatus of Aspect 1, wherein the looping module is configured quantize a recorded signal in accordance to an aspect of a beat or measure provided by the midi sequence module.

Aspect 19. The apparatus of Aspect 1, further comprising a display indicating progression through at least one of the following: a song, midi sequence, beats, and measures associated with, at least in part, the midi sequence module.

Aspect 20. The apparatus of Aspect 2, further comprising a display indicating progression through at least one of the following: a loop, loop parts, overdubs, beats, and measures associated with the looping module.

Aspect 21. The apparatus of Aspect 1, wherein the first plurality of commands correspond to signals generated from at least one of the following:

a signal rapid depression of the first foot-operated switch, two rapid depressions in succession of the first foot-operated switch, three rapid depressions in succession of the first foot-operated switch, and a long depression of the first foot-operated switch.

Aspect 22. The apparatus of Aspect 1, wherein one of the first plurality of commands is associated with a control signal, the control signal corresponding to: a holding of the first foot-operated switch, during which the fill midi sequence associated with the main midi sequence is played back, and a release of the first foot-operated switch, in response to which the transition to the other main midi sequence.

Aspect 23. A system comprising:

a first foot-operated switch configured to provide a first plurality of commands to operate a drum machine by way of at least one of the following functions:

playback a main midi sequence, playback a fill midi sequence associated with the main midi sequence in response to a second activation, transition to another main midi sequence, and stop the playback of the main midi sequence, wherein each of the first plurality of commands are triggered based on a duration and frequency of a user depression of the first foot-operated switch;

an instrument input; and a second foot-operated switch configured to provide a second plurality of commands to operate a looping module by way of at least one of the following functions:

commence a recordation of a signal received from the instrument input, stop the recordation of the signal received from the instrument input, initiate a playback of a recorded loop, and overdub the recorded loop.

Aspect 24. The system of Aspect 23, further comprising at least one external midi switch.

Aspect 25. The system of Aspect 24, wherein the at least one external midi switch is tied to a specific main midi sequence.

Aspect 26. The system of Aspect 25, wherein selecting the at least one external midi switch causes a transition to the specific main midi sequence.

Aspect 27. The system of Aspect 23, further comprising a computing device in connection to at least one of the following: the drum machine and the looping module.

Aspect 28. The system of Aspect 27, wherein the computing device is configured to control at least one of the following: the drum machine and the looping module.

Aspect 29. The system of Aspect 27, wherein the computing device is configured to provide midi data and audio data to at least one of the following: the drum machine and the looping module.

Aspect 30. The system of Aspect 27, wherein the computing device is configured to receive midi data and audio data from at least one of the following: the drum machine and the looping module.

Aspect 31. The system of Aspect 27, wherein the computing device comprises a digital audio workstation in operable communication with at least one of the following: the drum machine and the looping module.

Aspect 32. The system of Aspect 27, wherein the computing device is configured to dock, either wirelessly or through a wired connection, to at least one of the following: the drum machine and the looping module.

The following disclose a third set of aspects of the present disclosure. The third set of aspects are not to be construed as patent claims unless the language of the aspect appears as a patent claim. The third set of aspects describe various non-limiting embodiments of the present disclosure.

1. A computer readable medium comprising, but not limited to, at least one of the following:
   a. An input module;
   b. A display module;
   c. An arrangement module;
   d. A playback module;
   e. A recording module;
   f. A video controller module; and
   g. A collaboration module.

Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the disclosed language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules.

The following aspects will detail the operation of each module, and inter-operation between modules. The hardware components that may be used at the various stages of operations follow the method aspects.

The methods and computer-readable media may comprise a set of instructions which when executed are configured to enable a method for inter-operating at least the modules illustrated in FIGS. 11A and 11B. The aforementioned modules may be inter-operated to perform a method comprising the following stages. The aspects disclosed under this section provide examples of non-limiting foundational elements for enabling an apparatus consistent with embodiments of the present disclosure.

Although the method stages may be configured to be performed by computing device 1700, computing device 1700 may be integrated into any computing element in system 1200, including looper 1105, external devices 1215, and server 1210. Moreover, it should be understood that, in some embodiments, different method stages may be performed by different system elements in system 1200. For example, looper 1105, external devices 1215, and server 1210 may be employed in the performance of some or all of the stages in method stages disclosed herein.

Furthermore, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated.

Finally, the aspects are not structured in the same way non-provisional claims are structured. For example, indentations indicate optional/dependent elements of a parent element.

- Independent Stage I
  - Optional Stage 1
    - Optional Sub-Stage A
    - Optional Sub-Stage B
  - Optional Stage 2
    - Optional Sub-Stage A
    - Optional Sub-Stage B
    - Optional Sub-Stage C
      - Optional Child Element i The aforementioned elements may be mixed and matched from one embodiment to another to provide any functionality disclosed herein.

2. A method for operating the computer readable medium of aspect 1, the method comprising any one of the following modules:
   a. An input module;
   b. A display module;
   c. An arrangement module;
   d. A playback module;
   e. A recording module;
   f. A video controller module; and
   g. A collaboration module.

A. Input Module

A first set of embodiments for receiving at least one input signal comprising at least one of the following stages:

- receive a signal from at least one input;
  - wherein the at least one input corresponds to at least one of the following:
    - an input from a wired medium, and
    - an input from a wireless medium;
  - wherein the signal corresponds to at least one of the following:
    - an analog audio signal,
    - a digital audio signal,
    - a MIDI signal,
    - a data signal from an external computing device; and
  - converting the received signal to recorded data.

A second set of embodiments for receiving at least one input signal comprising at least one of the following stages:

- wherein the recorded data corresponds to at least one of the following:
  - at least one track corresponding to at least one of:
    - a recorded audio track,
    - a processed audio track, and
    - a recorded MIDI track;
  - a waveform associated with each audio track,
    - wherein the waveform is one of:
      - comprised within the recorded data, and
      - generated based upon the recorded data;
  - a MIDI map associated with each MIDI track, and
  - a visual representation corresponding to:
    - the waveform, and
    - the MIDI map,
      - wherein the visual representation is one of:
        - comprised within the recorded data, and
        - generated based upon the recorded data.

A third set of embodiments for receiving at least one signal input comprising at least one of the following stages:

- wherein the recorded data further comprises configuration data,
- wherein the configuration data comprise at least one of the following:
  - at least one arrangement parameter,
  - at least one playback parameter, and
  - a display parameter, and
- wherein the configuration data are employed by at least one of the following:
  - an arrangement module configured to arrange the at least one track associated with the recorded data based at least in part on the at least one arrangement parameter,
  - a playback module configured to playback the at least one track associated with the recorded data based at least in part on the at least one playback parameter, and a display module configured to display the visual representation associated with the at least one track based at least in part on the at least one display parameter.

A first set of embodiments for receiving external data comprising at least one of the following stages:

receive data from an external computing device and/or musical instrument;

wherein the received data corresponds to at least one of the following:

at least one track corresponding to at least one of:

a sampled audio track, a processed audio track, and a MIDI track;

a waveform associated with each audio track, wherein the waveform is one of:

comprised within the received data, and generated based upon the received data;

a MIDI map associated with each MIDI track, and a visual representation corresponding to:

the waveform, and the MIDI map, wherein the visual representation is one of:

comprised within the received data, and generated based upon the received data.

A second set of embodiments for receiving external data comprising at least one of the following stages:

wherein the received data further comprises configuration data, wherein the configuration data comprise at least one of the following:

at least one arrangement parameter, at least one playback parameter, and a display parameter, wherein the configuration data are employed by at least one of the following:

an arrangement module configured to arrange the at least one track associated with the received data based at least in part on the at least one arrangement parameter, a playback module configured to playback the at least one track associated with the received data based at least in part on the at least one playback parameter, and a display module configured to display the visual representation associated with the at least one track based at least in part on the at least one display parameter; and wherein setting the configuration data comprises receiving a configuration value from a user selectable control, wherein the user selectable control is configured to set the at least one playback parameter, and wherein the user selectable control is configured remotely, and wherein the user selectable control is configured to be a foot-operable control.

B. Display Module

A first set of embodiments comprising at least one of the following stages:

Generate at least one graphical element and at least one textual element based on audio data, wherein the audio data is associated with:

an audio waveform configured for playback, a visual representation corresponding to the audio waveform configured for visual display, and at least one configuration parameter for the audio waveform, wherein the configuration parameter is structured to indicate an association of the audio track with at least one of the following:

a song part, a track within the song part, a layer within a track, at least one playback parameter, at least one arrangement parameter, and at least one display parameter.

wherein the audio data is further associated with:

at least one track corresponding to at least one of:

a recorded audio track, a processed audio track, and a recorded MIDI track;

a waveform associated with each audio track, wherein the waveform is one of:

comprised within the recorded data, and generated based upon the recorded data;

a MIDI map associated with each MIDI track, and a visual representation corresponding to:

the waveform, and the MIDI map, wherein the visual representation is one of:

comprised within the recorded data, and generated based upon the recorded data.

wherein the audio data is further associated with:

visual indicators associated with song performance, including, but not limited to:

a starting point, a stopping point, a quantity of loop cycles, a measure of playback, a tempo of playback, a transition point, a recording indication, an overdub indication, a playback indication, and instructions for operation;

organize the generated at least one graphical representation and at least one textual representation into visual segments, wherein the visual segments correspond to at least one of the following:

a song, a song part, and a track within a song part, cause a display of the at least one graphical representation and at least one textual representation, wherein displaying comprises at least one of the following:

a display unit, and a communications module operative to enable the display to occur remotely from the display unit.

C. Arrangement Module

A first set of embodiments for accessing the data comprising at least one of the following stages:

access a plurality of tracks and data corresponding to each of the tracks;

wherein accessing the plurality of tracks comprises receiving the plurality of tracks from at least one of the following:

the input module, the recording module, the playback module, and the collaboration module;

A second set of embodiments for determining an arrangement of the data comprising at least one of the following stages:

determine an arrangement for each track of the plurality of tracks in a song, wherein determining the arrangement comprises at least one of the following:

reading the data associated with each track, wherein the data comprises configuration data for each track's arrangement within a song part, setting at least one arrangement parameter corresponding to the arrangement of each track within the song part, wherein the at least one arrangement parameter corresponding to the arrangement of the track specifies, at least, at least one song part associated with the track, wherein a track may be duplicated across multiple song parts, wherein a modification of the track in one song part causes a modification of the duplicated track in another song part, setting at least one additional arrangement parameter corresponding to a playback position of a song part, wherein the at least one additional arrangement parameter corresponding to the arrangement to the song part determines, at least, a playback position of the song part within the song, wherein setting the configuration data comprises receiving a configuration value from a user selectable control.

wherein the user selectable control is configured to set the at least one playback parameter, and wherein the user selectable control is configured remotely, and wherein the user selectable control is configured to be a foot-operable control, wherein each song part is configured to contain a plurality of parallel layers of tracks and data, wherein the arrangement of each track within each song part is determined, at least in part, by the at least one arrangement parameter associated with each track, wherein the arrangement of each song part is determined, at least in part, by the at least one additional arrangement parameter corresponding to the playback position of the song part, and A third set of embodiments for arranging the data comprising at least one of the following stages:

arrange the plurality of tracks into the song, wherein the song is comprised of at least one track and at least one song part, wherein an arrangement of the song comprises at least one of the following:

at least one song part comprised of a segment of parallel tracks arranged for concurrent playback, and a series of song parts, wherein a first segment of parallel tracks arranged in a first song part is configured for playback before a second segment of parallel tracks arranged in a subsequent song part, wherein determining the arrangement of track layers within each song part employs, at least in part, the at least one arrangement parameter specifying to at least one song part associated with each track, and wherein determining the arrangement of song parts within the song employs the at least one additional arrangement parameter specifies a playback position of each song part within a series of song parts.

A fourth set of embodiments for rearranging the data comprising at least one of the following stages:

rearrange at least one of the plurality of tracks, wherein a rearrangement comprises at least one of the following:

modifying the series of song parts by changing a playback position of a first segment of parallel tracks relative to a second segment of parallel tracks, and modifying an individual segment of parallel tracks by at least one of the following:

removing a track layer, adding a track layer, editing a track layer, and moving a track layer from the first segment to the second segment, and update arrangement data corresponding to the rearrangement, wherein updating the arrangement data comprises at least one of the following:

updating the at least one arrangement parameter corresponding to each track modified, and updating the at least one additional arrangement parameter corresponding to each song part modified.

A fifth set of embodiments for aligning for playback comprising at least one of the following stages:

arrange the plurality of tracks into the song, wherein the song is comprised of at least one track and at least one song part, wherein an arrangement of the song comprises at least one of the following:

at least one song part comprised of a segment of parallel tracks arranged for concurrent playback, and a series of song parts, wherein a first segment of parallel tracks arranged in a first song part is configured for playback before a second segment of parallel tracks arranged in a subsequent song part, aligning the plurality of parallel tracks arranged for concurrent playback, wherein aligning the plurality of parallel tracks comprises:

reading an audio marker embedded in the audio data, wherein the audio marker comprises an audio pulse followed by a dithered space of silence, wherein the audio pulse is inserted into the beginning of a track associated with the audio data, and wherein the audio pulse is inserted at the beginning of PCM and/or MP3 files and is used to align encoded or transported versions of the audio data, and aligning each of the parallel tracks by aligning, in time and position, the audio marker in each of the parallel tracks.

The aforementioned may be provided for syncing purposes. PCM files by nature have a variable amount of dead space in the beginning which makes syncing them by aligning the beginnings of the files to each other impossible. This pulse, follow by a set amount of silence allows the alignment to happen because the amount of silence following the pulse is always the same.

D. Playback Module

A first set of embodiments for accessing the data comprising at least one of the following stages:

access a plurality of tracks and data corresponding to each of the tracks;

wherein accessing the plurality of tracks comprises receiving the plurality of tracks from at least one of the following:

the input module, the recording module, the playback module, and the collaboration module;

A second set of embodiments for determining an arrangement comprising at least one of the following stages:

determine an arrangement for each track of the plurality of tracks in a song, wherein determining the arrangement comprises at least one of the following:

reading the data associated with each track, wherein the data comprises configuration data for each track's arrangement within a song part, setting at least one arrangement parameter corresponding to the arrangement of each track within the song part, wherein the at least one arrangement parameter corresponding to the arrangement of the track specifies, at least, at least one song part associated with the track, wherein a track may be duplicated across multiple song parts, wherein a modification of the track in one song part causes a modification of the duplicated track in another song part, setting at least one additional arrangement parameter corresponding to a playback position of a song part, wherein the at least one additional arrangement parameter corresponding to the arrangement to the song part determines, at least, a playback position of the song part within the song, wherein setting the configuration data comprises receiving a configuration value from a user selectable control, wherein the user selectable control is configured to set the at least one playback parameter, and wherein the user selectable control is configured remotely, and wherein the user selectable control is configured to be a foot-operable control, wherein each song part is configured to contain a plurality of parallel tracks of tracks and data, wherein the arrangement of each track within each song part is determined, at least in part, by the at least one arrangement parameter associated with each track, wherein the arrangement of each song part is determined, at least in part, by the at least one additional arrangement parameter corresponding to the playback position of the song part.

A third set of embodiments for determining a playback type comprising at least one of the following stages:

receive an instruction to playback at least a portion of the song, wherein the instruction comprises at least one of the following:

Straight-Through Playback a straight-through playback command, wherein the straight-through playback command comprises:

a starting point, wherein the starting point is associated with at least one of the following:

a user selected position, a position of a previous playback termination, and the beginning of a song part corresponding to at least one of the following:

the user selected position, and the position of the previous playback termination, an ending point, wherein the ending point is defined to be at least one of the following:

an end of the last song part of the song, a current playback location upon the receipt a stop playback command, wherein the straight-through command causes a sequential playback of each song part between the starting point and the ending point, in a corresponding playback sequence for each song part, Looped Playback a looped playback command, wherein looped playback command comprises at least one of the following:

a loop starting point, a loop ending point, at least one song part to be looped, and a quantity of cycles to playback a loop, wherein the loop starting point and the loop ending point is configured to comprise a plurality of song parts within the loop starting point and the loop ending point, wherein each song part may have a different quantity of loop cycles before a transition to the subsequent song part.

A fourth set of embodiments for transitioning between playback types comprising at least one of the following stages:

Embodiment 1 continuing playback until at least one of the following events occurs:

a termination command is received to terminate playback, and a number of loops to playback expires for each song part, and the last song part has been played through and no further loop playbacks have been instructed, Embodiment 2 receiving the loop playback command during a straight-through playback, and looping a song part being played back during the receipt of the loop playback command, Embodiment 3 receiving a straight-through playback command during a loop playback, and sequentially playing back each song part subsequent to the song part being played back during the receipt of the straight-through playback command.

A fifth set of embodiments for transitioning between song parts comprising at least one of the following stages:

receiving a transition command during a playback of a song part, and transitioning to a different song part within the song, wherein the different song part is determined based at least in part on of the following:

a song part in subsequent playback position, wherein the subsequent playback position is set by the configuration data associated with the song the song part, and the tracks therein, a song part associated with a state of a selectable control that triggered the transition command, wherein the user selectable control is configured remotely, and wherein the selectable control is a foot-operable control, wherein the selectable control may comprise multiple states corresponding to different user engagement types with the selectable control, wherein each state is associated with a playback position, and wherein triggering a state corresponds to the transition of playback to a song part corresponding to the playback position.

A sixth set of embodiments for configuring playback data comprising at least one of the following stages:

determine at least one playback parameter for at least one of the following:

a song, a song part, and a track, wherein determining the at least one playback parameter comprises accessing metadata associated with at least one of the following:

a song, a song part, and a track, wherein the at least one playback parameter are established by at least one of the following:

the metadata associated with at least one of the following:

a song a song part, and a track, and a user selectable control, wherein the user selectable control is configured to set the at least one playback parameter, and wherein the user selectable control is configured remotely, and wherein the selectable control is a foot-operable control, wherein the at least one playback parameter comprises, but is not limited to, values associated with at least one of the following:

a tempo, a level, a frequency modulation, an effect, and various other aspects; and cause a playback in accordance to the playback parameter, wherein causing a playback comprises at least one of the following:

outputting a signal comprised of at least one of the following:

a song, a song part, and a track, and transmitting the signal to a remote location, and wherein the playback is quantized in accordance to at least one of the following:

a tempo, a length, an internal clock, and an external device.

A seventh set of embodiments for modifying playback data comprising at least one of the following stages:

receive a modification to at least one playback parameter associated with at least one of the following:

a song, a song part, and a track, and wherein receiving the modification comprises receiving the modification from a user selectable control, wherein the user selectable control is configured to modify the at least one playback parameter, and wherein the user selectable control is engaged remotely, wherein the selectable control is a foot-operable control, and wherein the modification is received during a playback, and wherein the at least one playback parameter comprises, but is not limited to, values associated with at least one of the following:

a tempo, a level, a frequency modulation, an effect, and various other aspects;

cause a playback in accordance to the modified playback parameter, wherein causing a playback comprises at least one of the following:

outputting a signal comprised of at least one of the following:

a song, a song part, and a track, and transmitting the signal to a remote location, wherein the playback is quantized in accordance to at least one of the following:

a tempo, a length, and an external device.

An eighth set of embodiments for modifying playback tracks comprising at least one of the following stages:

access a plurality of tracks and data corresponding to each of the tracks;

See the First Set of Embodiments for Accessing the Data determine an arrangement for each track of the plurality of tracks in a song, See the Second Set of Embodiments for Arranging the Data arrange each track of the plurality of tracks in the song, wherein an arrangement of the song comprises at least one of the following:

at least one song part comprised of a segment of parallel track tracks arranged for concurrent playback, and a series of song parts, wherein a first segment of parallel track tracks arranged in a first song part is configured for playback before a second segment of parallel tack tracks arranged in a subsequent song part, receive a command to modify at least one playback parameter associated with a track layer, wherein the modification comprises adjusting a value of the at least one playback parameter, wherein the adjusted value of the playback parameter is configured to:

turn off a playback of the track layer, and turn on playback of the track layer, wherein a user selectable control is configured to modify the at least one playback parameter, and wherein the user selectable control is engaged remotely, wherein the selectable control is a foot-operable control, and wherein the modification is received during a playback, cause a playback in accordance to the modified playback parameter, wherein causing a playback comprises at least one of the following:

outputting a signal comprised of at least one of the following:

a song, a song part, and a track, and transmitting the signal to a remote location.

wherein the playback is quantized in accordance to at least one of the following:

a tempo, a length, and an external device.

E. Recording Module

A first set of embodiments for recording a first track comprising at least one of the following stages:

record the signal from the at least one input;

wherein the recording is triggered by an engagement of a first selectable control;

wherein the engagement of the first selectable control is operative to:

activate a first state of operation, wherein the first state of operation is configured to trigger a recordation of the signal received from the at least one input, transition from the first state to a second state of operation when the engagement of the first selectable control exceeds a threshold period of time, wherein the second state of operation is configured to discard the signal recorded during the first state of operation;

Alternative Language 1:

wherein a recorded signal is retained when the first state of operation is maintained for a threshold period of time, and wherein the recorded signal is discarded when the first state of operation is not maintained for the threshold period of time;

Alternative Language 2:

wherein a recorded signal is retained when the second state of operation is not activated within a threshold period of time, and wherein the recorded signal is discarded when the second state of operation is activated within the threshold period of time;

convert the recorded signal to audio data within the at least one memory storage;

wherein the audio data is associated with:

an audio waveform configured for playback, a visual representation corresponding to the audio waveform configured for visual display, and at least one configuration parameter for the audio waveform, wherein the configuration parameter is structured to indicate an association of the audio track with at least one of the following:

a song part, a track within the song part, a layer within a track, at least one playback parameter, at least one arrangement parameter, and at least one display parameter.

A second set of embodiments for recording a subsequent track comprising at least one of the following stages:

record the signal from the at least one input;

wherein the recording is triggered by an engagement of a first selectable control;

wherein the engagement of the first selectable control triggers at least one of the following states:

a first state configured to cause a recordation of track comprised of the signal received from the at least one input, wherein the recorded track is added to a track layer stack (e.g., a song part) within a designated grouping of parallel track layer stacks (e.g., song parts);

a second state configured to cause a deletion of a track designated grouping of parallel track layer stack, and wherein the first state is configured to transition to the second state when the engagement of the first selectable control exceeds a threshold period of time;

Alternative Language:

wherein a recorded signal is retained when the first state of the first selectable control is maintained for a threshold period of time, and wherein the recorded signal is discarded if the first state of the first selectable control is not maintained for the threshold period of time.

A third set of embodiments for aligning the recorded signal for playback comprising at least one of the following stages:

align each track within a parallel track layer stack arranged for concurrent playback, wherein aligning the plurality of parallel track layers comprises:

inserting an audio marker into the recorded audio data associated with each track layer, wherein the audio marker comprises an audio pulse followed by a dithered space of silence, wherein the audio pulse is inserted into the beginning of a track associated with the audio data, and wherein the audio pulse is inserted at the beginning of a PCM file comprising the audio data associated with the track and is used to align encoded or transported versions of the audio data.

This is for syncing purposes. PCM files by nature have a variable amount of dead space in the beginning which makes syncing them by aligning the beginnings of the files to each other impossible. This pulse, follow by a set amount of silence allows the alignment to happen because the amount of silence following the pulse is always the same.

A fourth set of embodiments for parallel track recording comprising at least one of the following stages:

record a first track in a parallel track layer stack;

See the First Set of Embodiments for Recording a First Track receive an indication to record a subsequent track in the parallel track layer stack, wherein the indication comprises at least one of the following:

a completion of a loop cycle associated with the parallel track layer stack, wherein a duration of the loop cycle is determined by a configuration parameter associated with the parallel track layer stack;

wherein a quantity of loop cycles is determined by a configuration parameter associated with the parallel track layer stack;

wherein the completion of the loop cycle is configured to cause an input signal to be recorded and compiled as the subsequent track in the parallel track layer stack, wherein the configuration is set in at least one configuration parameter associated with at least one of the following:

a track, a song part, and a song, a user-selectable command triggering the recordation of the subsequent track in the parallel track layer stack, wherein the user-selectable command comprises an overdub command, wherein the overdub command is configured to cause an input signal to be recorded and compiled as the subsequent track in the parallel track layer stack, wherein the configuration of the overdub command is set in at least one configuration parameter associated with at least one of the following:

a track, a song part, and a song, wherein the user-selectable command is triggered by a foot-operable control switch;

record an input signal received by the input module as a new track in the parallel track layer stack when the indication to record the subsequent track is received;

record an input signal received by the input module as an overlay mix to the first track when at least one of the following occurs:

the user-selectable command comprising the overdub command is not received, and the completion of the loop cycle occurs.

A fifth set of embodiments for extending a song part or a track comprising at least one of the following stages:

automatically extend the Initial Loop by recording a longer Secondary Loop on top of the Initial Loop, whereas length of the Secondary Loop is any length greater than the Initial Loop and the Initial Loop is repeated, in whole or fractional increments, to match the length of the Secondary Loop automatically extend the Initial Loop by recording a longer non-repeating overdub on top of the Initial Loop whereas length of the non-repeating Overdub is any length greater than the Initial Loop and the Initial Loop is repeated, in whole or fractional increments, to match the length of the Overdub Section.

record an input signal received by the input module as a new track in a parallel track layer stack when the indication to record a new parallel track layer is received;

See the Fourth Set of Embodiments for Parallel Track Recording wherein the recordation is performed during a concurrent playback of the parallel track layers in the parallel track layer stack, Wherein the concurrent playback of the parallel track layers in the parallel track layer stack is based on, at least in part, the playback data associated with each parallel track layers, wherein concurrently playing the parallel tracks comprises looping the parallel track layer stack until a termination command is received;

if the length or the recorded new track is greater than the length of the parallel track layer stack, then:

extend each parallel track layer in the parallel track layer stack such that the length of each parallel track layer stack is congruent to the length of the recorded new track, wherein the extension to each parallel track layer is performed based on, at least in part, duplication of the audio data with a corresponding parallel track layer, wherein the duplication of the audio data are at least one of the following:

whole track duplications, and fractional track duplications, wherein the fractional track duplications comprises a quantized fraction of the audio data associated with the parallel track layer, wherein the extension to each parallel track layer is performed based on, at least in part, a padding of the audio data with a corresponding parallel track layer.

A sixth set of embodiments for extending a song part or a track comprising at least one of the following stages:

record an input signal received by the input module as a new track in a parallel track layer stack when the indication to record a new parallel track layer is received;

See the Fourth Set of Embodiments for Parallel Track Recording wherein the recordation is performed during a concurrent playback of the parallel track layers in the parallel track layer stack, Wherein the concurrent playback of the parallel track layers in the parallel track layer stack is based on, at least in part, the playback data associated with each parallel track layers, wherein concurrently playing the parallel tracks comprises looping the parallel track layer stack until a termination command is received;

terminate the recordation of the new track in response to a termination command, wherein terminating the recordation of the new track comprises receiving a termination command, wherein the termination command is received during the concurrently playback of the parallel track layers, wherein the termination command is associated with a state of a control switch, wherein the termination command is received by an activation of a foot-operable switch, wherein the termination command is received by a remote activation of a control switch associated with the termination command, wherein the termination command is triggered upon an instruction to record a subsequent track in the parallel track layer stack, wherein the termination command is triggered upon an instruction to transition to a subsequent parallel track layer stack, wherein the termination command is triggered in response to a completion of loop cycles associated with the parallel track layer stack, wherein a quantity of loop cycles is determined by a configuration parameter associated with the parallel track layer stack;

if the length of the recorded new track is greater than the length of the parallel track layer stack, then:

extend each parallel track layer in the parallel track layer stack such that the length of each parallel track layer stack is congruent to the length of the recorded new track, wherein the extension to each parallel track layer is performed based on, at least in part, duplication of the audio data with a corresponding parallel track layer, wherein the duplication of the audio data are at least one of the following:

whole track duplications, and fractional track duplications, wherein the fractional track duplications comprises a quantized fraction of the audio data associated with the parallel track layer, wherein extending each parallel track layer in the parallel track comprises extending each parallel track layer in all concurrently played tracks for a song part in a group of networked devices.

See Collaboration Module

A seventh set of embodiments for extending a song part or a track comprising at least one of the following stages:

record an input signal received by the input module as a new track in a parallel track layer stack when the indication to record a new parallel track layer is received;

See the Fourth Set of Embodiments for Parallel Layer Recording wherein the recordation is performed during a concurrent playback of the parallel track layers in the parallel track layer stack, wherein the concurrent playback of the parallel track layers in the parallel track layer stack is based on, at least in part, the playback data associated with each parallel track layers, wherein concurrently playing the parallel tracks comprises looping the parallel track layer stack until a termination command is received;

if the length of the recorded new track is greater than the length of the parallel track layer stacks played back after a designed amount of loop cycles, then:

add a loop cycle to the concurrent playback of the parallel track layers each time a delta in the length of the recorded new track exceeds the length of the parallel track layer stack, wherein adding a loop cycle to the concurrent playback of the parallel track layers comprises adding a loop cycle to all concurrently played tracks for a song part in a group of networked devices.

See Collaboration Module

An eighth set of embodiments for performance mode comprising at least one of the following stages:

In some embodiments, performance capture mode allows the process of creation of individual loops and the non-looped performance (e.g., a guitar solo over a looped chord progression) to be captured as a single file so it can be shared for listener enjoyment or in order to collaborate with other musicians to add additional musical elements to the work. Time signature and tempo information is saved so that this file can be used in other Looper devices with the quantizing feature enabled. This information is saved dynamically so that if the tempo is changed during a performance, this information is captured as it happens and can adjust collaborating devices accordingly. A digital marker is used for various actions, such as changing a song part and the resulting performance file displays these changes visually so that collaborating musicians can see where these actions have taken place and can prepare themselves accordingly.

receive a performance mode indication, wherein the performance mode indication can be received at any time during or prior to a recordation of an input signal, wherein the performance mode indication is received by way of a user-selectable control engagement, wherein the performance mode indication is associated with a state of the user-selectable control, wherein the user-selectable control engagement is received by way of a foot-operable switch, wherein the performance mode indication is associated with a state of the foot-operable switch, record an input signal received by the input module, wherein the recorded signal is recorded as a track comprising configuration data, wherein a first portion of the configuration data correspond to those configuration data associated with other tracks in a parallel track layer stack, wherein the other tracks in the parallel track layer stack may be retrieved in accordance to a collaboration module operation, wherein a second portion of the configuration data correspond to a playback configuration parameter indicating that the track is not to be played concurrently with a parallel track layer stack upon a playback of the parallel track layer stack, wherein the playback configuration parameter is configured to be set for playback independently of the playback data associated with other parallel track layers in the parallel track layer stack, wherein the recordation is performed during a concurrent playback of the parallel track layers in the parallel track layer stack, wherein the concurrent playback of the parallel track layers in the parallel track layer stack is based on, at least in part, the playback data associated with each parallel track layers, wherein concurrently playing the parallel tracks comprises looping the parallel track layer stack until a termination command is received;

if the length of the recorded new track is greater than the length of the parallel track layer stacks played back after a designed amount of loop cycles, then:

add a loop cycle to the concurrent playback of the parallel track layers each time a delta in the length of the recorded new track exceeds the length of the parallel track layer stack, wherein adding a loop cycle to the concurrent playback of the parallel track layers comprises adding a loop cycle to all concurrently played tracks for a song part in a group of networked devices, See Collaboration Module if the parallel track layer stack transitions to a subsequent parallel track layer stack during the recordation, saving the transition data along with the recorded track, wherein the transition data is saved as metadata associated with the audio data corresponding to the recorded track, wherein the transition data is configured to provide an indication of a transition during a playback of the recorded track.

The following disclose a fourth set of aspects of the present disclosure. The fourth set of aspects are not to be construed as patent claims unless the language of the aspect appears as a patent claim. The fourth set of aspects describe various non-limiting embodiments of the present disclosure.

1. A platform comprised of a plurality of methods for operating an apparatus as specified in various aspects of the description.
2. A platform of aspect 1, as further illustrated in the FIGURES.
3. An apparatus configured to perform a method of aspect 1, comprising a housing structured to accommodate a memory storage and a processing unit.
4. An apparatus configured to perform the method of aspect 1, comprising a housing structured to accommodate a memory storage, a processing unit, and a display unit.
5. The apparatus of any one of aspects 3 or 4, further comprising at least one control designed for foot-operable engagement.
6. The apparatus of any one of aspects 3-5, further comprising at least one of the following: at least one input port, an analog-to-digital convertor, a digital signal processor, a MIDI controller, a digital-to-analog convertor, and an output port.
7. The apparatus of any one of aspects 3-6, further comprising a communications module.
8. The apparatus of aspect 7, wherein the communications module is configured to engage in bi-directional data transmission in at least one of the following:

a wired communications medium, and a wireless communications medium.

9. The apparatus of aspect 8, further comprising a remote computing device in operative communication with the apparatus.
10. The apparatus of aspect 9, wherein the remote computing device is configured for at least one of the following:

store data to and retrieve data from the memory storage of the apparatus, display visual representations corresponding to the data, provide a user interface for interfacing with hardware and software components of the apparatus, and cause an operation to be performed by the processing unit of the apparatus.

11. A system comprising a server in operative communication with at least one of the following:

the communications module in any of aspects 7-8, and the remote computing device in any of aspects 9-10.

12. The system of aspect 11, wherein the server is configured to enable any one of the following:

storing data to and retrieving data from the memory storage of the apparatus, displaying visual representations corresponding to the data, providing a user interface for interfacing with hardware and software components of the apparatus, and causing an operation to be performed by the processing unit of the apparatus.

13. A method to record audio and display the recorded and/or real-time audio data as audio waveforms on a self-enclosed, standalone recording device that resides on the floor and has an integrated display, or on a self-enclosed, standalone recording device that resides on the floor with a remote display, such that the unit can capture and loop audio via hands-free or hands-on operation.
14. A method to record audio and display the recorded and/or real-time audio data as visual segments on a self-enclosed, standalone recording device that resides on the floor and has an integrated display, or on a self-enclosed, standalone recording device that resides on the floor with a remote display, such that the unit can capture and loop audio via hands-free or hands-on operation.
15. A method to record audio and display the recorded and/or real-time audio data as visual segments on a system that includes a display where part of the system resides on the floor and part of the system does not reside on the floor such that the system can capture and loop audio via hands-free or hands-on operation.
16. A method that uses a self-enclosed, standalone unit to record, capture or import an Initial Loop and offers the ability to automatically extend the Initial Loop by recording a longer Secondary Loop on top of the Initial Loop, whereas length of the Secondary Loop is any length greater than the Initial Loop and the Initial Loop is repeated, in whole or fractional increments, to match the length of the Secondary Loop.
17. A method that uses a self-enclosed, standalone unit to record, capture or import an Initial Loop and then automatically extend the Initial Loop by recording a longer non-repeating overdub on top of the Initial Loop, whereas length of the non-repeating Overdub is any length greater than the Initial Loop and the Initial Loop is repeated, in whole or fractional increments, to match the length of the Overdub Section.
18. A method that uses on a self-enclosed, standalone device that resides on the floor and has an integrated display, or on a self-enclosed, standalone device that resides on the floor with a remote display to create and capture a new Song Part, whereas the device's volatile and/or non-volatile memory is the only limitation for the number of Song Parts that can be added.
19. A method that uses a self-enclosed, standalone recording device that resides on the floor and has an integrated display, or on a self-enclosed, standalone recording device that resides on the floor with a remote display, to create and capture a new parallel Loop, whereas the device's volatile and/or non-volatile memory is the only limitation for the number of Loops that can be added.

20. A method that uses on a self-enclosed, standalone recording device that resides on the floor and has an integrated display, or on a self-enclosed, standalone recording device that resides on the floor with a remote display to store individual overdub tracks and a mixed version of the overdubs such that a new version of the mixed overdubs can be created using an individual overdub tracks with an integrated display, remote display and/or mobile application.
21. A method that inserts an audio marker, such as an audio pulse followed by a dithered space of silence, at the beginning of PCM files and uses this audio marker to align encoded or transported versions of the files.
22. A method that uses a self-enclosed, standalone recording device that resides on the floor and has an integrated display, or a self-enclosed, standalone recording device that resides on the floor with a remote display, that is connected to a local server or remote server to record, capture, create or import files and send files directly to other self-enclosed, standalone units via a Local Area Network or Wide Area Network connection.
23. A method that initiates audio capture at the active state transition of a button, and subsequently confirms and retains the audio capture if the active state is released within a programmed Release Period. Conversely the audio captured during the initial active state of the button will be discarded if the initial active state of the button is not released within the programmed Release Period.
24. A method that uses a self-enclosed, standalone recording device that resides on the floor and has an integrated display, or on a self-enclosed, standalone recording device that resides on the floor with a remote display to capture an audio file and allow the user to increase and decrease the playback speed of the audio file, maintaining the original pitch, live or semi-live while performing with the audio file.
25. A method that uses a self-enclosed, standalone recording device that resides on the floor and has an integrated display, or on a self-enclosed, standalone recording device that resides on the floor with a remote display to capture an audio file and allow the unit to increase and decrease the playback speed of the audio file, maintaining the original pitch, to quantize the recording length to the timing of the song.
26. A method that converts visual waveform to a gradient-form, where the relative or absolute magnitude of the waveform is converted to density of color that is represented by gradients of the color, or colors.
27. A method that uses a self-enclosed, standalone unit to record, capture or import a Loop, and then detect none-zero crossings of the audio waveform at the beginning and end of the Loop, and then automatically apply audio fade in at the beginning of the Loop and/or audio fade out at the end of the loop.

The following disclose a fifth set of aspects of the present disclosure. The fifth set of aspects are not to be construed as patent claims unless the language of the aspect appears as a patent claim. The fifth set of aspects describe various non-limiting embodiments of the present disclosure.

1. A method comprising:

playing back a first midi segment in response to a first activation command associated with a first foot-operable switch to operate a midi sequence module, the first midi segment comprising a first main midi sequence repeated a predetermined number of times;

playing back a plurality of first fill midi sequences associated with the first main midi sequence;

restarting the playback of the first midi segment in response to a second activation command associated with the first foot-operable switch; and transitioning to a second midi segment, wherein each of the plurality of activation commands associated with the first foot-operable switch are triggered based on, at least in part, a duration and frequency of a user application of the first foot-operable switch.

2. The method of aspect 1, wherein the playing back a plurality of first fill midi sequences comprises playing back a first fill midi sequence in response to a third activation command associated with the first foot-operable switch.
3. The method of aspect 1, wherein the playing back a plurality of first fill midi sequences comprises automatically playing back one or more first fill sequences of the plurality of first fill sequences at corresponding predetermined times within the first midi segment.
4. The method of aspect 1, wherein each first fill midi sequence of the plurality of first fill midi sequences is automatically chosen from a set of first fill midi sequences based on one or more of a location within the first midi segment and a duration since a last matching fill midi sequence was played.
5. The method of aspect 1, wherein the restarting the playback of the first midi segment comprises automatically restarting the playback of the first midi segment at an end of a repetition of the first midi segment.
6. The method of aspect 1, wherein the restarting the playback of the first midi segment comprises automatically restarting the playback of the first midi segment at an end of a first main midi sequence of the first midi segment.
7. The method of aspect 1, wherein the transitioning to the second midi segment comprises automatically transitioning to the second midi segment when the first midi segment is completed.
8. The method of aspect 1, wherein the transitioning to the second midi segment comprises transitioning to the second midi segment in response to a third activation command associated with the first foot-operable switch.
9. The method of aspect 1, further comprising:

pausing the playback of the first or second midi segment, in response to a third activation command associated with the first foot-operable switch; and unpausing the playback of the first or second midi segment, in response to a fourth activation command associated with the first foot-operable switch.

10. The method of aspect 1, further comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on, at least in part, a duration and frequency of a user application of the second foot-operable switch.

11. The method of aspect 1, wherein the second midi segment comprises a second main midi sequence repeated a second predetermined number of times.

12. The method of aspect 1, further comprising playing back a plurality of second fill midi sequences associated with the second main midi sequence.

13. The method of aspect 1, further comprising transitioning to one or more additional midi segments and playing back an additional one or more midi fill sequences associated with the one or more additional midi segments.

14. The method of aspect 1, wherein the predetermined number of times is configured by a user.

15. The method of aspect 1, comprising changing the predetermined number of times in response to a third activation command associated with the first foot-operable switch.

16. The method of aspect 1, comprising selecting the second midi segment from a plurality of midi segments in response to a third activation command associated with the first foot-operable switch.

17. The method of aspect 1, comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on a duration and frequency of a user application of the second foot-operable switch.

The following disclose a sixth set of aspects of the present disclosure. The sixth set of aspects are not to be construed as patent claims unless the language of the aspect appears as a patent claim. The sixth set of aspects describe various non-limiting embodiments of the present disclosure.

1. A method, comprising:

activating a performance mode in response to a first activation command associated with a first foot-operable switch, the performance mode comprising recording a plurality of midi segments, each midi segment comprising a main midi sequence, a plurality of fill midi sequences associated with the main midi sequence, and a number of repetitions of the main midi sequence;

playing back a first main midi sequence in response to a second activation command associated with a first foot-operable switch to operate a midi sequence module;

playing back a fill midi sequence associated with the main midi sequence in response to a third activation command associated with the first foot-operable switch;

transitioning to a playback of a second main midi sequence in response to a fourth activation command associated with the first foot-operable switch; and wherein each of the plurality of activation commands are triggered based on, at least in part, a duration and frequency of a user application of the first foot-operable switch.

2. The method of aspect 1, further comprising stopping the playback of the main midi sequence in response to a fifth activation command associated with the first foot-operable switch.

3. The method of aspect 1, comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch;

overdubbing the recorded loop in response to a fourth activation command associated with the second foot-operable switch; and wherein each of the plurality of activation commands associated with the second foot-operable switch are triggered based on a duration and frequency of a user application of the second foot-operable switch.

4. The method of aspect 1, comprising:

playing back a first midi segment of the plurality of midi segments in response to a fifth activation command associated with the first foot-operable switch;

restarting the playing back the first midi segment in response to a sixth activation command associated with the first foot-operable switch;

playing back a plurality of first fill midi sequences associated with the first main midi sequence; and automatically transitioning to a second midi segment of the plurality of midi segments at an end of the first midi segment.

5. The method of aspect 1, comprising transitioning to a second midi segment in response to a seventh activation command associated with the first foot-operable switch.

The following disclose a seventh set of aspects of the present disclosure. The third set of aspects are not to be construed as patent claims unless the language of the aspect appears as a patent claim. The third set of aspects describe various non-limiting embodiments of the present disclosure.

1. A method comprising:

playing back a first midi segment in response to a first activation command associated with a first foot-operable switch to operate a midi sequence module, the first midi segment comprising a first main midi sequence repeated a predetermined number of times;

playing back a plurality of first fill midi sequences associated with the first main midi sequence;

restarting the playback of the first midi segment in response to a second activation command associated with the first foot-operable switch; and transitioning to a second midi segment, wherein each of the plurality of activation commands associated with the first foot-operable switch are triggered based on, at least in part, a duration and frequency of a user application of the first foot-operable switch.

2. The method of claim 1, wherein the playing back a plurality of first fill midi sequences comprises playing back a first fill midi sequence in response to a third activation command associated with the first foot-operable switch.

3. The method of claim 1, wherein the playing back a plurality of first fill midi sequences comprises automatically playing back one or more first fill sequences of the plurality of first fill sequences at corresponding predetermined times within the first midi segment.

4. The method of claim 1, wherein each first fill midi sequence of the plurality of first fill midi sequences is automatically chosen from a set of first fill midi sequences based on one or more of a location within the first midi segment and a duration since a last matching fill midi sequence was played.

5. The method of claim 1, wherein the restarting the playback of the first midi segment comprises automatically restarting the playback of the first midi segment at an end of a repetition of the first midi segment.

6. The method of claim 1, wherein the restarting the playback of the first midi segment comprises automatically restarting the playback of the first midi segment at an end of a first main midi sequence of the first midi segment.

7. The method of claim 1, wherein the transitioning to the second midi segment comprises automatically transitioning to the second midi segment when the first midi segment is completed.

8. The method of claim 1, wherein the transitioning to the second midi segment comprises transitioning to the second midi segment in response to a third activation command associated with the first foot-operable switch.

9. The method of claim 1, further comprising:

pausing the playback of the first or second midi segment, in response to a third activation command associated with the first foot-operable switch; and unpausing the playback of the first or second midi segment, in response to a fourth activation command associated with the first foot-operable switch.

10. The method of claim 1, further comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on, at least in part, a duration and frequency of a user application of the second foot-operable switch.

11. The method of claim 1, wherein the second midi segment comprises a second main midi sequence repeated a second predetermined number of times.

12. The method of claim 1, further comprising playing back a plurality of second fill midi sequences associated with the second main midi sequence.

13. The method of claim 1, further comprising transitioning to one or more additional midi segments and playing back an additional one or more midi fill sequences associated with the one or more additional midi segments.

14. The method of claim 1, wherein the predetermined number of times is configured by a user.

15. The method of claim 1, comprising changing the predetermined number of times in response to a third activation command associated with the first foot-operable switch.

16. The method of claim 1, comprising selecting the second midi segment from a plurality of midi segments in response to a third activation command associated with the first foot-operable switch.

17. The method of claim 1, comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on a duration and frequency of a user application of the second foot-operable switch.

18. A method, comprising:

activating a performance mode in response to a first activation command associated with a first foot-operable switch, the performance mode comprising recording a plurality of midi segments, each midi segment comprising a main midi sequence, a plurality of fill midi sequences associated with the main midi sequence, and a number of repetitions of the main midi sequence;

playing back a first main midi sequence in response to a second activation command associated with a first foot-operable switch to operate a midi sequence module;

playing back a fill midi sequence associated with the main midi sequence in response to a third activation command associated with the first foot-operable switch;

transitioning to a playback of a second main midi sequence in response to a fourth activation command associated with the first foot-operable switch; and wherein each of the plurality of activation commands are triggered based on, at least in part, a duration and frequency of a user application of the first foot-operable switch.

19. The method of claim 18, further comprising stopping the playback of the main midi sequence in response to a fifth activation command associated with the first foot-operable switch.

20. The method of claim 18, comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on a duration and frequency of a user application of the second foot-operable switch.

21. The method of claim 18, comprising:

playing back a first midi segment of the plurality of midi segments in response to a fifth activation command associated with the first foot-operable switch;

restarting the playing back the first midi segment in response to a sixth activation command associated with the first foot-operable switch;

playing back a plurality of first fill midi sequences associated with the first main midi sequence; and automatically transitioning to a second midi segment of the plurality of midi segments at an end of the first midi segment.

22. The method of claim 21, comprising transitioning to a second midi segment in response to a seventh activation command associated with the first foot-operable switch.

23. The method of claim 21, wherein the playing back the first midi segment comprises selecting one or more midi sequences from a set of midi sequences associated with the first midi segment.

24. The method of claim 23, wherein the selecting one or more midi sequences comprises selecting a played midi sequence based on an analysis of data or metadata for one or more of the first midi segment, the second midi segment, the plurality of first fill midi sequences, or the played midi sequence.

25. A method comprising:

playing back a first midi segment of a song, the first midi segment comprising a first midi sequence repeated a predetermined number of times;

transitioning to a second midi segment of the song after the first midi sequence is repeated for the predetermined number of times unless a first foot-operable switch is triggered;

receiving a first activation command during the playback of the first midi segment; and in response to the first activation command, modifying the predetermined number of times the first midi sequence is to be repeated;

wherein the first activation command is triggered based on, at least in part, a duration and frequency of a user application of the first foot-operable switch.

26. The method of any of the proceeding aspects, further comprising changing a state of playback of one or more first fill midi sequences associated with the first midi sequence in response to a second activation command.

27. The method of any of the proceeding aspects, wherein the playing back the first midi segment comprises automatically playing back one or more first fill sequences at predetermined times within the first midi segment.

28. The method of any of the proceeding aspects, further comprising restarting the playback of the first midi segment at an end of a first repetition of the first midi sequence of the first midi segment.

29. The method of any of the proceeding aspects, wherein the transitioning to the second midi segment comprises transitioning to the second midi segment in response to a second activation command associated with the first foot-operable switch.

30. The method of any of the proceeding aspects, further comprising:

pausing the playback of at least one of the first midi segment and the second midi segment, in response to a third activation command associated with the first foot-operable switch; and unpausing the playback of at least one of the first midi segment and the second midi segment, in response to a fourth activation command associated with the first foot-operable switch.

31. The method of any of the proceeding aspects, further comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on, at least in part, a duration and frequency of a user application of the second foot-operable switch.

32. The method of any of the proceeding aspects, wherein the second midi segment comprises a second midi sequence repeated a second predetermined number of times.

33. The method of any of the proceeding aspects, further comprising playing back a plurality of second fill midi sequences associated with the second midi sequence.

34. The method of any of the proceeding aspects, further comprising transitioning to one or more additional midi segments and playing back one or more additional midi fill sequences associated with the one or more additional midi segments.

35. The method of any of the proceeding aspects, wherein the predetermined number of times is configured by a user.

36. The method of any of the proceeding aspects, further comprising changing the predetermined number of times in response to a second activation command associated with the first foot-operable switch.

37. The method of any of the proceeding aspects, further comprising selecting the second midi segment from a plurality of midi segments in response to a second activation command associated with the first foot-operable switch.

38. The method of any of the proceeding aspects, comprising:

commencing a recordation of a signal received from an instrument input in response to a first activation command associated with a second foot-operable switch configured to operate a looping means;

stopping the recordation of the signal received from the instrument input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on a duration and frequency of a user application of the second foot-operable switch.

39. A non-transitory computer readable medium comprising a set of instructions which when executed on a computing device are configured to perform a method comprising:

playing back a first midi segment of a song, the first midi segment comprising a first main midi sequence repeated a predetermined number of times;

playing back a plurality of first fill midi sequences associated with the first main midi sequence;

transitioning to a second midi segment of the song after the first midi segment;

restarting the playback of the first midi segment in response to a first activation command associated with a first foot-operable switch; and wherein the activation command associated with the first foot-operable switch is triggered based on, at least in part, a duration and frequency of a user application of the first foot-operable switch.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claim such additional disclosures is reserved.

The following is claimed:

1. A method comprising:

playing back a first midi segment, the first midi segment comprising a first midi sequence repeated a predetermined number of times;

transitioning to a second midi segment after the first midi sequence is repeated for the predetermined number of times unless a first foot-operable switch is triggered;

receiving a first activation command during the playback of the first midi segment; and in response to the first activation command, modifying the predetermined number of times the first midi sequence is to be repeated, wherein the first activation command is triggered based on, at least in part, a duration and frequency of a user application of the first foot-operable switch.

2. The method of claim 1, further comprising changing a state of playback of one or more first fill midi sequences associated with the first midi sequence in response to a second activation command.

3. The method of claim 1, wherein the playing back the first midi segment comprises playing back one or more first fill sequences at predetermined times within the first midi segment.

4. The method of claim 1, further comprising modifying the midi segment during playback.

5. The method of claim 1, further comprising restarting the playback of the first midi segment at an end of a first repetition of the first midi sequence of the first midi segment.

6. The method of claim 1, further comprising displaying the first midi segment of a song on a display associated with a remote computing unit.

7. The method of claim 1, further comprising:

pausing the playback of at least one of the first midi segment and the second midi segment, in response to a third activation command associated with the first foot-operable switch; and unpausing the playback of at least one of the first midi segment and the second midi segment, in response to a fourth activation command associated with the first foot-operable switch.

8. The method of claim 1, further comprising:

commencing a recordation of a signal received from an input in response to a first activation command associated with a second foot-operable switch;

stopping the recordation of the signal received from the input in response to a second activation command associated with the second foot-operable switch;

initiating a playback of a recorded loop in response to a third activation command associated with the second foot-operable switch; and overdubbing the recorded loop in response to a fourth activation command associated with the second foot-operable switch, wherein each of the plurality of activation commands associated with the second foot-operable switch are triggered based on, at least in part, a duration and frequency of a user application of the second foot-operable switch.

9. The method of claim 1, wherein the second midi segment comprises a second midi sequence repeated a second predetermined number of times.

10. The method of claim 1, further comprising playing back a plurality of second fill midi sequences associated with the second midi sequence in response to a second activation command.

11. The method of claim 1, further comprising transitioning to one or more additional midi segments and playing back one or more additional midi fill sequences associated with the one or more additional midi segments in response to a second activation command.

12. The method of claim 1, wherein playing back the first midi segment comprises playing back the first midi segment the predetermined number of times configured by a user.

13. The method of claim 12, further comprising changing the predetermined number of times in response to a second activation command associated with the first foot-operable switch.

14. The method of claim 1, further comprising modifying the first midi segment on a remote computing unit through an interaction with the second computing unit.

15. The method of claim 1, further comprising:
commencing a recordation of a signal received from an input in response to a first activation command associated with a second foot-operable switch;
stopping the recordation of the signal received from the input in response to a second activation command associated with the second foot-operable switch;
initiating a playback of a recorded loop in response to a third activation command associated with the second foot-operable switch; and
overdubbing the recorded loop in response to a fourth activation command associated with the second foot-operable switch,
wherein each of the plurality of activation commands associated with the second foot-operable switch are triggered based on a duration and frequency of a user application of the second foot-operable switch.

16. A non-transitory computer readable medium comprising a set of instructions which when executed on a computing device are configured to perform a method comprising:
receiving a selection of a song from a first computing unit;
displaying at least one midi segment of a song on a display associated with a second computing unit;
modifying the at least one midi segment on the second computing unit;
transmitting the at least one modified midi segment to the first computing unit for playback;
playing back a first midi segment of a song, the first midi segment comprising a first main midi sequence repeated a predetermined number of times;
playing back a plurality of first fill midi sequences associated with the first main midi sequence;
transitioning to a second midi segment of the song after the first midi segment;
restarting the playback of the first midi segment in response to a first activation command associated with a first foot-operable switch; and
wherein the activation command associated with the first foot-operable switch is triggered based on, at least in part, a duration and frequency of a user application of the first foot-operable switch.

17. The non-transitory computer readable medium of claim 16, further comprising modifying the midi segment during playback.

18. The non-transitory computer readable medium of claim 16, further comprising:
commencing a recordation of a signal received from an input in response to a first activation command associated with a second foot-operable switch;
stopping the recordation of the signal received from the input in response to a second activation command associated with the second foot-operable switch;
initiating a playback of a recorded loop in response to a third activation command associated with the second foot-operable switch;
overdubbing the recorded loop in response to a fourth activation command associated with the second foot-operable switch; and
wherein each of the plurality of activation commands associated with the second foot-operable switch are triggered based on, at least in part, a duration and frequency of a user application of the second foot-operable switch.

19. The non-transitory computer readable medium of claim 16, further comprising:
commencing a recordation of a signal received from an input;
stopping the recordation of the signal received from the input;
initiating a playback of a recorded loop; and
overdubbing the recorded loop.

20. The non-transitory computer readable medium of claim 16, wherein the playing back the first midi segment comprises playing back one or more first fill sequences at predetermined times within the first midi segment.

* * * * *